US010136406B2

(12) United States Patent
Guo

(10) Patent No.: US 10,136,406 B2
(45) Date of Patent: Nov. 20, 2018

(54) COMMUNICATION METHOD FOR DUAL-CARD USER EQUIPMENT AND APPARATUS

(71) Applicant: Huawei Technologies Co., Ltd., Shenzhen, Guangdong (CN)

(72) Inventor: Xiaolong Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 14/974,417

(22) Filed: Dec. 18, 2015

(65) Prior Publication Data
US 2016/0105864 A1  Apr. 14, 2016

Related U.S. Application Data

(63) Continuation of application No. PCT/CN2013/077553, filed on Jun. 20, 2013.

(51) Int. Cl.
| | |
|---|---|
| H04W 60/00 | (2009.01) |
| H04W 74/00 | (2009.01) |
| H04W 8/04 | (2009.01) |
| H04W 76/15 | (2018.01) |
| H04W 28/06 | (2009.01) |
| H04W 88/16 | (2009.01) |
| H04W 12/06 | (2009.01) |

(52) U.S. Cl.
CPC ......... *H04W 60/005* (2013.01); *H04W 8/04* (2013.01); *H04W 74/004* (2013.01); *H04W 76/15* (2018.02); *H04W 12/06* (2013.01); *H04W 28/06* (2013.01); *H04W 88/16* (2013.01)

(58) Field of Classification Search
CPC .... H04W 60/005; H04W 8/04; H04W 74/004
See application file for complete search history.

(56) References Cited

U.S. PATENT DOCUMENTS

| 2005/0163093 A1* | 7/2005 | Garg ................. H04W 76/025 370/342 |
| 2007/0019806 A1 | 1/2007 | Conley et al. |
| 2011/0077003 A1* | 3/2011 | Shin ..................... H04W 48/16 455/434 |

(Continued)

FOREIGN PATENT DOCUMENTS

| CN | 101389069 A | 3/2009 |
| CN | 201349329 Y | 11/2009 |

(Continued)

*Primary Examiner* — Muthuswamy Manoharan

(57) ABSTRACT

Embodiments of the present invention provide a communication method for a dual-card user equipment and an apparatus. The method includes: receiving, by a first network side device, an access request from a dual-card UE, and establishing a first bearer according to the access request; acquiring, by the first network side device, association information between a first card of the dual-card UE and a second card of the dual-card UE; establishing, by the first network side device, a second bearer according to the association information; splitting, by the first network side device, first data to be transmitted into second data and third data; sending, by the first network side device, the second data to the dual-card UE by using the first bearer, and sending the third data to the dual-card UE by using the second bearer.

23 Claims, 19 Drawing Sheets

(56) References Cited

U.S. PATENT DOCUMENTS

| | | | |
|---|---|---|---|
| 2011/0269456 A1 | 11/2011 | Krishnaswamy et al. | |
| 2012/0244800 A1* | 9/2012 | Yen | H04W 28/08 455/39 |
| 2013/0029720 A1 | 1/2013 | Clevorn | |
| 2013/0267261 A1* | 10/2013 | Nikkelen | H04W 68/00 455/458 |
| 2013/0303203 A1* | 11/2013 | Wang | H04W 68/00 455/458 |
| 2014/0198732 A1* | 7/2014 | Rysgaard | H04W 72/082 370/329 |
| 2017/0048752 A1 | 2/2017 | Xiong et al. | |

FOREIGN PATENT DOCUMENTS

| | | |
|---|---|---|
| CN | 102870440 A | 1/2013 |
| CN | 103108368 A | 5/2013 |
| JP | 2004336741 A | 11/2004 |
| JP | 2011-166251 A | 8/2011 |
| JP | 2013520940 | 6/2013 |
| WO | WO2013010418 A1 | 1/2013 |
| WO | WO 2013/085541 A1 | 6/2013 |

\* cited by examiner

COMMUNICATION METHOD FOR DUAL-CARD USER EQUIPMENT AND APPARATUS

CROSS-REFERENCE TO RELATED APPLICATIONS

This application is a continuation of International Application No. PCT/CN2013/077553, filed on Jun. 20, 2013, which is hereby incorporated by reference in its entirety.

TECHNICAL FIELD

The present invention relates to the communications field, and in particular, to a communication method for a dual-card user equipment and an apparatus.

BACKGROUND

As communication requirements of users increase, a growing number of cellular communications systems emerge, such as a UMTS (Universal Mobile Telecommunications System, Universal Mobile Telecommunications System) system, an SAE (System Architecture Evolution, System Architecture Evolution)/LTE (Long Term Evolution, Long Term Evolution) system, a WiMAX (Worldwide Interoperability for Microwave Access, Worldwide Interoperability for Microwave Access) system, and a CDMA (Code Division Multiple Access, Code Division Multiple Access) system.

In the prior art, in a cellular communications system, UEs (User Equipment, user equipment) mainly include single-card mobile phones and dual-card dual-standby mobile phones. The dual-card dual-standby mobile phones may be classified into dual-card dual-standby single-pass mobile phones and dual-card dual-standby dual-pass mobile phones according to operating principles of the dual-card dual-standby mobile phones. A main difference between "single-pass" and "dual-pass" lies in whether two cards of a dual-card dual-standby mobile phone can perform concurrent communication. For a "dual-pass" mobile phone, if the two cards in the mobile phone separately belong to different cellular communications systems, the two cards are independent; therefore, the two cards may separately perform, according to respective communication procedures, communication, that is, transmission of uplink data and downlink data.

By using the foregoing procedure, however, the service transmission efficiency is relatively low.

SUMMARY

Embodiments of the present invention provide a communication method for a dual-card user equipment and an apparatus, which are used to improve the service transmission efficiency.

To achieve the foregoing objective, the following technical solutions are used in the embodiments of the present invention.

According to a first aspect, an embodiment of the present invention provides a communication method for a dual-card user equipment UE, including:

receiving, by a first network side device, an access request from the dual-card UE, and establishing a first bearer according to the access request, where the first network side device provides a service for a first card of the dual-card UE, and the first bearer is a data transmission channel between the first network side device and the first card of the dual-card UE;

acquiring, by the first network side device, association information between the first card of the dual-card UE and a second card of the dual-card UE;

establishing, by the first network side device, a second bearer according to the association information, where the second bearer is a data transmission channel between the first network side device and the second card of the dual-card UE;

splitting, by the first network side device, first data to be transmitted into second data and third data; and sending, by the first network side device, the second data to the dual-card UE by using the first bearer, and sending the third data to the dual-card UE by using the second bearer, so that the dual-card UE combines the second data and the third data into the first data.

In a first possible implementation manner of the first aspect, the acquiring, by the first network side device, association information between the first card of the dual-card UE and a second card of the dual-card UE includes:

receiving, by the first network side device, from a home subscriber server HSS, subscription information of the first card of the dual-card UE; and acquiring, by the first network side device, the association information in the subscription information of the first card of the dual-card UE;

or receiving, by the first network side device, an access request from the first card of the dual-card UE, where the access request carries the association information; and acquiring, by the first network side device, the association information according to the access request.

With reference to the foregoing first aspect or the first possible implementation manner of the first aspect, in a second possible implementation manner, the association information includes an identifier of the second card of the dual-card UE, or an identifier of the second card of the dual-card UE and an address of a core network entity with which the second card of the dual-card UE is registered.

With reference to the second possible implementation manner of the first aspect, in a third possible implementation manner, the splitting, by the first network side device, first data to be transmitted into second data and third data includes:

splitting, by the first network side device, the first data into the second data and the third data according to at least one of the following: load of the first bearer, data transmission efficiency of the first bearer, load of the second bearer, and data transmission efficiency of the second bearer.

With reference to the second possible implementation manner or the third possible implementation manner of the first aspect, in a fourth possible implementation manner, the first network side device includes an anchor gateway, and the anchor gateway includes a packet data network gateway PGW or a gateway general packet radio service support node GGSN; and the establishing, by the first network side device, a second bearer according to the association information specifically includes:

acquiring, by the anchor gateway, an Internet Protocol IP address of the second card of the dual-card UE according to the identifier of the second card of the dual-card UE, or the identifier of the second card of the dual-card UE and the address of the core network entity with which the second card of the dual-card UE is registered; and establishing, by the anchor gateway, the second bearer according to the IP address of the second card of the dual-card UE.

With reference to the fourth possible implementation manner of the first aspect, in a fifth possible implementation manner, the second data and the third data carry an IP address of the first card of the dual-card UE; and the sending, by the first network side device, the second data to the dual-card UE by using the first bearer, and sending the third data to the dual-card UE by using the second bearer includes:

sending, by the anchor gateway according to the IP address of the first card of the dual-card UE, the second data to the dual-card UE by using the first bearer, adding the IP address of the second card of the dual-card UE to the third data, and sending the third data to the dual-card UE by using the second bearer.

With reference to the fifth possible implementation manner of the first aspect, in a sixth possible implementation manner, the adding, by the anchor gateway, the IP address of the second card of the dual-card UE to the third data specifically includes:

adding, by the anchor gateway, the IP address of the second card of the dual-card UE to the third data according to a tunneling technology, where the tunneling technology includes IP in IP encapsulation, Generic Routing Encapsulation GRE, and IP Security Sec.

With reference to the second possible implementation manner or the third possible implementation manner of the first aspect, in a seventh possible implementation manner, the first network side device includes a core network entity, and the core network entity includes a serving gateway SGW or a serving general packet radio service support node SGSN; and the establishing, by the first network side device, a second bearer according to the association information specifically includes:

establishing, by the core network entity, the second bearer according to the identifier of the second card of the dual-card UE, or the identifier of the second card of the dual-card UE and the address of the core network entity with which the second card of the dual-card UE is registered.

With reference to the foregoing first aspect or any implementation manner of the first possible implementation manner to the seventh possible implementation manner of the first aspect, in an eighth possible implementation manner, after the receiving, by a first network side device, an access request from the dual-card UE, the method further includes:

receiving, by the first network side device, a detach request from the dual-card UE, where the detach request is sent by the dual-card UE when the second card of the dual-card UE needs to be detached; and deleting, by the first network side device, the association information, or the association information and the second bearer according to the detach request.

According to a second aspect, an embodiment of the present invention further provides a communication method for a dual-card UE, including:

sending, by the dual-card UE, an access request to a first network side device, so that the first network side device establishes a first bearer according to the access request, and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE;

receiving, by the dual-card UE, second data and third data from the first network side device; where the second data is sent by the first network side device by using the first bearer after the first network side device splits first data to be transmitted into the second data and the third data, and the third data is sent by the first network side device by using the second bearer; and combining, by the dual-card UE, the second data and the third data into the first data.

In a first possible implementation manner of the second aspect, after the sending, by the dual-card UE, an access request to a first network side device, the method further includes:

sending, by the dual-card UE, a detach request to the first network side device, so that the first network side device deletes the association information, or the association information and the second bearer according to the detach request, where the detach request is sent by the dual-card UE when the second card of the dual-card UE needs to be detached.

According to a third aspect, an embodiment of the present invention provides a network side device, including:

a first receiving unit, configured to receive an access request from a dual-card UE;

a first acquiring unit, configured to acquire association information between a first card of the dual-card UE and a second card of the dual-card UE;

a first establishing unit, configured to establish a first bearer according to the access request, and establish a second bearer according to the association information, where the first bearer is a data transmission channel between the network side device and the first card of the dual-card UE, the second bearer is a data transmission channel between the network side device and the second card of the dual-card UE, and the network side device provides a service for the first card of the dual-card UE; where a first processing unit, configured to split first data to be transmitted into second data and third data; and a first sending unit, configured to send the second data to the dual-card UE by using the first bearer, and send the third data to the dual-card UE by using the second bearer, so that the dual-card UE combines the second data and the third data into the first data.

In a first possible implementation manner of the third aspect, the first receiving unit is further configured to receive, from an HSS, subscription information of the first card of the dual-card UE; and the first acquiring unit is specifically configured to acquire the association information in the subscription information of the first card of the dual-card UE;

or the first receiving unit is further configured to receive an access request from the first card of the dual-card UE, where the access request carries the association information; and the first acquiring unit is specifically configured to acquire the association information according to the access request.

With reference to the foregoing third aspect or the first possible implementation manner of the third aspect, in a second possible implementation manner, the first acquiring unit is specifically configured to acquire the association information, where the association information includes an identifier of the second card of the dual-card UE, or an identifier of the second card of the dual-card UE and an address of a core network entity with which the second card of the dual-card UE is registered.

With reference to the second possible implementation manner of the third aspect, in a third possible implementation manner, the first processing unit is specifically configured to split the first data into the second data and the third data according to at least one of the following: load of the first bearer, data transmission efficiency of the first bearer, load of the second bearer, and data transmission efficiency of the second bearer.

With reference to the second possible implementation manner or the third possible implementation manner of the third aspect, in a fourth possible implementation manner, the network side device includes an anchor gateway, and the anchor gateway includes a PGW or a GGSN;

the first acquiring unit is further configured to acquire an IP address of the second card of the dual-card UE according to the identifier of the second card of the dual-card UE, or the identifier of the second card of the dual-card UE and the address of the core network entity with which the second card of the dual-card UE is registered; and the first establishing unit is specifically configured to establish the second bearer according to the IP address of the second card of the dual-card UE.

With reference to the fourth possible implementation manner of the third aspect, in a fifth possible implementation manner, the second data and the third data that are obtained, by splitting, by the first processing unit carry an IP address of the first card of the dual-card UE; where the first processing unit is further configured to add the IP address of the second card of the dual-card UE to the third data; and the first sending unit is specifically configured to send, according to the IP address of the first card of the dual-card UE, the second data to the dual-card UE by using the first bearer, and send the third data to the dual-card UE by using the second bearer.

With reference to the fifth possible implementation manner of the third aspect, in a sixth possible implementation manner, the first processing unit is specifically configured to add the IP address of the second card of the dual-card UE to the third data according to a tunneling technology, where the tunneling technology includes IP in IP encapsulation, GRE, and IPSec.

With reference to the second possible implementation manner or the third possible implementation manner of the third aspect, in a seventh possible implementation manner, the network side device includes a core network entity, and the core network entity includes an SGW or an SGSN; and the first establishing unit is specifically configured to establish the second bearer according to the identifier of the second card of the dual-card UE, or the identifier of the second card of the dual-card UE and the address of the core network entity with which the second card of the dual-card UE is registered.

With reference to the foregoing third aspect or any implementation manner of the first possible implementation manner to the seventh possible implementation manner of the third aspect, in an eighth possible implementation manner, the first receiving unit is further configured to receive a detach request from the dual-card UE, where the detach request is sent by the dual-card UE when the second card of the dual-card UE needs to be detached; and the first processing unit is further configured to delete the association information, or the association information and the second bearer according to the detach request.

According to a fourth aspect, an embodiment of the present invention provides a dual-card UE, including:

a second sending unit, configured to send an access request to a first network side device, so that the first network side device establishes a first bearer according to the access request, and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE;

a second receiving unit, configured to receive second data and third data from the first network side device, where the second data is sent by the first network side device by using the first bearer after the first network side device splits first data to be transmitted into the second data and the third data, and the third data is sent by the first network side device by using the second bearer, and a second processing unit, configured to combine the second data and the third data into the first data.

In a first possible implementation manner of the fourth aspect, the second sending unit is further configured to send a detach request to the first network side device, so that the first network side device deletes the association information, or the association information and the second bearer according to the detach request, where the detach request is sent by the dual-card UE when the second card of the dual-card UE needs to be detached.

According to a fifth aspect, an embodiment of the present invention provides a network side device, including:

a first receiver, configured to receive an access request from a dual-card UE;

a first processor, configured to acquire association information between a first card of the dual-card UE and a second card of the dual-card UE, establish a first bearer according to the access request, establish a second bearer according to the association information, and split first data to be transmitted into second data and third data, where the first bearer is a data transmission channel between the network side device and the first card of the dual-card UE, the second bearer is a data transmission channel between the network side device and the second card of the dual-card UE, and the network side device provides a service for the first card of the dual-card UE; and a first sender, configured to send the second data to the dual-card UE by using the first bearer, and send the third data to the dual-card UE by using the second bearer, so that the dual-card UE combines the second data and the third data into the first data.

In a first possible implementation manner of the fifth aspect, the first receiver is further configured to receive, from an HSS, subscription information of the first card of the dual-card UE; and the first processor is specifically configured to acquire the association information in the subscription information of the first card of the dual-card UE;

or the first receiver is further configured to receive an access request from the first card of the dual-card UE, where the access request carries the association information; and the first processor is specifically configured to acquire the association information according to the access request.

With reference to the foregoing fifth aspect or the first possible implementation manner of the fifth aspect, in a second possible implementation manner, the first processor is specifically configured to acquire the association information, where the association information includes an identifier of the second card of the dual-card UE, or an identifier of the second card of the dual-card UE and an address of a core network entity with which the second card of the dual-card UE is registered.

With reference to the second possible implementation manner of the fifth aspect, in a third possible implementation manner, the first processor is specifically configured to split the first data into the second data and the third data according to at least one of the following: load of the first bearer, data transmission efficiency of the first bearer, load of the second bearer, and data transmission efficiency of the second bearer.

With reference to the second possible implementation manner or the third possible implementation manner of the fifth aspect, in a fourth possible implementation manner, the network side device includes an anchor gateway, and the anchor gateway includes a PGW or a GGSN; and the first processor is specifically configured to acquire an IP address of the second card of the dual-card UE according to the identifier of the second card of the dual-card UE, or the identifier of the second card of the dual-card UE and the address of the core network entity with which the second card of the dual-card UE is registered, and establish the second bearer according to the IP address of the second card of the dual-card UE.

With reference to the fourth possible implementation manner of the fifth aspect, in a fifth possible implementation manner, the second data and the third data that are obtained, by splitting, by the first processor carry an IP address of the first card of the dual-card UE;

the first processor is further configured to add the IP address of the second card of the dual-card UE to the third data; and the first sender is specifically configured to send, according to the IP address of the first card of the dual-card UE, the second data to the dual-card UE by using the first bearer, and send the third data to the dual-card UE by using the second bearer.

With reference to the fifth possible implementation manner of the fifth aspect, in a sixth possible implementation manner, the first processor is specifically configured to add the IP address of the second card of the dual-card UE to the third data according to a tunneling technology, where the tunneling technology includes IP in IP encapsulation, GRE, and IPSec.

With reference to the second possible implementation manner or the third possible implementation manner of the fifth aspect, in a seventh possible implementation manner, the network side device includes a core network entity, and the core network entity includes an SGW or an SGSN; and the first processor is specifically configured to establish the second bearer according to the identifier of the second card of the dual-card UE, or the identifier of the second card of the dual-card UE and the address of the core network entity with which the second card of the dual-card UE is registered.

With reference to the foregoing fifth aspect or any implementation manner of the first possible implementation manner to the seventh possible implementation manner of the fifth aspect, in an eighth possible implementation manner, the first receiver is further configured to receive a detach request from the dual-card UE, where the detach request is sent by the dual-card UE when the second card of the dual-card UE needs to be detached; and the first processor is further configured to delete the association information, or the association information and the second bearer according to the detach request.

According to a sixth aspect, an embodiment of the present invention further provides a dual-card UE, including:

a second sender, configured to send an access request to a first network side device, so that the first network side device establishes a first bearer according to the access request, and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE;

a second receiver, configured to receive second data and third data from the first network side device, where the second data is sent by the first network side device by using the first bearer after the first network side device splits first data to be transmitted into the second data and the third data, and the third data is sent by the first network side device by using the second bearer, and a second processor, configured to combine the second data and the third data into the first data.

In a first possible implementation manner of the sixth aspect, the second sender is further configured to send a detach request to the first network side device, so that the first network side device deletes the association information, or the association information and the second bearer according to the detach request, where the detach request is sent by the dual-card UE when the second card of the dual-card UE needs to be detached.

In a communication method for a dual-card UE provided in embodiments of the present invention, a first network side device receives an access request from a dual-card UE, and establishes a first bearer according to the access request, where the first network side device provides a service for a first card of the dual-card UE, and the first bearer is a data transmission channel between the first network side device and the first card of the dual-card UE; after the first network side device acquires association information between a first card of the dual-card UE and a second card of the dual-card UE, the first network side device establishes a second bearer according to the association information, where the second bearer is a data transmission channel between the first network side device and the second card of the dual-card UE; and the first network side device splits first data to be transmitted into second data and third data, sends the second data to the dual-card UE by using the first bearer, and sends the third data to the dual-card UE by using the second bearer, so that the dual-card UE combines the second data and the third data into the first data. According to this solution, a network side device may simultaneously deliver, after splitting, data to be transmitted, split data by separately using bearers of the two cards of the dual-card UE; therefore, the service transmission efficiency can be improved.

According to a seventh aspect, an embodiment of the present invention provides another communication method for a dual-card UE, including:

sending, by the dual-card UE, an access request to a first network side device, so that the first network side device establishes a first bearer according to the access request, and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE;

splitting, by the dual-card UE, first data to be transmitted into second data and third data; and sending, by the dual-card UE, the second data to the first network side device by using the first bearer, and sending the third data to the first network side device by using the second bearer, so that the first network side device combines the second data and the third data into the first data.

In a first possible implementation manner of the seventh aspect, the splitting, by the dual-card UE, first data to be transmitted into second data and third data includes:

splitting, by the dual-card UE, the first data into the second data and the third data according to at least one of the following: load of the first bearer, data transmission efficiency of the first bearer, load of the second bearer, and data transmission efficiency of the second bearer.

With reference to the foregoing seventh aspect or the first possible implementation manner of the seventh aspect, in a second possible implementation manner, the first network side device includes an anchor gateway, where the anchor gateway includes a PGW or a GGSN; and the second data and the third data carry an IP address of the anchor gateway, where the IP address of the anchor gateway is acquired by the dual-card UE from the anchor gateway; and the sending, by the dual-card UE, the second data to the first network side device by using the first bearer, and sending the third data to the first network side device by using the second bearer includes:

sending, by the dual-card UE according to the IP address of the anchor gateway, the second data to the anchor gateway by using the first bearer, adding an IP address of the second card of the dual-card UE to the third data, and sending the third data to the anchor gateway by using the second bearer, where the IP address of the second card of the dual-card UE is sent to the dual-card UE after being acquired by the anchor gateway according to the association information; or is acquired by the dual-card UE from the second card of the dual-card UE according to a preset policy.

With reference to the second possible implementation manner of the seventh aspect, in a third possible implementation manner, the adding, by the dual-card UE, the IP address of the second card of the dual-card UE to the third data specifically includes:

adding, by the dual-card UE, the IP address of the second card of the dual-card UE to the third data according to a tunneling technology, where the tunneling technology includes IP in IP encapsulation, GRE, and IPSec.

With reference to the foregoing seventh aspect or any implementation manner of the first possible implementation manner to the third possible implementation manner of the seventh aspect, in a fourth possible implementation manner, after the sending, by the dual-card UE, an access request to a first network side device, the method further includes:

sending, by the dual-card UE, a detach request to the first network side device, so that the first network side device deletes the association information, or the association information and the second bearer according to the detach request, where the detach request is sent by the dual-card UE when the second card of the dual-card UE needs to be detached.

According to an eighth aspect, an embodiment of the present invention further provides another communication method for a dual-card UE, including:

receiving, by a first network side device, an access request from the dual-card UE, and establishing a first bearer according to the access request, where the first network side device provides a service for a first card of the dual-card UE, and the first bearer is a data transmission channel between the first network side device and the first card of the dual-card UE;

acquiring, by the first network side device, association information between the first card of the dual-card UE and a second card of the dual-card UE;

establishing, by the first network side device, a second bearer according to the association information, where the second bearer is a data transmission channel between the first network side device and the second card of the dual-card UE;

receiving, by the first network side device, second data and third data from the dual-card UE; where the second data is sent by the dual-card UE by using the first bearer after the dual-card UE splits first data to be transmitted into the second data and the third data, and the third data is sent by the dual-card UE by using the second bearer, and combining, by the first network side device, the second data and the third data into the first data.

In a first possible implementation manner of the eighth aspect, the acquiring, by the first network side device, association information between the first card of the dual-card UE and the second card of the dual-card UE includes:

receiving, by the first network side device, from an HSS, subscription information of the first card of the dual-card UE; and acquiring, by the first network side device, the association information in the subscription information of the first card of the dual-card UE;

or receiving, by the first network side device, an access request from the first card of the dual-card UE, where the access request carries the association information; and acquiring, by the first network side device, the association information according to the access request.

With reference to the foregoing eighth aspect or the first possible implementation manner of the eighth aspect, in a second possible implementation manner, the association information includes an identifier of the second card of the dual-card UE, or an identifier of the second card of the dual-card UE and an address of a core network entity with which the second card of the dual-card UE is registered.

With reference to the second possible implementation manner of the eighth aspect, in a third possible implementation manner, the first network side device includes an anchor gateway, and the anchor gateway includes a PGW or a GGSN; and the establishing, by the first network side device, a second bearer according to the association information specifically includes:

acquiring, by the anchor gateway, an IP address of the second card of the dual-card UE according to the identifier of the second card of the dual-card UE, or the identifier of the second card of the dual-card UE and the address of the core network entity with which the second card of the dual-card UE is registered; and establishing, by the anchor gateway, the second bearer according to the IP address of the second card of the dual-card UE.

With reference to the second possible implementation manner of the eighth aspect, in a fourth possible implementation manner, the first network side device includes a core network entity, and the core network entity includes an SGW or an SGSN; and the establishing, by the first network side device, a second bearer according to the association information specifically includes:

establishing, by the core network entity, the second bearer according to the identifier of the second card of the dual-card UE, or the identifier of the second card of the dual-card UE and the address of the core network entity with which the second card of the dual-card UE is registered.

With reference to the foregoing eighth aspect or any implementation manner of the first possible implementation manner to the fourth possible implementation manner of the eighth aspect, in a fifth possible implementation manner, after the receiving, by a first network side device, an access request from the dual-card UE, the method further includes:

receiving, by the first network side device, a detach request from the dual-card UE, where the detach request is sent by the dual-card UE when the second card of the dual-card UE needs to be detached; and deleting, by the first network side device, the association information, or the association information and the second bearer according to the detach request.

According to a ninth aspect, an embodiment of the present invention provides a dual-card UE, including:

a second sending unit, configured to send an access request to a first network side device, so that the first network side device establishes a first bearer according to the access request, and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE; and a second processing unit, configured to split first data to be transmitted into second data and third data; where the second sending unit is further configured to send the second data to the first network side device by using the first bearer, and send the third data to the first network side device by using the second bearer, so that the first network side device combines the second data and the third data into the first data.

In a first possible implementation manner of the ninth aspect, the second processing unit is specifically configured to split the first data into the second data and the third data according to at least one of the following: load of the first bearer, data transmission efficiency of the first bearer, load of the second bearer, and data transmission efficiency of the second bearer.

With reference to the foregoing ninth aspect or the first possible implementation manner of the ninth aspect, in a second possible implementation manner, the first network side device includes an anchor gateway, where the anchor gateway includes a PGW or a GGSN; and the second data and the third data that are obtained, by splitting, by the second processing unit, carry an IP address of the anchor gateway, where the IP address of the anchor gateway is acquired by the dual-card UE from the anchor gateway; and the second processing unit is further configured to add an IP address of the second card of the dual-card UE to the third data, where the IP address of the second card of the dual-card UE is sent to the dual-card UE after being acquired by the anchor gateway according to the association information; or is acquired by the dual-card UE from the second card of the dual-card UE according to a preset policy; and the second sending unit is specifically configured to, according to the IP address of the anchor gateway, send the second data to the anchor gateway by using the first bearer, and send the third data to the anchor gateway by using the second bearer.

With reference to the second possible implementation manner of the ninth aspect, in a third possible implementation manner, the second processing unit is specifically configured to add the IP address of the second card of the dual-card UE to the third data according to a tunneling technology, where the tunneling technology includes IP in IP encapsulation, GRE, and IPSec.

With reference to the foregoing ninth aspect or any implementation manner of the first possible implementation manner to the third possible implementation manner of the ninth aspect, in a fourth possible implementation manner, the second sending unit is further configured to send a detach request to the first network side device, so that the first network side device deletes the association information, or the association information and the second bearer according to the detach request, where the detach request is sent by the dual-card UE when the second card of the dual-card UE needs to be detached.

According to a tenth aspect, an embodiment of the present invention provides a network side device, including:

a first receiving unit, configured to receive an access request from a dual-card UE;

a first acquiring unit, configured to acquire association information between a first card of the dual-card UE and a second card of the dual-card UE;

a first establishing unit, configured to establish a first bearer according to the access request, and establish a second bearer according to the association information, where the first bearer is a data transmission channel between the network side device and the first card of the dual-card UE, the second bearer is a data transmission channel between the network side device and the second card of the dual-card UE, and the network side device provides a service for the first card of the dual-card UE; where the first receiving unit is further configured to receive second data and third data from the dual-card UE; where the second data is sent by the dual-card UE by using the first bearer after the dual-card UE splits first data to be transmitted into the second data and the third data, and the third data is sent by the dual-card UE by using the second bearer, and a first processing unit, configured to combine the second data and the third data into the first data.

In a first possible implementation manner of the tenth aspect, the first receiving unit is further configured to receive, from an HSS, subscription information of the first card of the dual-card UE; and the first acquiring unit is specifically configured to acquire the association information in the subscription information of the first card of the dual-card UE;

or the first receiving unit is further configured to receive an access request from the first card of the dual-card UE, where the access request carries the association information; and the first acquiring unit is specifically configured to acquire the association information according to the access request.

With reference to the foregoing tenth aspect or the first possible implementation manner of the tenth aspect, in a second possible implementation manner, the first acquiring unit is specifically configured to acquire the association information, where the association information includes an identifier of the second card of the dual-card UE, or an identifier of the second card of the dual-card UE and an address of a core network entity with which the second card of the dual-card UE is registered.

With reference to the second possible implementation manner of the tenth aspect, in a third possible implementation manner, the network side device includes an anchor gateway, and the anchor gateway includes a PGW or a GGSN;

the first acquiring unit is further configured to acquire an IP address of the second card of the dual-card UE according to the identifier of the second card of the dual-card UE, or the identifier of the second card of the dual-card UE and the address of the core network entity with which the second card of the dual-card UE is registered; and the first establishing unit is specifically configured to establish the second bearer according to the IP address of the second card of the dual-card UE.

With reference to the second possible implementation manner of the tenth aspect, in a fourth possible implementation manner, the network side device includes a core network entity, and the core network entity includes an SGW or an SGSN; and the first establishing unit is specifically configured to establish the second bearer according to the identifier of the second card of the dual-card UE, or the identifier of the second card of the dual-card UE and the address of the core network entity with which the second card of the dual-card UE is registered.

With reference to the foregoing tenth aspect or any implementation manner of the first possible implementation manner to the fourth possible implementation manner of the tenth aspect, in a fifth possible implementation manner, the first receiving unit is further configured to receive a detach request from the dual-card UE, where the detach request is sent by the dual-card UE when the second card of the dual-card UE needs to be detached; and the first processing unit is further configured to delete the association information, or the association information and the second bearer according to the detach request.

According to an eleventh aspect, an embodiment of the present invention further provides a dual-card UE, including:

a second sender, configured to send an access request to a first network side device, so that the first network side device establishes a first bearer according to the access request, and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE; and a second processor, configured to split first data to be transmitted into second data and third data; where the second sender is further configured to send the second data to the first network side device by using the first bearer, and send the third data to the first network side device by using the second bearer, so that the first network side device combines the second data and the third data into the first data.

In a first possible implementation manner of the eleventh aspect, the second processor is specifically configured to split the first data into the second data and the third data according to at least one of the following: load of the first bearer, data transmission efficiency of the first bearer, load of the second bearer, and data transmission efficiency of the second bearer.

With reference to the foregoing eleventh aspect or the first possible implementation manner of the eleventh aspect, in a second possible implementation manner, the first network side device includes an anchor gateway, where the anchor gateway includes a PGW or a GGSN; and the second data and the third data that are obtained, by splitting, by the second processor, carry an IP address of the anchor gateway, where the IP address of the anchor gateway is acquired by the dual-card UE from the anchor gateway;

the second processor is further configured to add an IP address of the second card of the dual-card UE to the third data, where the IP address of the second card of the dual-card UE is sent to the dual-card UE after being acquired by the anchor gateway according to the association information; or is acquired by the dual-card UE from the second card of the dual-card UE according to a preset policy; and the second sender is specifically configured to, according to the IP address of the anchor gateway, send the second data to the anchor gateway by using the first bearer, and send the third data to the anchor gateway by using the second bearer.

With reference to the second possible implementation manner of the eleventh aspect, in a third possible implementation manner, the second processor is specifically configured to add the IP address of the second card of the dual-card UE to the third data according to a tunneling technology, where the tunneling technology includes IP in IP encapsulation, GRE, and IPSec.

With reference to the foregoing eleventh aspect or any implementation manner of the first possible implementation manner to the third possible implementation manner of the eleventh aspect, in a fourth possible implementation manner, the second sender is further configured to send a detach request to the first network side device, so that the first network side device deletes the association information, or the association information and the second bearer according to the detach request, where the detach request is sent by the dual-card UE when the second card of the dual-card UE needs to be detached.

According to a twelfth aspect, an embodiment of the present invention provides a network side device, including:

a first receiver, configured to receive an access request from a dual-card UE; and a first processor, configured to acquire association information between a first card of the dual-card UE and a second card of the dual-card UE, and configured to establish a first bearer according to the access request and establish a second bearer according to the association information, where the first bearer is a data transmission channel between the network side device and the first card of the dual-card UE, the second bearer is a data transmission channel between the network side device and the second card of the dual-card UE, and the network side device provides a service for the first card of the dual-card UE; where the first receiver is further configured to receive second data and third data from the dual-card UE; where the second data is sent by the dual-card UE by using the first bearer after the dual-card UE splits first data to be transmitted into the second data and the third data, and the third data is sent by the dual-card UE by using the second bearer; and the first processor is further configured to combine the second data and the third data into the first data.

In a first possible implementation manner of the twelfth aspect, the first receiver is further configured to receive, from an HSS, subscription information of the first card of the dual-card UE; and the first processor is specifically configured to acquire the association information in the subscription information of the first card of the dual-card UE;

or the first receiver is further configured to receive an access request from the first card of the dual-card UE, where the access request carries the association information; and the first processor is specifically configured to acquire the association information according to the access request.

With reference to the foregoing twelfth aspect or the first possible implementation manner of the twelfth aspect, in a second possible implementation manner, the first processor is specifically configured to acquire the association information, where the association information includes an identifier of the second card of the dual-card UE, or an identifier of the second card of the dual-card UE and an address of a core network entity with which the second card of the dual-card UE is registered.

With reference to the second possible implementation manner of the twelfth aspect, in a third possible implementation manner, the network side device includes an anchor gateway, and the anchor gateway includes a PGW or a GGSN; and the first processor is further configured to acquire an IP address of the second card of the dual-card UE according to the identifier of the second card of the dual-card UE, or the identifier of the second card of the dual-card UE and the address of the core network entity with which the second card of the dual-card UE is registered, and establish the second bearer according to the IP address of the second card of the dual-card UE.

With reference to the second possible implementation manner of the twelfth aspect, in a fourth possible implementation manner, the network side device includes a core network entity, and the core network entity includes an SGW or an SGSN; and the first processor is specifically configured to establish the second bearer according to the identifier of the second card of the dual-card UE, or the identifier of the second card of the dual-card UE and the address of the core network entity with which the second card of the dual-card UE is registered.

With reference to the foregoing twelfth aspect or any implementation manner of the first possible implementation manner to the fourth possible implementation manner of the twelfth aspect, in a fifth possible implementation manner, the first receiver is further configured to receive a detach request from the dual-card UE, where the detach request is sent by the dual-card UE when the second card of the dual-card UE needs to be detached; and the first processor is further configured to delete the association information, or the association information and the second bearer according to the detach request.

In a communication method for a dual-card UE provided in the embodiments of the present invention, the dual-card UE sends an access request to a first network side device, so that the first network side device establishes a first bearer according to the access request; and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE; and after the dual-card UE splits first data to be transmitted into second data and third data, the dual-card UE sends the second data to the first network side device by using the first bearer, and sends the third data to the first network side device by using the second bearer, so that the first network side device combines the second data and the third data into the first data. According to this solution, the dual-card UE may simultaneously send, after splitting data to be transmitted, split data at the same time by separately using bearers of the two cards of the dual-card UE; therefore, the service transmission efficiency can be improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
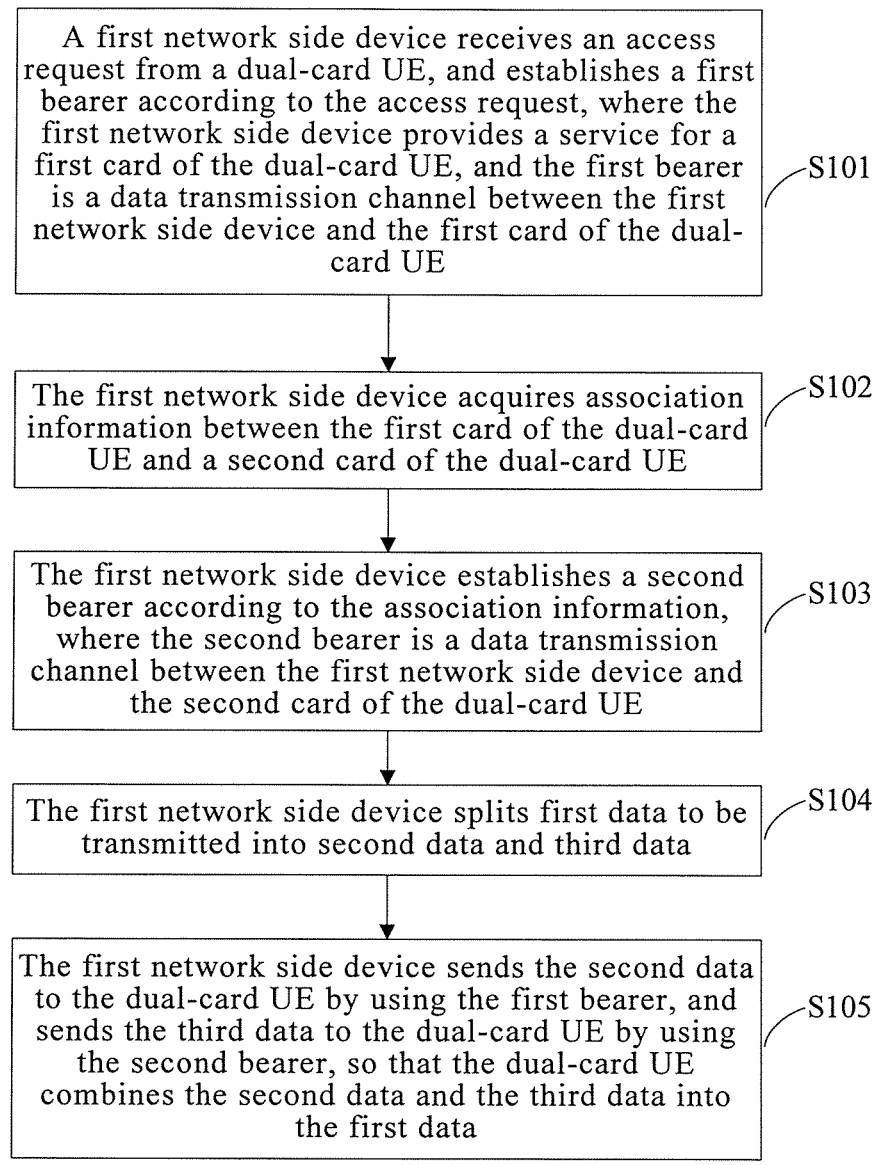
FIG. 1 is a first flowchart of a communication method for a dual-card UE according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention. Features of all the embodiments can be combined if they are not mutually exclusive.

In the prior art, when a single-card mobile phone accesses a network, an ISR (Idle State Signaling Reduction, idle state signaling reduction) procedure may be activated to reduce a signaling overhead caused by the single-card mobile phone in a location update/registration procedure. For example, after a single-card mobile phone registers with a 2G (second-generation, short for 2nd generation mobile telecommunications technical specifications)/3G (3rd-generation, short for the 3rd generation mobile telecommunications technology) network or an SAE network, when the single-card mobile phone moves from the 2G/3G network to the SAE network or moves from the SAE network to the 2G/3G network, the single-card mobile phone needs to register with both of the two networks, and thereafter, when the single-card mobile phone moves between registered areas RA (Routing Area, routing area)/TA (Tracking Area, tracking area) corresponding to the two networks, the single-card mobile phone does not need to register again. Preferably, in such ISR activation, if a network needs to page the single-card mobile phone, the network needs to page in all RA/TA areas with which the single-card mobile phone has registered.

Various technologies described in this specification may be used in various wireless communications systems, for example, current 2G and 3G communications systems and a next-generation communications system, such as a Global System for Mobile communications (GSM, Global System for Mobile Communications), a Code Division Multiple Access (CDMA, Code Division Multiple Access) system, a Time Division Multiple Access (TDMA, Time Division Multiple Access) system, a Wideband Code Division Multiple Access (WCDMA, Wideband Code Division Multiple Access) system, a Frequency Division Multiple Access (FDMA, Frequency Division Multiple Access) system, an OFDMA (Orthogonal Frequency-Division Multiple Access, Orthogonal Frequency-Division Multiple Access) system, a Single Carrier Frequency Division Multiple Access (SC-FDMA, Single Carrier Frequency Division Multiple Addressing) system, a General Packet Radio Service, general packet radio service (GPRS, General Packet Radio Service, general packet radio service) system, a Long Term Evolution (LTE, Long Term Evolution) system, and another such communications system.

A user equipment may be a wireless terminal or a wired terminal. The wireless terminal may refer to a device that provides a user with voice and/or data connectivity, a handheld device with a radio connection function, or another processing device connected to a wireless modem. The wireless terminal may communicate with one or more core networks through a radio access network (RAN, Radio Access Network). The wireless terminal may be a mobile terminal, such as a mobile phone (also referred to as a "cellular" phone) and a computer with a mobile terminal may be, for example, a portable, pocket-sized, handheld, computer built-in, or vehicle-mounted mobile apparatus, which exchanges voice and/or data with the radio access network; or may be, for example, a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

Embodiment 1

An embodiment of the present invention provides a communication method for a dual-card UE. As shown in FIG. 1, the method, relating to a first network side device, may be applied to a scenario in which a network side device sends downlink data to a dual-card dual-standby dual-pass UE. The method may include the following steps:

S101. A first network side device receives an access request from a dual-card UE, and establishes a first bearer according to the access request, where the first network side device provides a service for a first card of the dual-card UE, and the first bearer is a data transmission channel between the first network side device and the first card of the dual-card UE.

Exemplarily, the dual-card UE is a communication terminal in which two cards are inserted. When the dual-card UE needs to access a network, the dual-card UE first sends an access request to the first network side device, that is, the first network side device receives the access request, and then, the first network side device establishes, according to the access request, a first bearer corresponding to the first card of the dual-card UE, where the first bearer is the data transmission channel between the first network side device and the first card of the dual-card UE, and the first network side device provides a service for the first card of the dual-card UE.

S102. The first network side device acquires association information between the first card of the dual-card UE and a second card of the dual-card UE.

The first network side device acquires the association information between the first card of the dual-card UE and the second card of the dual-card UE, and a specific method for acquiring the association information by the first network side device is described in detail in a subsequent embodiment.

In this embodiment of the present invention, the association information may be information, recorded by the first card of the dual-card UE, about the second card of the dual-card UE, for example, for the first card of the dual-card UE, the association information acquired by the first network side device is the information about the second card of the dual-card UE, where the information about the second card of the dual-card UE may include an identifier of the second card of the dual-card UE, or an identifier of the second card of the dual-card UE and an address of a core network entity with which the second card of the dual-card UE is registered; and correspondingly, for the second card of the dual-card UE, association information acquired by a network side device to which the second card of the dual-card UE belongs is information about the first card of the dual-card UE, where the information about the first card of the dual-card UE may include an identifier of the first card of the dual-card UE, or an identifier of the first card of the dual-card UE and an address of a core network entity with which the first card of the dual-card UE is registered.

S103. The first network side device establishes a second bearer according to the association information, where the second bearer is a data transmission channel between the first network side device and the second card of the dual-card UE.

After the first network side device receives the access request from the dual-card UE, the first network side device establishes, according to the acquired association information, the second bearer corresponding to the second card of the dual-card UE, where the second bearer is the data transmission channel between the first network side device and the second card of the dual-card UE.

It may be understood that establishing of the second bearer by the first network side device may be triggered by using an access request from the first card of the dual-card UE, or may be triggered by using an access request from the second card of the dual-card UE, which is not limited in the present invention.

Exemplarily, the dual-card UE may send the access request from the second card of the dual-card UE to the network side device to which the second card of the dual-card UE belongs, so that the network side device to which the second card of the dual-card UE belongs establishes a bearer of the second card of the dual-card UE for the second card of the dual-card UE, where the bearer of the second card of the dual-card UE may be from the network side device, to which the second card of the dual-card UE belongs, to the second card of the dual-card UE.

It should be noted that, before the first network side device establishes the second bearer, if the network side device to which the second card of the dual-card UE belongs has established the bearer of the second card of the dual-card UE for the second card of the dual-card UE, the first network side device needs to establish only a part of the second bearer, that is, a bearer from the first network side device to the network side device to which the second card of the dual-card UE belongs; and if the network side device to which the second card of the dual-card UE belongs has not established the bearer of the second card of the dual-card UE for the second card of the dual-card UE, the first network side device needs to establish a complete second bearer, that is, an entire bearer from the first network side device to the second card of the dual-card UE.

It should be noted that the communication method for a dual-card UE provided in this embodiment of the present invention is exemplarily described from a perspective of the first card of the dual-card UE, and for a communication method for the second card of the dual-card UE, which is similar to a communication method for the first card of the dual-card UE, details are not described herein again.

S104. The first network side device splits first data to be transmitted into second data and third data.

The first network side device splits the first data to be transmitted into two groups of data packets: the second data and the third data, where a basis for splitting the first data by the first network side device may be at least one of the following: load of the first bearer, data transmission efficiency of the first bearer, load of the second bearer, and data transmission efficiency of the second bearer.

Preferably, the foregoing basis for splitting the first data may further include a network congestion status, a tariff of the first card of the dual-card UE and/or a tariff of the second card of the dual-card UE, a randomly paging card that is independently selected by the dual-card UE for initiating access to or responding to the first network side device, a transmission rate of the first data, or load of the first data, which is not limited in the present invention.

In particular, a basis for independently selecting a randomly paging card by the dual-card UE for initiating access to or responding to the first network side device may include that: it is set by using software in the dual-card UE that a specific card is preferentially used for accessing a network; or if traffic of the first card of the dual-card UE, traffic of the second card of the dual-card UE, or traffic of the first data to be transmitted is in a preset range, the dual-card UE uses a specific card for accessing the network according to an internal setting.

A person of ordinary skill in the art may understand that, in the communications field, if a source end needs to send first data to a target end, the source end needs to packetize the first data into multiple data packets, and sequentially transmit the multiple data packets to the target end. That is, the first data is a data stream that includes multiple data packets, and if the first network side device receives the first data, the first network side device splits, according to the foregoing splitting basis, the multiple data packets into two groups of data packets: the second data and the third data.

It should be noted that a ratio at which the first data to be transmitted is split by the first network side device into the two groups of data packets, that is, the second data and the third data may be 1:9, 5:5, 0:10, or any other ratio that meets the foregoing splitting basis, which is not limited in the present invention.

Preferably, when the ratio is 0:10 or 10:0, it indicates that the first network side device has not split the first data but only delivers the first data to the dual-card UE by using a preferable bearer (the first bearer or the second bearer). When the ratio is 0:10 or 10:0, the communication method for a dual-card UE provided in this embodiment of the present invention may also be applied to a dual-card single-pass UE.

S105. The first network side device sends the second data to the dual-card UE by using the first bearer, and sends the third data to the dual-card UE by using the second bearer, so that the dual-card UE combines the second data and the third data into the first data.

The first network side device sends the second data to the dual-card UE by using the first bearer, and the first network side device sends the third data to the dual-card UE by using the second bearer, so that after combining the received second data and third data into the first data, the dual-card UE performs corresponding processing on the first data, so as to complete transmission of the first data.

It should be noted that if the first card of the dual-card UE and the second card of the dual-card UE belong to different PLMNs (Public Land Mobile Network, public land mobile network), the first bearer established by the first network side device may be from the first network side device to the first card of the dual-card UE; and correspondingly, the second bearer established by the first network side device may be from the first network side device, via the network side device to which the second card of the dual-card UE belongs, to the second card of the dual-card UE.

Figure 2:
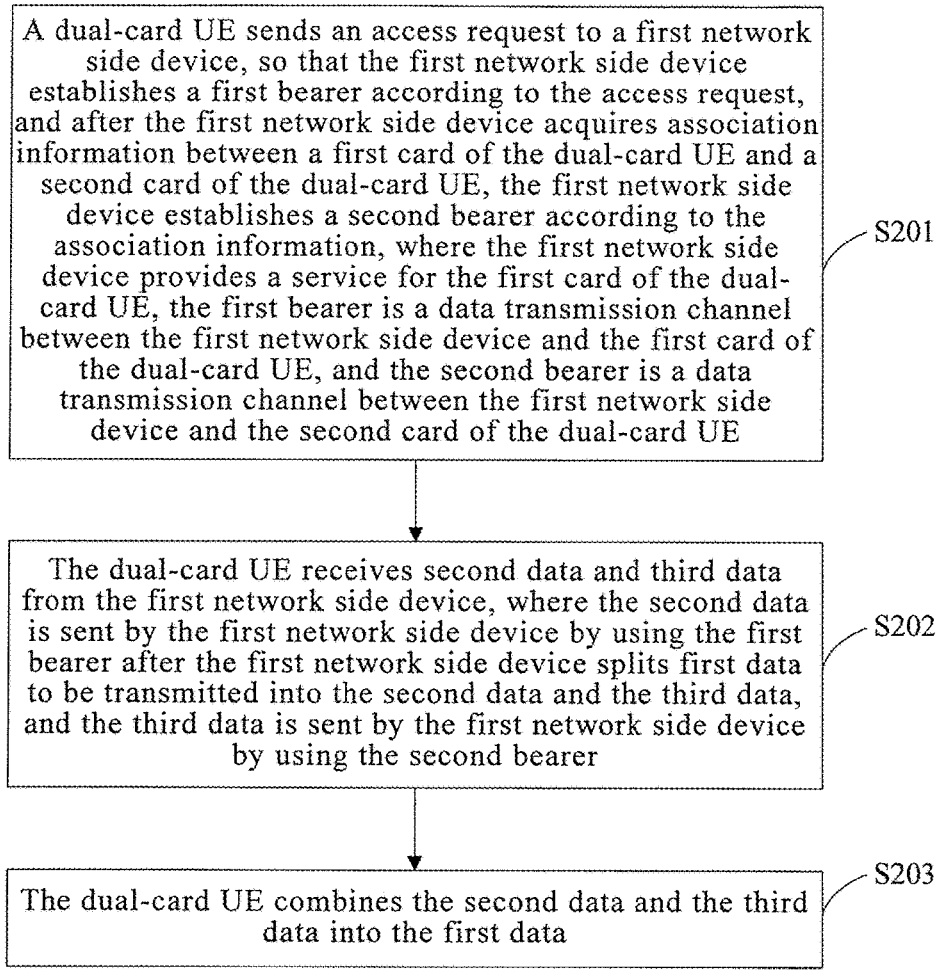
FIG. 2 is a second flowchart of a communication method for a dual-card UE according to an embodiment of the present invention.

An embodiment of the present invention further provides a communication method for a dual-card UE. As shown in FIG. 2, the method, relating to the dual-card UE, may be applied to a scenario in which a network side device sends downlink data to a dual-card dual-standby dual-pass UE. The method may include the following steps:

S201. A dual-card UE sends an access request to a first network side device, so that the first network side device establishes a first bearer according to the access request, and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE.

When the dual-card UE needs to access a network, the dual-card UE first sends an access request to the first network side device, so that after receiving the access request, the first network side device establishes the first bearer for the dual-card UE according to the access request, and after acquiring the association information between the first card of the dual-card UE and the second card of the dual-card UE, the first network side device establishes the second bearer for the dual-card UE according to the association information, where the first bearer is the data transmission channel between the first network side device and the first card of the dual-card UE, the second bearer is the data transmission channel between the first network side device and the second card of the dual-card UE, and the first network side device provides a service for the first card of the dual-card UE.

S202. The dual-card UE receives second data and third data from the first network side device, where the second data is sent by the first network side device by using the first bearer after the first network side device splits first data to be transmitted into the second data and the third data, and the third data is sent by the first network side device by using the second bearer.

The dual-card UE receives the second data and the third data from the first network side device, where the second data is sent by the first network side device to the dual-card UE by using the first bearer after the first network side device splits the first data to be transmitted to the dual-card UE into two groups of data packets, namely, the second data and the third data, and the third data is sent by the first network side device to the dual-card UE by using the second bearer.

S203. The dual-card UE combines the second data and the third data into the first data.

After the dual-card UE receives the second data and the third data, the dual-card UE combines the second data and the third data into the first data, and performs corresponding processing on the first data, so as to complete transmission of the first data.

In a communication method for a dual-card UE provided in this embodiment of the present invention, a first network side device receives an access request from a dual-card UE, and establishes a first bearer according to the access request, where the first network side device provides a service for a first card of the dual-card UE, and the first bearer is a data transmission channel between the first network side device and the first card of the dual-card UE; after the first network side device acquires association information between the first card of the dual-card UE and a second card of the dual-card UE, the first network side device establishes a second bearer according to the association information, where the second bearer is a data transmission channel between the first network side device and the second card of the dual-card UE; and the first network side device splits first data to be transmitted into second data and third data, sends the second data to the dual-card UE by using the first bearer, and sends the third data to the dual-card UE by using the second bearer, so that the dual-card UE combines the second data and the third data into the first data. According to this solution, a network side device may simultaneously deliver, after splitting data to be transmitted, split data by separately using bearers of the two cards of the dual-card UE; therefore, a communication procedure of the dual-card UE can be optimized, thereby improving the service transmission efficiency, increasing the communication efficiency, and improving user experience.

Figure 3:
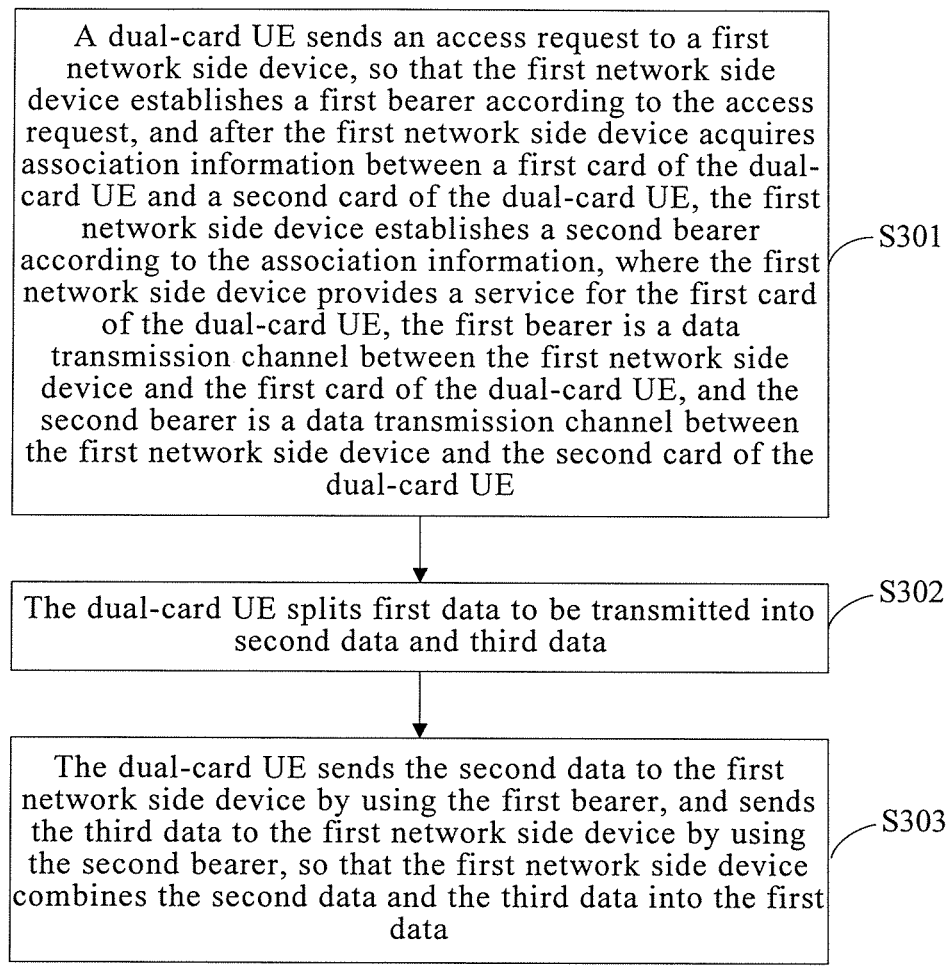
FIG. 3 is a first flowchart of another communication method for a dual-card UE according to an embodiment of the present invention.

An embodiment of the present invention provides another communication method for a dual-card UE. As shown in FIG. 3, the method, relating to the dual-card UE, may be applied to a scenario in which a dual-card dual-standby dual-pass UE sends uplink data to a network side device. The method may include the following steps:

S301. A dual-card UE sends an access request to a first network side device, so that the first network side device establishes a first bearer according to the access request, and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE.

Exemplarily, the dual-card UE is a communication terminal in which two cards are inserted. When the dual-card UE needs to access a network, the dual-card UE first sends an access request to the first network side device, so that after receiving the access request, the first network side device establishes, according to the access request, a first bearer corresponding to the first card of the dual-card UE, and after acquiring the association information between the first card of the dual-card UE and the second card of the dual-card UE, the first network side device establishes, according to the acquired association information, a second bearer corresponding to the second card of the dual-card UE, where the first bearer is the data transmission channel between the first network side device and the first card of the dual-card UE, the second bearer is the data transmission channel between the first network side device and the second card of the dual-card UE, and the first network side device provides a service for the first card of the dual-card UE.

It may be understood that establishing of the second bearer by the first network side device may be triggered by using an access request from the first card of the dual-card UE, or may be triggered by using an access request from the second card of the dual-card UE, which is not limited in the present invention.

Exemplarily, the dual-card UE may send the access request from the second card of the dual-card UE to a network side device to which the second card of the dual-card UE belongs, so that the network side device to which the second card of the dual-card UE belongs establishes a bearer of the second card of the dual-card UE for the second card of the dual-card UE, where the bearer of the second card of the dual-card UE may be from the network side device, to which the second card of the dual-card UE belongs, to the second card of the dual-card UE.

It should be noted that, before the first network side device establishes the second bearer, if the network side device to which the second card of the dual-card UE belongs has established the bearer of the second card of the dual-card UE for the second card of the dual-card UE, the first network side device needs to establish only a part of the second bearer, that is, a bearer from the first network side device to the network side device to which the second card of the dual-card UE belongs; and if the network side device to which the second card of the dual-card UE belongs has not established the bearer of the second card of the dual-card UE for the second card of the dual-card UE, the first network side device needs to establish a complete second bearer, that is, an entire bearer from the first network side device to the second card of the dual-card UE.

In this embodiment of the present invention, the association information may be information, recorded by the first card of the dual-card UE, about the second card of the dual-card UE, for example, for the first card of the dual-card UE, the association information acquired by the first network side device is the information about the second card of the dual-card UE, where the information about the second card of the dual-card UE may include an identifier of the second card of the dual-card UE, or an identifier of the second card of the dual-card UE and an address of a core network entity with which the second card of the dual-card UE is registered; and correspondingly, for the second card of the dual-card UE, association information acquired by a network side device to which the second card of the dual-card UE belongs is information about the first card of the dual-card UE, where the information about the first card of the dual-card UE may include an identifier of the first card of the dual-card UE, or an identifier of the first card of the dual-card UE and an address of a core network entity with which the first card of the dual-card UE is registered.

It should be noted that the another communication method for a dual-card UE provided in this embodiment of the present invention is exemplarily described from a perspective of the first card of the dual-card UE, and for a communication method for the second card of the dual-card UE, which is similar to a communication method for the first card of the dual-card UE, details are not described herein again.

S302. The dual-card UE splits first data to be transmitted into second data and third data.

The dual-card UE splits the first data to be transmitted into two groups of data packets: the second data and the third data, where a basis for splitting the first data by the dual-card UE may be at least one of the following: load of the first bearer, data transmission efficiency of the first bearer, load of the second bearer, and data transmission efficiency of the second bearer.

Preferably, the basis for splitting the first data by the dual-card UE may further include a network congestion status, a tariff of the first card of the dual-card UE and/or a tariff of the second card of the dual-card UE, a randomly paging card that is independently selected by the dual-card UE for initiating access to or responding to the first network side device, a transmission rate of the first data, or load of the first data, which is not limited in the present invention.

In particular, a basis for independently selecting a randomly paging card by the dual-card UE for initiating access to or responding to the first network side device may include that: it is set by using software in the dual-card UE that a specific card is preferentially used for accessing a network; or if traffic of the first card of the dual-card UE, traffic of the second card of the dual-card UE, or traffic of the first data to be transmitted is in a preset range, the dual-card UE uses a specific card for accessing the network according to an internal setting.

A person of ordinary skill in the art may understand that, in the communications field, if a source end needs to send first data to a target end, the source end needs to packetize the first data into multiple data packets, and sequentially transmit the multiple data packets to the target end. That is, the first data is a data stream that includes multiple data packets, and if the dual-card UE needs to send the first data to a target end, the dual-card UE splits, according to the foregoing splitting bases, the multiple data packets into two groups of data packets: the second data and the third data.

It should be noted that a ratio at which the first data to be transmitted is split by the dual-card UE into the two groups of data packets, namely, the second data and the third data, may be 1:9, 5:5, 0:10, or any other ratio that meets the foregoing splitting basis, which is not limited in the present invention.

Preferably, when the ratio is 0:10 or 10:0, it indicates that the dual-card UE has not split the first data but only sends the first data to the first network side device by using a preferable bearer (the first bearer or the second bearer). When the ratio is 0:10 or 10:0, the communication method for a dual-card UE provided in this embodiment of the present invention may also be applied to a dual-card single-pass UE.

S303. The dual-card UE sends the second data to the first network side device by using the first bearer, and sends the third data to the first network side device by using the second bearer, so that the first network side device combines the second data and the third data into the first data.

The dual-card UE sends the second data to the first network side device by using the first bearer, and the dual-card UE sends the third data to the first network side device by using the second bearer, so that after combining the received second data and third data into the first data, the first network side device forwards the first data, so as to complete transmission of the first data.

Figure 4:
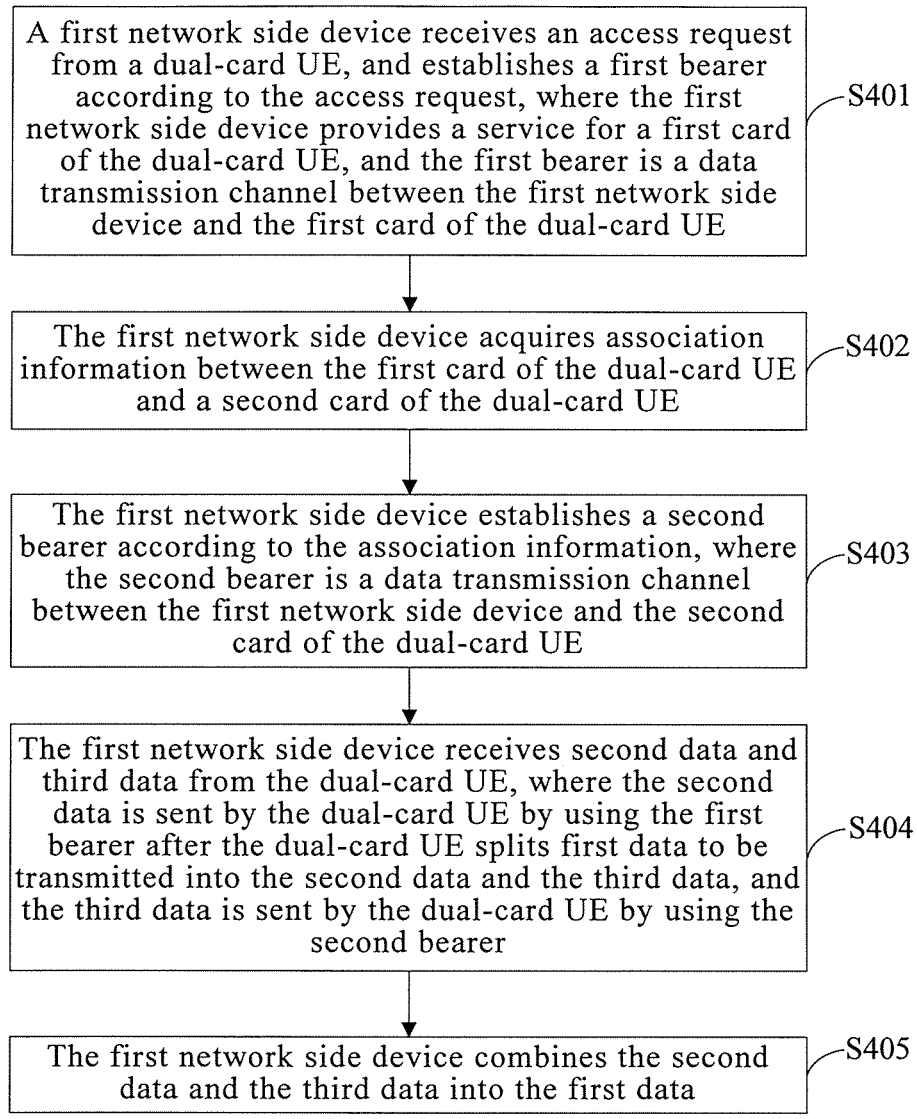
FIG. 4 is a second flowchart of another communication method for a dual-card UE according to an embodiment of the present invention.

An embodiment of the present invention further provides another communication method for a dual-card UE. As shown in FIG. 4, the method, relating to a first network side device, may be applied to a scenario in which a dual-card dual-standby dual-pass UE sends uplink data to a network side device. The method may include the following steps:

S401. A first network side device receives an access request from a dual-card UE, and establishes a first bearer according to the access request, where the first network side device provides a service for a first card of the dual-card UE, and the first bearer is a data transmission channel between the first network side device and the first card of the dual-card UE.

When the dual-card UE needs to access a network, the dual-card UE first sends an access request to the first network side device, that is, the first network side device receives the access request from the dual-card UE, and then, the first network side device establishes the first bearer for the dual-card UE according to the access request, where the first bearer is the data transmission channel between the first network side device and the first card of the dual-card UE, and the first network side device provides a service for the first card of the dual-card UE.

S402. The first network side device acquires association information between the first card of the dual-card UE and a second card of the dual-card UE.

The first network side device acquires the association information between the first card of the dual-card UE and the second card of the dual-card UE, and a specific method for acquiring the association information by the first network side device is described in detail in a subsequent embodiment.

S403. The first network side device establishes a second bearer according to the association information, where the second bearer is a data transmission channel between the first network side device and the second card of the dual-card UE.

After the first network side device receives the access request from the dual-card UE, the first network side device establishes the second bearer for the dual-card UE according to the acquired association information, where the second bearer is the data transmission channel between the first network side device and the second card of the dual-card UE.

S404. The first network side device receives second data and third data from the dual-card UE, where the second data is sent by the dual-card UE by using the first bearer after the dual-card UE splits first data to be transmitted into the second data and the third data, and the third data is sent by the dual-card UE by using the second bearer.

The first network side device receives the second data and the third data from the dual-card UE, where the second data is sent by the dual-card UE to the first network side device by using the first bearer after the dual-card UE splits the first data to be transmitted to the first network side device into two groups of data packets, namely, the second data and the third data, and the third data is sent by the dual-card UE to the first network side device by using the second bearer.

S405. The first network side device combines the second data and the third data into the first data.

After the first network side device receives the second data and the third data, the first network side device combines the second data and the third data into the first data, and forwards the first data, so as to complete transmission of the first data.

It should be noted that if the first card of the dual-card UE and the second card of the dual-card UE belong to different PLMNs, the first bearer established by the first network side device may be from the first network side device to the first card of the dual-card UE; and correspondingly, the second bearer established by the first network side device may be from the first network side device, via a network side device to which the second card of the dual-card UE belongs, to the second card of the dual-card UE.

In another communication method for a dual-card UE provided in this embodiment of the present invention, a dual-card UE sends an access request to a first network side device, so that the first network side device establishes a first bearer according to the access request; and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE; and after the dual-card UE splits first data to be transmitted into second data and third data, the dual-card UE sends the second data to the first network side device by using the first bearer, and sends the third data to the first network side device by using the second bearer, so that the first network side device combines the second data and the third data into the first data. According to this solution, the dual-card UE may simultaneously send, after splitting data to be transmitted, split data at the same time by separately using bearers of the two cards of the dual-card UE; therefore, a communication procedure of the dual-card UE can be optimized, thereby improving the service transmission efficiency, increasing the communication efficiency, and improving user experience.

Embodiment 2

Figure 5:
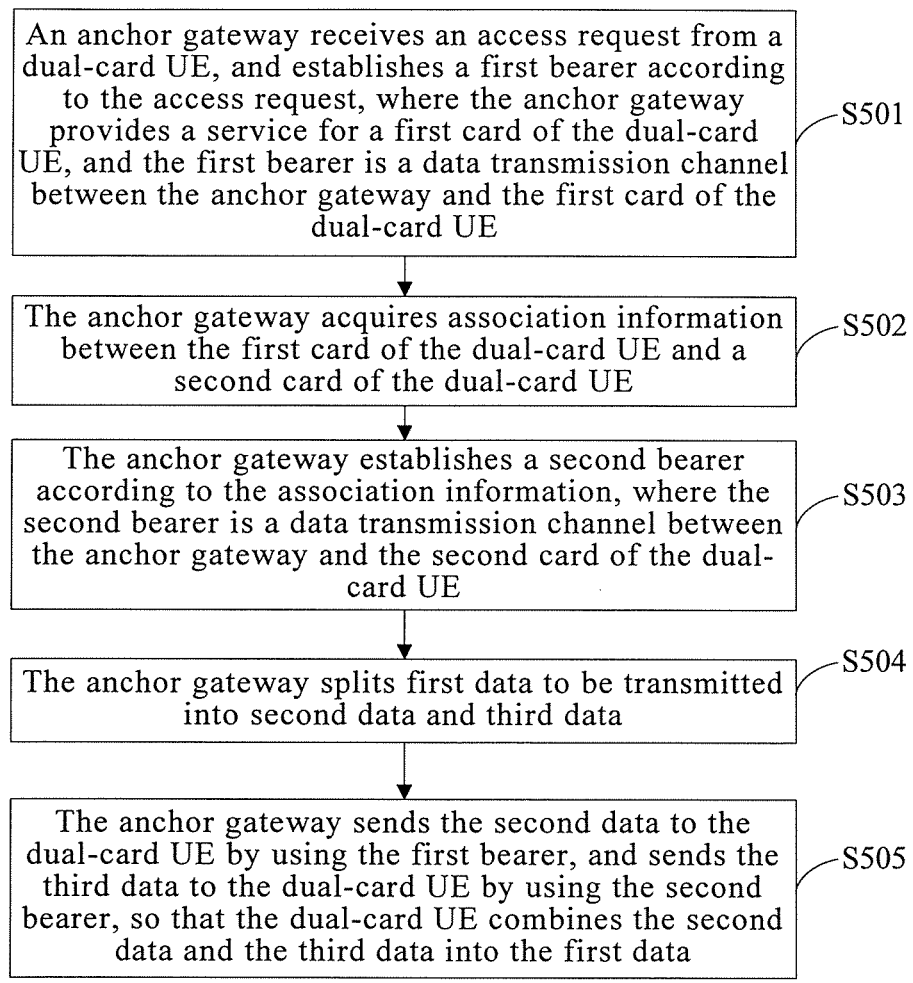
FIG. 5 is a third flowchart of a communication method for a dual-card UE according to an embodiment of the present invention.

An embodiment of the present invention provides a communication method for a dual-card UE. As shown in FIG. 5, the method, relating to a first network side device, may be applied to a scenario in which a network side device sends downlink data to a dual-card dual-standby dual-pass UE. The method in this embodiment of the present invention may be performed by an anchor gateway (the anchor gateway may include a PGW (Packet Data Network Gateway, packet data network gateway) or a GGSN (Gateway General Packet Radio Service Support Node, gateway general packet radio service support node)). The method may include the following steps:

S501. An anchor gateway receives an access request from a dual-card UE, and establishes a first bearer according to the access request, where the anchor gateway provides a service for a first card of the dual-card UE, and the first bearer is a data transmission channel between the anchor gateway and the first card of the dual-card UE.

Exemplarily, the dual-card UE is a communication terminal in which two cards are inserted. When the dual-card UE needs to access a network, the dual-card UE first sends an access request to a core network entity with which the first card of the dual-card UE is registered, so that the core network entity with which the first card of the dual-card UE is registered sends the access request to the anchor gateway, that is, the anchor gateway receives the access request; and then the anchor gateway establishes, according to the access request, a first bearer corresponding to the first card of the dual-card UE, where the first bearer is the data transmission channel between the anchor gateway and the first card of the dual-card UE, and the anchor gateway is an anchor gateway to which the first card of the dual-card UE belongs and provides a service for the first card of the dual-card UE.

S502. The anchor gateway acquires association information between the first card of the dual-card UE and a second card of the dual-card UE.

After acquiring the association information between the first card of the dual-card UE and the second card of the dual-card UE, the core network entity with which the first card of the dual-card UE is registered sends the association information to the anchor gateway. A specific method for acquiring the association information by the core network entity with which the first card of the dual-card UE is registered is described in detail in a subsequent embodiment.

In this embodiment of the present invention, the association information may be information, recorded by the first card of the dual-card UE, about the second card of the dual-card UE, for example, for the first card of the dual-card UE, association information acquired by an anchor gateway to which the first card of the dual-card UE belongs is the information about the second card of the dual-card UE, where the information about the second card of the dual-card UE may include an identifier of the second card of the dual-card UE, or an identifier of the second card of the dual-card UE and an address of a core network entity with which the second card of the dual-card UE is registered; and correspondingly, for the second card of the dual-card UE, association information acquired by a network side device to which the second card of the dual-card UE belongs is information about the first card of the dual-card UE, where the information about the first card of the dual-card UE may include an identifier of the first card of the dual-card UE, or an identifier of the first card of the dual-card UE and an address of the core network entity with which the first card of the dual-card UE is registered.

S503. The anchor gateway establishes a second bearer according to the association information, where the second bearer is a data transmission channel between the anchor gateway and the second card of the dual-card UE.

After the anchor gateway receives the access request from the dual-card UE, the anchor gateway establishes, according to the acquired association information, a second bearer corresponding to the second card of the dual-card UE, where the second bearer is the data transmission channel between the anchor gateway and the second card of the dual-card UE.

It may be understood that establishing of the second bearer by the anchor gateway may be triggered by using an access request from the first card of the dual-card UE, or may be triggered by using an access request from the second card of the dual-card UE, which is not limited in the present invention.

Exemplarily, the dual-card UE may send the access request from the second card of the dual-card UE to the core network entity with which the second card of the dual-card UE is registered, so that the core network entity with which the second card of the dual-card UE is registered sends the access request to an anchor gateway to which the second card of the dual-card UE belongs, so that the anchor gateway to which the second card of the dual-card UE belongs establishes a bearer of the second card of the dual-card UE for the second card of the dual-card UE, where the bearer of the second card of the dual-card UE may be from the anchor gateway to which the second card of the dual-card UE belongs, via the core network entity with which the second card of the dual-card UE is registered, to the second card of the dual-card UE.

It should be noted that, before the anchor gateway establishes the second bearer, if the anchor gateway to which the second card of the dual-card UE belongs has established the bearer of the second card of the dual-card UE for the second card of the dual-card UE, the anchor gateway needs to establish only a part of the second bearer, that is, a bearer from the anchor gateway to the anchor gateway to which the second card of the dual-card UE belongs; and if the anchor gateway to which the second card of the dual-card UE belongs has not established the bearer of the second card of the dual-card UE for the second card of the dual-card UE, the anchor gateway needs to establish a complete second bearer, that is, an entire bearer from the anchor gateway to the second card of the dual-card UE.

Preferably, the foregoing core network entity with which the first card of the dual-card UE is registered may include an MME (Mobility Management Entity, mobility management entity) or an SGSN (Serving General Packet Radio Service Support Node, serving general packet radio service support node), and/or the core network entity with which the second card of the dual-card UE is registered may include an MME or an SGSN.

It should be noted that the communication method for a dual-card UE provided in this embodiment of the present invention is exemplarily described from a perspective of the first card of the dual-card UE, and for a communication method for the second card of the dual-card UE, which is similar to a communication method for the first card of the dual-card UE, details are not described herein again.

S504. The anchor gateway splits first data to be transmitted into second data and third data.

The anchor gateway splits the first data to be transmitted into two groups of data packets: the second data and the third data, where a basis for splitting the first data by the anchor gateway may be at least one of the following: load of the first bearer, data transmission efficiency of the first bearer, load of the second bearer, and data transmission efficiency of the second bearer.

Preferably, the foregoing basis for splitting the first data may further include a network congestion status, a tariff of the first card of the dual-card UE and/or a tariff of the second card of the dual-card UE, a randomly paging card that is independently selected by the dual-card UE for initiating access to or responding to the first network side device, a transmission rate of the first data, or load of the first data, which is not limited in the present invention.

In particular, a basis for independently selecting a randomly paging card by the dual-card UE for initiating access to or responding to the first network side device may include that: it is set by using software in the dual-card UE that a specific card is preferentially used for accessing a network; or if traffic of the first card of the dual-card UE, traffic of the second card of the dual-card UE, or traffic of the first data to be transmitted is in a preset range, the dual-card UE uses a specific card for accessing the network according to an internal setting.

A person of ordinary skill in the art may understand that, in the communications field, if a source end needs to send first data to a target end, the source end needs to packetize the first data into multiple data packets, and sequentially transmit the multiple data packets to the target end. That is, the first data is a data stream that includes multiple data packets, and if the first network side device receives the first data, the first network side device splits, according to the foregoing splitting basis, the multiple data packets into two groups of data packets: the second data and the third data.

It should be noted that a ratio at which the first data to be transmitted is split by the anchor gateway into the two groups of data packets, namely, the second data and the third data, may be 1:9, 5:5, 0:10, or any other ratio that meets the foregoing splitting basis, which is not limited in the present invention.

Preferably, when the ratio is 0:10 or 10:0, it indicates that the anchor gateway has not split the first data but only delivers the first data to the dual-card UE by using a preferable bearer (the first bearer or the second bearer). When the ratio is 0:10 or 10:0, the communication method for a dual-card UE provided in this embodiment of the present invention may also be applied to a dual-card single-pass UE.

S505. The anchor gateway sends the second data to the dual-card UE by using the first bearer, and sends the third data to the dual-card UE by using the second bearer, so that the dual-card UE combines the second data and the third data into the first data.

The anchor gateway sends the second data to the dual-card UE by using the first bearer, and the anchor gateway sends the third data to the dual-card UE by using the second bearer, so that after combining the received second data and third data into the first data, the dual-card UE performs corresponding processing on the first data, so as to complete transmission of the first data.

It should be noted that if the first card of the dual-card UE and the second card of the dual-card UE belong to different PLMNs, the first bearer established by the anchor gateway may be from the anchor gateway, via the core network entity with which the first card of the dual-card UE is registered, to the first card of the dual-card UE; and correspondingly, the second bearer established by the anchor gateway may be from the anchor gateway, via the anchor gateway to which the second card of the dual-card UE belongs and the core network entity with which the second card of the dual-card UE is registered, to the second card of the dual-card UE.

Preferably, if the first card of the dual-card UE and the second card of the dual-card UE belong to a same PLMN, the anchor gateway to which the first card of the dual-card UE belongs and the anchor gateway to which the second card of the dual-card UE belongs may be a same anchor gateway, and the core network entity with which the first card of the dual-card UE is registered and the core network entity with which the second card of the dual-card UE is registered may be a same core network entity, or may be different core network entities.

Figure 6:
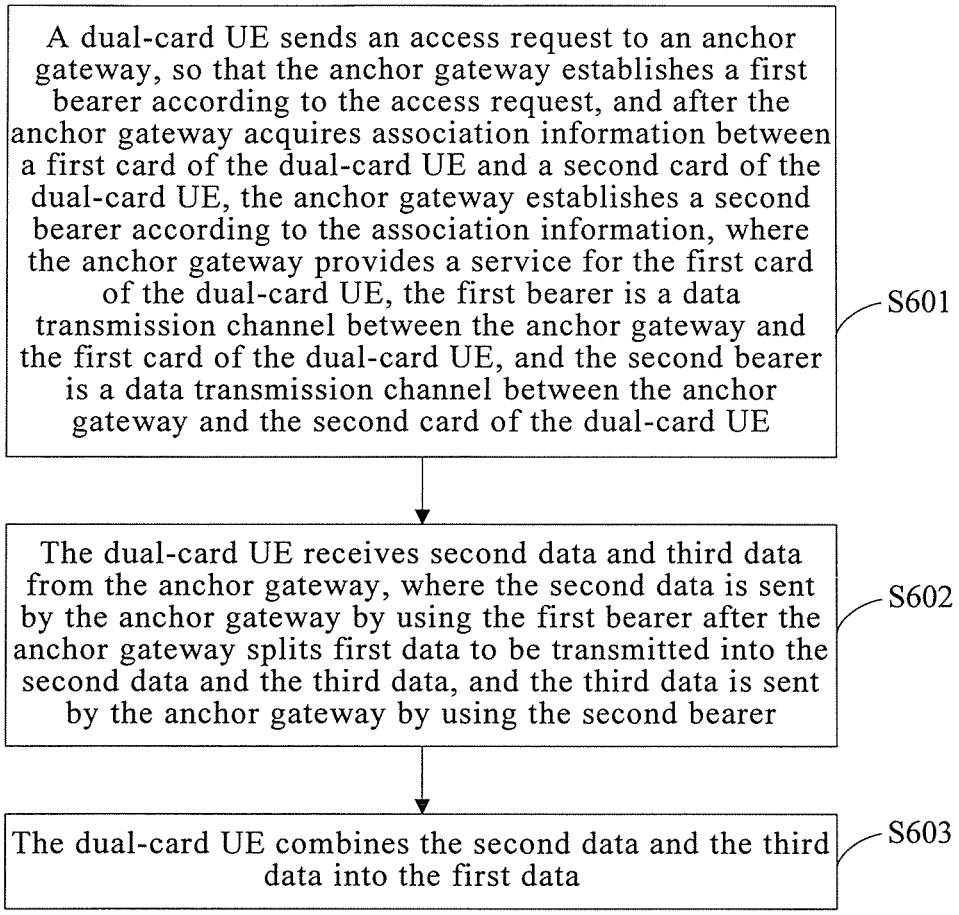
FIG. 6 is a fourth flowchart of a communication method for a dual-card UE according to an embodiment of the present invention.

An embodiment of the present invention further provides a communication method for a dual-card UE. As shown in FIG. 6, the method, relating to the dual-card UE, may be applied to a scenario in which a network side device sends downlink data to a dual-card dual-standby dual-pass UE, and corresponds to the communication method in which a first network side device includes an anchor gateway. The method in this embodiment of the present invention may be performed by the dual-card UE, and the method may include the following steps:

S601. A dual-card UE sends an access request to an anchor gateway, so that the anchor gateway establishes a first bearer according to the access request, and after the anchor gateway acquires association information between a first card of the dual-card UE and a second card of the dual-card UE, the anchor gateway establishes a second bearer according to the association information, where the anchor gateway provides a service for the first card of the dual-card UE, the first bearer is a data transmission channel between the anchor gateway and the first card of the dual-card UE, and the second bearer is a data transmission channel between the anchor gateway and the second card of the dual-card UE.

When the dual-card UE needs to access a network, the dual-card UE first sends an access request to a core network entity with which the first card of the dual-card UE is registered, so that the core network entity with which the first card of the dual-card UE is registered sends the access request to the anchor gateway, so that after receiving the access request, the anchor gateway establishes the first bearer for the dual-card UE according to the access request, and after acquiring the association information between the first card of the dual-card UE and the second card of the dual-card UE, the anchor gateway establishes the second bearer for the dual-card UE according to the acquired association information, where the first bearer is the data transmission channel between the anchor gateway and the first card of the dual-card UE, the second bearer is the data transmission channel between the anchor gateway and the second card of the dual-card UE, and the anchor gateway is an anchor gateway to which the first card of the dual-card UE belongs and provides a service for the first card of the dual-card UE.

S602. The dual-card UE receives second data and third data from the anchor gateway, where the second data is sent by the anchor gateway by using the first bearer after the anchor gateway splits first data to be transmitted into the second data and the third data, and the third data is sent by the anchor gateway by using the second bearer.

The dual-card UE receives the second data and the third data from the anchor gateway, where the second data is sent by the anchor gateway to the dual-card UE by using the first bearer after the anchor gateway splits the first data to be transmitted to the dual-card UE into two groups of data packets, namely, the second data and the third data, and the third data is sent by the anchor gateway to the dual-card UE by using the second bearer.

S603. The dual-card UE combines the second data and the third data into the first data.

After the dual-card UE receives the second data and the third data, the dual-card UE combines the second data and the third data into the first data, and performs corresponding processing on the first data, so as to complete transmission of the first data.

Figure 7:
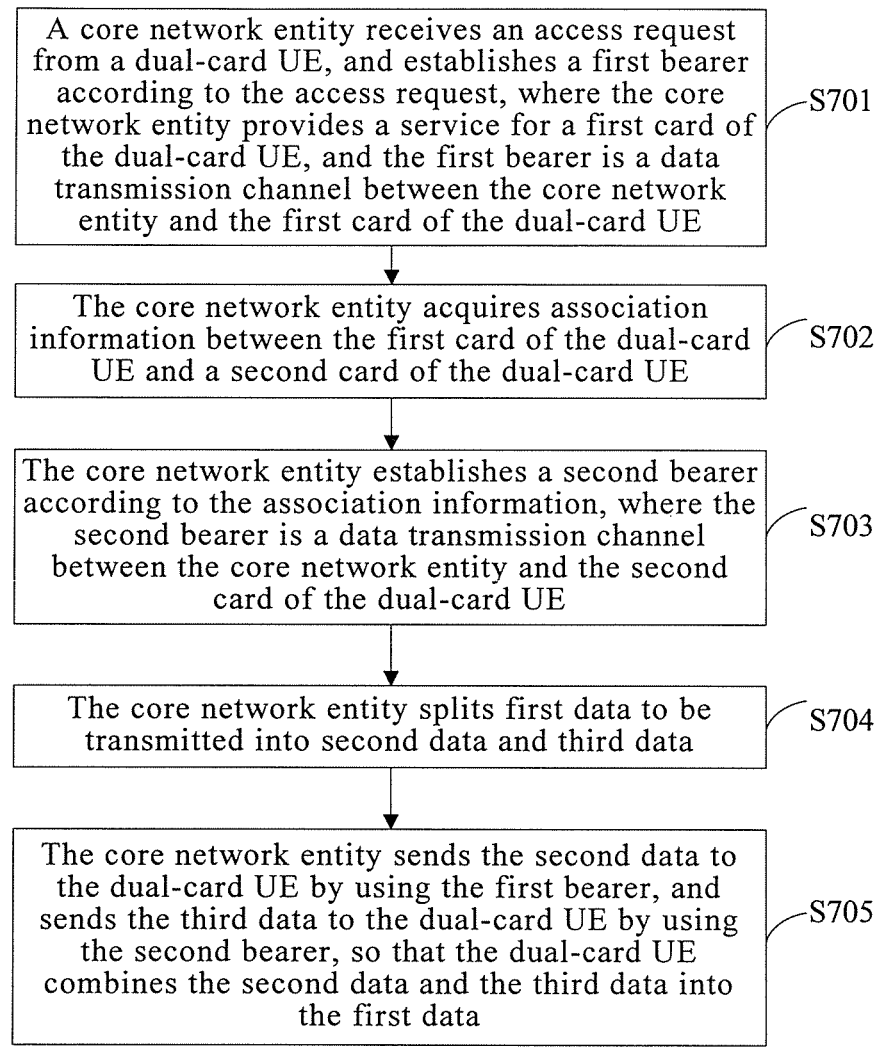
FIG. 7 is a fifth flowchart of a communication method for a dual-card UE according to an embodiment of the present invention.

An embodiment of the present invention further provides a communication method for a dual-card UE. As shown in FIG. 7, the method, relating to a first network side device, may be applied to a scenario in which a network side device sends downlink data to a dual-card dual-standby dual-pass UE. The method in this embodiment of the present invention may be performed by a core network entity (the core network entity may include an SGW (Serving Gateway, serving gateway) or an SGSN). The method may include the following steps:

S701. A core network entity receives an access request from a dual-card UE, and establishes a first bearer according to the access request, where the core network entity provides a service for a first card of the dual-card UE, and the first bearer is a data transmission channel between the core network entity and the first card of the dual-card UE.

When the dual-card UE needs to access a network, the dual-card UE first sends an access request to the core network entity, that is, the core network entity receives the access request from the dual-card UE, and then the core network entity establishes the first bearer for the dual-card UE according to the access request, where the first bearer is the data transmission channel between the core network entity and the first card of the dual-card UE, and the core network entity is a core network entity with which the first card of the dual-card UE is registered and provides a service for the first card of the dual-card UE.

S702. The core network entity acquires association information between the first card of the dual-card UE and a second card of the dual-card UE.

The core network entity acquires the association information between the first card of the dual-card UE and the second card of the dual-card UE, and a specific method for acquiring the association information by the core network entity is described in detail in a subsequent embodiment.

In this embodiment of the present invention, the association information may be information, recorded by the first card of the dual-card UE, about the second card of the dual-card UE, for example, for the first card of the dual-card UE, association information acquired by a core network entity with which the first card of the dual-card UE is registered is the information about the second card of the dual-card UE, where the information about the second card of the dual-card UE may include an identifier of the second card of the dual-card UE, or an identifier of the second card of the dual-card UE and an address of a core network entity with which the second card of the dual-card UE is registered.

S703. The core network entity establishes a second bearer according to the association information, where the second bearer is a data transmission channel between the core network entity and the second card of the dual-card UE.

After the core network entity receives the access request from the dual-card UE, the core network entity establishes the second bearer for the dual-card UE according to the acquired association information, where the second bearer is the data transmission channel between the core network entity and the second card of the dual-card UE.

It may be understood that establishing of the second bearer by the core network entity may be triggered by using an access request from the first card of the dual-card UE, or may be triggered by using an access request from the second card of the dual-card UE, which is not limited in the present invention.

Exemplarily, the dual-card UE may send the access request from the second card of the dual-card UE to the core network entity with which the second card of the dual-card UE is registered, so that the core network entity with which the second card of the dual-card UE is registered establishes a bearer of the second card of the dual-card UE for the second card of the dual-card UE according to the access request, where the bearer of the second card of the dual-card UE may be from the core network entity, with which the second card of the dual-card UE is registered, to the second card of the dual-card UE.

It should be noted that, before the core network entity establishes the second bearer, if the core network entity with which the second card of the dual-card UE is registered has established the bearer of the second card of the dual-card UE for the second card of the dual-card UE, the core network entity needs to establish only a part of the second bearer, that is, a bearer from the core network entity to the core network entity with which the second card of the dual-card UE is registered; and if the core network entity with which the second card of the dual-card UE is registered has not established the bearer of the second card of the dual-card UE for the second card of the dual-card UE, the core network entity needs to establish a complete second bearer, that is, an entire bearer from the core network entity to the second card of the dual-card UE.

S704. The core network entity splits first data to be transmitted into second data and third data.

The core network entity splits the first data to be transmitted into two groups of data packets: the second data and the third data.

It should be noted that a ratio at which the first data to be transmitted is split by the core network entity into the two groups of data packets, namely, the second data and the third data, may be 1:9, 5:5, 0:10, or any other ratio that meets the foregoing splitting basis, which is not limited in the present invention.

Preferably, when the ratio is 0:10 or 10:0, it indicates that the core network entity has not split the first data but only delivers the first data to the dual-card UE by using a preferable bearer (the first bearer or the second bearer). When the ratio is 0:10 or 10:0, the communication method for a dual-card UE provided in this embodiment of the present invention may also be applied to a dual-card single-pass UE.

S705. The core network entity sends the second data to the dual-card UE by using the first bearer, and sends the third data to the dual-card UE by using the second bearer, so that the dual-card UE combines the second data and the third data into the first data.

The core network entity sends the second data to the dual-card UE by using the first bearer, and the core network entity sends the third data to the dual-card UE by using the second bearer, so that after combining the received second data and third data into the first data, the dual-card UE performs corresponding processing on the first data, so as to complete transmission of the first data.

It should be noted that if the first card of the dual-card UE and the second card of the dual-card UE belong to different PLMNs, the first bearer established by the core network entity may be from the core network entity to the first card of the dual-card UE; and correspondingly, the second bearer established by the core network entity may be from the core network entity, via the core network entity with which the second card of the dual-card UE is registered, to the second card of the dual-card UE.

Preferably, if the first card of the dual-card UE and the second card of the dual-card UE belong to a same PLMN, the core network entity with which the first card of the dual-card UE is registered and the core network entity with which the second card of the dual-card UE is registered may be a same core network entity or may be different core network entities.

In particular, in the foregoing method for splitting the first data by the core network entity, after the first card of the dual-card UE is associated with the second card of the dual-card UE, similar to an ISR manner, once a card of the dual-card UE updates its bearer, the other card of the dual-card UE also acquires update information and executes a same bearer update procedure, so that bearers of the two cards of the dual-card UE are synchronized, that is, the first bearer and the second bearer are synchronized. The ISR manner is that bearers of two RATs (Radio Access Type, radio access type) of a UE are synchronized, and in the method for splitting the first data by the core network entity provided in this embodiment of the present invention, however, the bearers of the two cards of the dual-card UE are synchronized. When the first bearer and the second bearer are synchronized, if the first card of the dual-card UE updates the first bearer, the second card of the dual-card UE needs to simultaneously update the second bearer.

Preferably, in the foregoing method for splitting the first data by the core network entity, the first bearer and the second bearer may also not be synchronized, and may be synchronized when there is data to be delivered. When the first bearer and the second bearer are not synchronized, if the first card of the dual-card UE updates the first bearer, the second card of the dual-card UE may not need to simultaneously update the second bearer, and may update the second bearer when the second bearer needs to be used.

Figure 8:
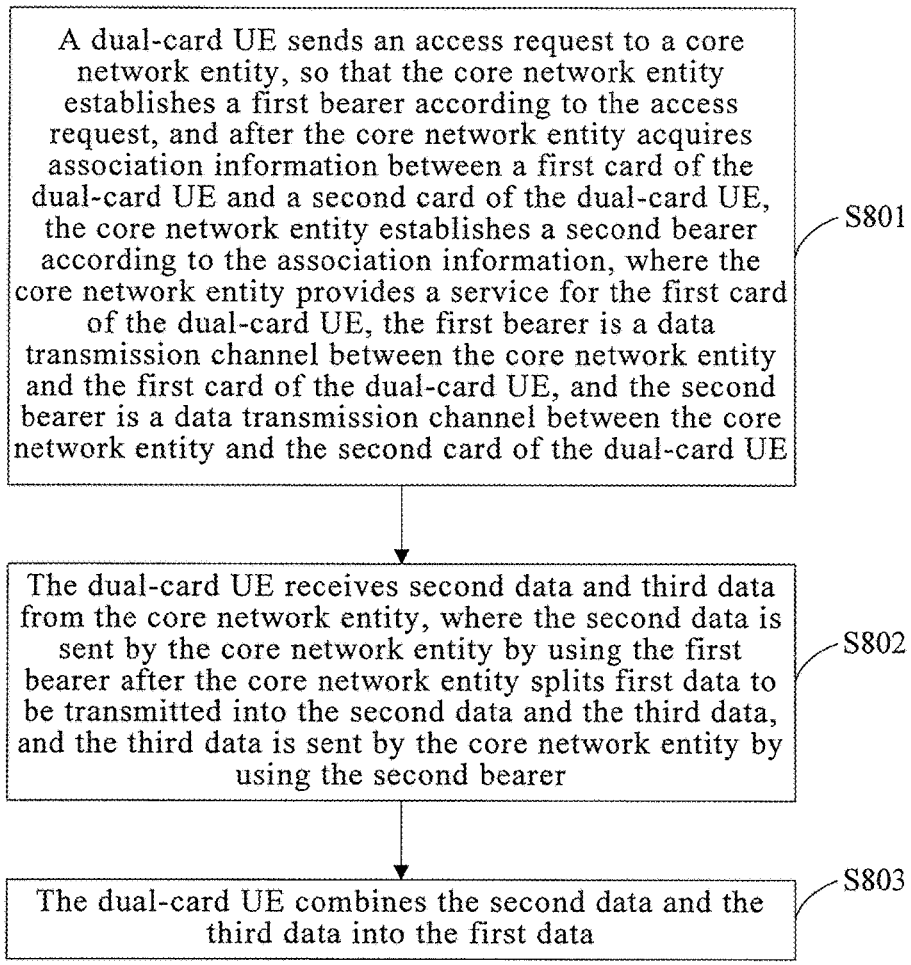
FIG. 8 is a sixth flowchart of a communication method for a dual-card UE according to an embodiment of the present invention.

An embodiment of the present invention further provides a communication method for a dual-card UE. As shown in FIG. 8, the method, relating to the dual-card UE, may be applied to a scenario in which a network side device sends downlink data to a dual-card dual-standby dual-pass UE, and corresponds to the communication method in which a first network side device includes a core network entity. The method in this embodiment of the present invention may be performed by the dual-card UE, and the method may include the following steps:

S801. A dual-card UE sends an access request to a core network entity, so that the core network entity establishes a first bearer according to the access request, and after the core network entity acquires association information between a first card of the dual-card UE and a second card of the dual-card UE, the core network entity establishes a second bearer according to the association information, where the core network entity provides a service for the first card of the dual-card UE, the first bearer is a data transmission channel between the core network entity and the first card of the dual-card UE, and the second bearer is a data transmission channel between the core network entity and the second card of the dual-card UE.

When the dual-card UE needs to access a network, the dual-card UE first sends an access request to the core network entity, so that after receiving the access request from the dual-card UE, the core network entity establishes the first bearer for the dual-card UE according to the access request, and the core network entity establishes the second bearer for the dual-card UE according to the acquired association information, where the first bearer is the data transmission channel between the core network entity and the first card of the dual-card UE, the second bearer is the data transmission channel between the core network entity and the second card of the dual-card UE, and the core network entity is a core network entity with which the first card of the dual-card UE is registered and provides a service for the first card of the dual-card UE.

S802. The dual-card UE receives second data and third data from the core network entity, where the second data is sent by the core network entity by using the first bearer after the core network entity splits first data to be transmitted into the second data and the third data, and the third data is sent by the core network entity by using the second bearer.

The dual-card UE receives the second data and the third data from the core network entity, where the second data is sent by the core network entity to the dual-card UE by using the first bearer after the core network entity splits the first data to be transmitted to the dual-card UE into two groups of data packets, that is the second data and the third data, and the third data is sent by the core network entity to the dual-card UE by using the second bearer.

S803. The dual-card UE combines the second data and the third data into the first data.

After the dual-card UE receives the second data and the third data, the dual-card UE combines the second data and the third data into the first data, and performs corresponding processing on the first data, so as to complete transmission of the first data.

In a communication method for a dual-card UE provided in this embodiment of the present invention, a core network entity receives an access request from the dual-card UE, and establishes a first bearer according to the access request, where the core network entity provides a service for a first card of the dual-card UE, and the first bearer is a data transmission channel between the core network entity and the first card of the dual-card UE; after the core network entity acquires association information between the first card of the dual-card UE and a second card of the dual-card UE, the core network entity establishes a second bearer according to the association information, where the second bearer is a data transmission channel between the core network entity and the second card of the dual-card UE; and the core network entity splits first data to be transmitted into second data and third data, sends the second data to the dual-card UE by using the first bearer, and sends the third data to the dual-card UE by using the second bearer, so that the dual-card UE combines the second data and the third data into the first data. According to this solution, in a condition in which the two cards of the dual-card UE are associated with each other, a network side device may deliver, after splitting data to be transmitted, that is, data that needs to be sent to the dual-card UE, split data at the same time by separately using bearers of the two cards of the dual-card UE; therefore, a communication procedure of the dual-card UE can be optimized, thereby improving the service transmission efficiency, increasing the communication efficiency, and improving user experience.

Figure 9:
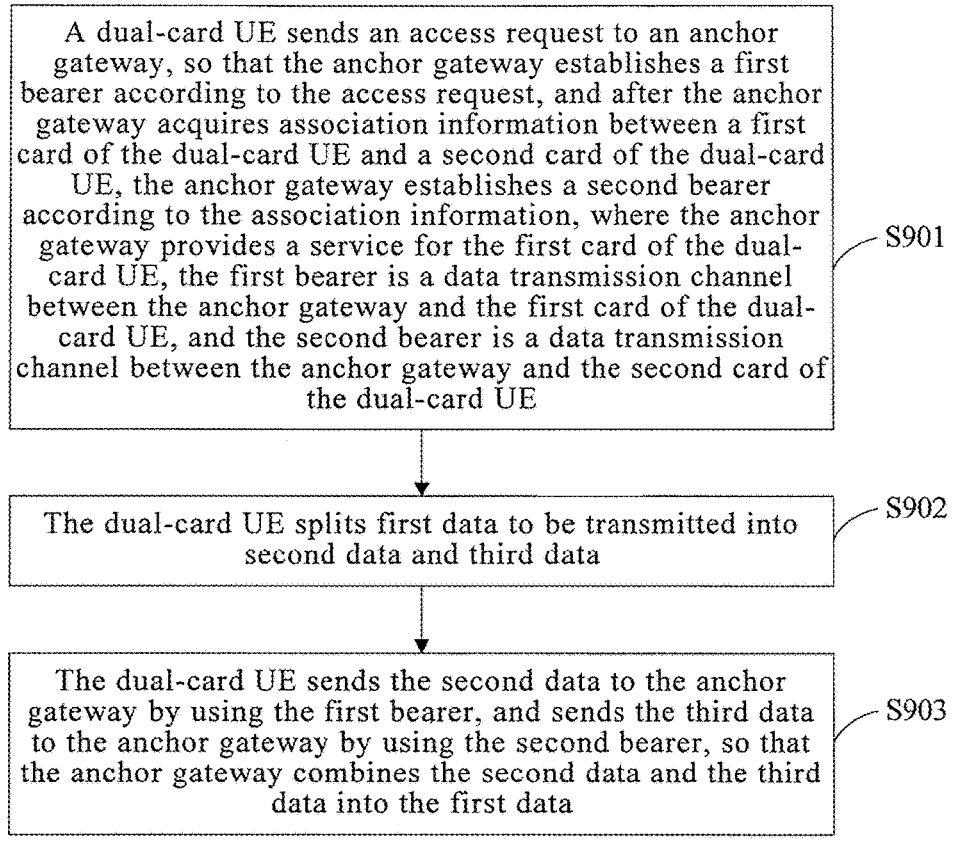
FIG. 9 is a third flowchart of another communication method for a dual-card UE according to an embodiment of the present invention.

An embodiment of the present invention provides another communication method for a dual-card UE. As shown in FIG. 9, the method, relating to the dual-card UE, may be applied to a scenario in which a dual-card dual-standby dual-pass UE sends uplink data to a network side device, and corresponds to the communication method in which a first network side device includes an anchor gateway (the anchor gateway may include a PGW or a GGSN). The method in this embodiment of the present invention may be performed by the dual-card UE, and the method may include the following steps:

S901. A dual-card UE sends an access request to an anchor gateway, so that the anchor gateway establishes a first bearer according to the access request, and after the anchor gateway acquires association information between a first card of the dual-card UE and a second card of the dual-card UE, the anchor gateway establishes a second bearer according to the association information, where the anchor gateway provides a service for the first card of the dual-card UE, the first bearer is a data transmission channel between the anchor gateway and the first card of the dual-card UE, and the second bearer is a data transmission channel between the anchor gateway and the second card of the dual-card UE.

Exemplarily, the dual-card UE is a communication terminal in which two cards are inserted. When the dual-card UE needs to access a network, the dual-card UE first sends an access request to a core network entity with which the first card of the dual-card UE is registered, so that the core network entity with which the first card of the dual-card UE is registered sends the access request to the anchor gateway, so that after receiving the access request, the anchor gateway establishes, according to the access request, a first bearer corresponding to the first card of the dual-card UE, and after acquiring the association information between the first card of the dual-card UE and the second card of the dual-card UE, the anchor gateway establishes, according to the acquired association information, a second bearer corresponding to the second card of the dual-card UE, where the first bearer is the data transmission channel between the anchor gateway and the first card of the dual-card UE, the second bearer is the data transmission channel between the anchor gateway and the second card of the dual-card UE, and the anchor gateway is an anchor gateway to which the first card of the dual-card UE belongs and provides a service for the first card of the dual-card UE.

It may be understood that establishing of the second bearer by the anchor gateway may be triggered by using an access request from the first card of the dual-card UE, or may be triggered by using an access request from the second card of the dual-card UE, which is not limited in the present invention.

Exemplarily, the dual-card UE may send the access request from the second card of the dual-card UE to a core network entity with which the second card of the dual-card UE is registered, so that the core network entity with which the second card of the dual-card UE is registered sends the access request to an anchor gateway to which the second card of the dual-card UE belongs, so that the anchor gateway to which the second card of the dual-card UE belongs establishes a bearer of the second card of the dual-card UE for the second card of the dual-card UE, where the bearer of the second card of the dual-card UE may be from the anchor gateway to which the second card of the dual-card UE belongs, via the core network entity with which the second card of the dual-card UE is registered, to the second card of the dual-card UE.

It should be noted that, before the anchor gateway establishes the second bearer, if the anchor gateway to which the second card of the dual-card UE belongs has established the bearer of the second card of the dual-card UE for the second card of the dual-card UE, the anchor gateway needs to establish only a part of the second bearer, that is, a bearer from the anchor gateway to the anchor gateway to which the second card of the dual-card UE belongs; and if the anchor gateway to which the second card of the dual-card UE belongs has not established the bearer of the second card of the dual-card UE for the second card of the dual-card UE, the anchor gateway needs to establish a complete second bearer, that is, an entire bearer from the anchor gateway to the second card of the dual-card UE.

Preferably, the foregoing core network entity with which the first card of the dual-card UE is registered may include an MME or an SGSN, and/or the core network entity with which the second card of the dual-card UE is registered may include an MME or an SGSN.

In this embodiment of the present invention, the association information may be information, recorded by the first card of the dual-card UE, about the second card of the dual-card UE, for example, for the first card of the dual-card UE, association information acquired by an anchor gateway to which the first card of the dual-card UE belongs is the information about the second card of the dual-card UE, where the information about the second card of the dual-card UE may include an identifier of the second card of the dual-card UE, or an identifier of the second card of the dual-card UE and an address of a core network entity with which the second card of the dual-card UE is registered; and correspondingly, for the second card of the dual-card UE, association information acquired by a network side device to which the second card of the dual-card UE belongs is information about the first card of the dual-card UE, where the information about the first card of the dual-card UE may include an identifier of the first card of the dual-card UE, or an identifier of the first card of the dual-card UE and an address of a core network entity with which the first card of the dual-card UE is registered.

It should be noted that the another communication method for a dual-card UE provided in this embodiment of the present invention is exemplarily described from a perspective of the first card of the dual-card UE, and for a communication method for the second card of the dual-card UE, which is similar to a communication method for the first card of the dual-card UE, details are not described herein again.

S902. The dual-card UE splits first data to be transmitted into second data and third data.

The dual-card UE splits the first data to be transmitted into two groups of data packets: the second data and the third data, where a basis for splitting the first data by the dual-card UE may be at least one of the following: load of the first bearer, data transmission efficiency of the first bearer, load of the second bearer, and data transmission efficiency of the second bearer.

Preferably, the basis for splitting the first data by the dual-card UE may further include a network congestion status, a tariff of the first card of the dual-card UE and/or a tariff of the second card of the dual-card UE, a randomly paging card that is independently selected by the dual-card UE for initiating access to or responding to the first network side device, a transmission rate of the first data, or load of the first data, which is not limited in the present invention.

In particular, a basis for independently selecting a randomly paging card by the dual-card UE for initiating access to or responding to the first network side device may include that: it is set by using software in the dual-card UE that a specific card is preferentially used for accessing a network; or if traffic of the first card of the dual-card UE, traffic of the second card of the dual-card UE, or traffic of the first data to be transmitted is in a preset range, the dual-card UE uses a specific card for accessing the network according to an internal setting.

A person of ordinary skill in the art may understand that, in the communications field, if a source end needs to send first data to a target end, the source end needs to packetize the first data into multiple data packets, and sequentially transmit the multiple data packets to the target end. That is, the first data is a data stream that includes multiple data packets, and if the dual-card UE needs to send the first data to a target end, the dual-card UE splits, according to the foregoing splitting bases, the multiple data packets into two groups of data packets: the second data and the third data.

It should be noted that a ratio at which the first data to be transmitted is split by the dual-card UE into the two groups of data packets, namely, the second data and the third data, may be 1:9, 5:5, 0:10, or any other ratio that meets the foregoing splitting basis, which is not limited in the present invention.

Preferably, when the ratio is 0:10 or 10:0, it indicates that the dual-card UE has not split the first data but only sends the first data to the anchor gateway by using a preferable bearer (the first bearer or the second bearer). When the ratio is 0:10 or 10:0, the communication method for a dual-card UE provided in this embodiment of the present invention may also be applied to a dual-card single-pass UE.

S903. The dual-card UE sends the second data to the anchor gateway by using the first bearer, and sends the third data to the anchor gateway by using the second bearer, so that the anchor gateway combines the second data and the third data into the first data.

The dual-card UE sends the second data to the anchor gateway by using the first bearer, and the dual-card UE sends the third data to the anchor gateway by using the second bearer, so that after combining the received second data and third data into the first data, the anchor gateway forwards the first data, so as to complete transmission of the first data.

Figure 10:
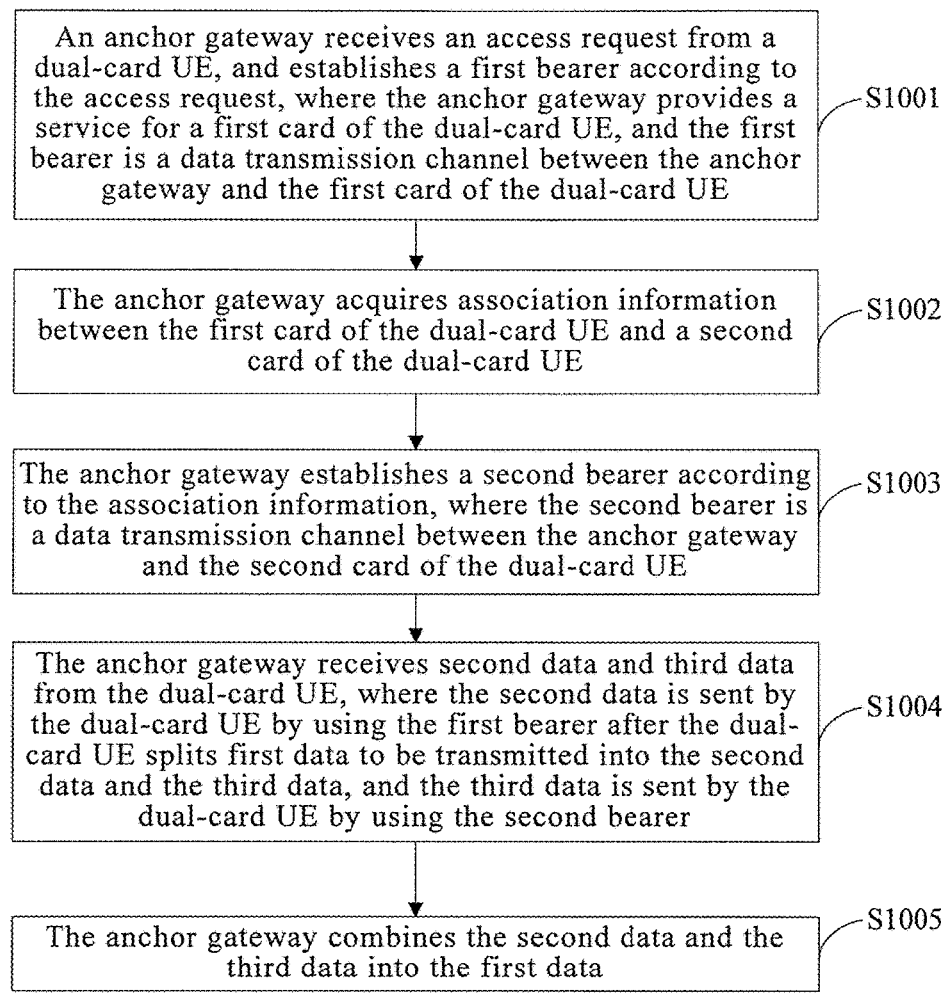
FIG. 10 is a fourth flowchart of another communication method for a dual-card UE according to an embodiment of the present invention.

An embodiment of the present invention further provides another communication method for a dual-card UE. As shown in FIG. 10, the method, relating to a first network side device, may be applied to a scenario in which a dual-card dual-standby dual-pass UE sends uplink data to a network side device. The method in this embodiment of the present invention may be performed by an anchor gateway (the anchor gateway may include a PGW or a GGSN). The method may include the following steps:

S1001. An anchor gateway receives an access request from a dual-card UE, and establishes a first bearer according to the access request, where the anchor gateway provides a service for a first card of the dual-card UE, and the first bearer is a data transmission channel between the anchor gateway and the first card of the dual-card UE.

When the dual-card UE needs to access a network, the dual-card UE first sends an access request to a core network entity with which the first card of the dual-card UE is registered, so that the core network entity with which the first card of the dual-card UE is registered sends the access request to the anchor gateway, that is, the anchor gateway receives the access request from the dual-card UE; and then the anchor gateway establishes the first bearer for the dual-card UE according to the access request, where the first bearer is the data transmission channel between the anchor gateway and the first card of the dual-card UE, and the anchor gateway is an anchor gateway to which the first card of the dual-card UE belongs and provides a service for the first card of the dual-card UE.

S1002. The anchor gateway acquires association information between the first card of the dual-card UE and a second card of the dual-card UE.

After acquiring the association information between the first card of the dual-card UE and the second card of the dual-card UE, the core network entity with which the first card of the dual-card UE is registered sends the association information to the anchor gateway. A specific method for acquiring the association information by the core network entity with which the first card of the dual-card UE is registered is described in detail in a subsequent embodiment.

S1003. The anchor gateway establishes a second bearer according to the association information, where the second bearer is a data transmission channel between the anchor gateway and the second card of the dual-card UE.

After the anchor gateway receives the access request from the dual-card UE, the anchor gateway establishes the second bearer for the dual-card UE according to the acquired association information, where the second bearer is the data transmission channel between the anchor gateway and the second card of the dual-card UE.

S1004. The anchor gateway receives second data and third data from the dual-card UE, where the second data is sent by the dual-card UE by using the first bearer after the dual-card UE splits first data to be transmitted into the second data and the third data, and the third data is sent by the dual-card UE by using the second bearer.

The anchor gateway receives the second data and the third data from the dual-card UE, where the second data is sent by the dual-card UE to the anchor gateway by using the first bearer after the dual-card UE splits the first data to be transmitted to the first network side device into two groups of data packets, namely, the second data and the third data, and the third data is sent by the dual-card UE to the anchor gateway by using the second bearer.

S1005. The anchor gateway combines the second data and the third data into the first data.

After the anchor gateway receives the second data and the third data, the anchor gateway combines the second data and the third data into the first data, and forwards the first data, so as to complete transmission of the first data.

It should be noted that if the first card of the dual-card UE and the second card of the dual-card UE belong to different PLMNs, the first bearer established by the anchor gateway may be from the anchor gateway, via the core network entity with which the first card of the dual-card UE is registered, to the first card of the dual-card UE; and correspondingly, the second bearer established by the anchor gateway may be from the anchor gateway, via an anchor gateway to which the second card of the dual-card UE belongs and a core network entity with which the second card of the dual-card UE is registered, to the second card of the dual-card UE.

Preferably, if the first card of the dual-card UE and the second card of the dual-card UE belong to a same PLMN, the anchor gateway to which the first card of the dual-card UE belongs and the anchor gateway to which the second card of the dual-card UE belongs may be a same anchor gateway, and the core network entity with which the first card of the dual-card UE is registered and the core network entity with which the second card of the dual-card UE is registered may be a same core network entity, or may be different core network entities.

Figure 11:
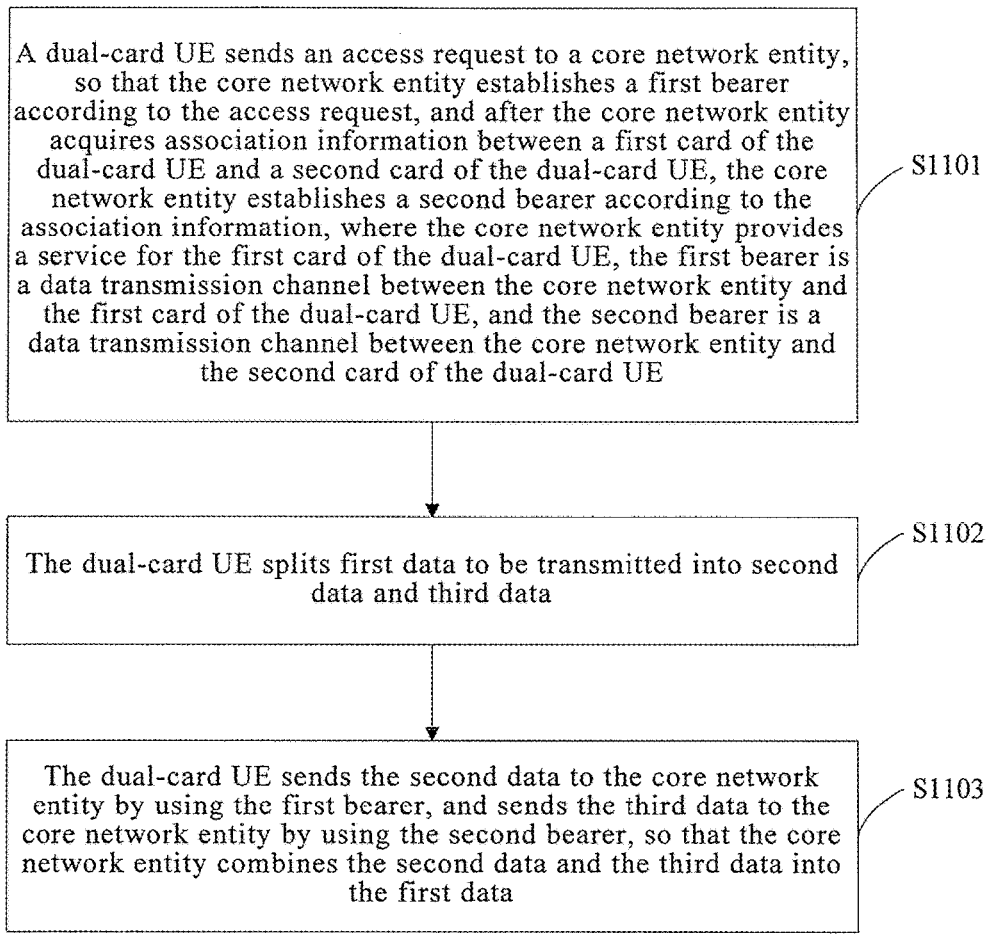
FIG. 11 is a fifth flowchart of another communication method for a dual-card UE according to an embodiment of the present invention.

An embodiment of the present invention further provides another communication method for a dual-card UE. As shown in FIG. 11, the method, relating to the dual-card UE, may be applied to a scenario in which a dual-card dual-standby dual-pass UE sends uplink data to a network side device, and corresponds to the communication method in which a first network side device includes a core network entity (the core network entity may include an SGW or an SGSN). The method in this embodiment of the present invention may be performed by the dual-card UE, and the method may include the following steps:

S1101. A dual-card UE sends an access request to a core network entity, so that the core network entity establishes a first bearer according to the access request, and after the core network entity acquires association information between a first card of the dual-card UE and a second card of the dual-card UE, the core network entity establishes a second bearer according to the association information, where the core network entity provides a service for the first card of the dual-card UE, the first bearer is a data transmission channel between the core network entity and the first card of the dual-card UE, and the second bearer is a data transmission channel between the core network entity and the second card of the dual-card UE.

When the dual-card UE needs to access a network, the dual-card UE first sends an access request to the core network entity, so that after receiving the access request from the dual-card UE, the core network entity establishes the first bearer according to the access request, and the core network entity establishes the second bearer according to the acquired association information, where the core network entity is a core network entity with which the first card of the dual-card UE is registered and provides a service for the first card of the dual-card UE, the first bearer is the data transmission channel between the core network entity and the first card of the dual-card UE, and the second bearer is the data transmission channel between the core network entity and the second card of the dual-card UE.

It may be understood that establishing of the second bearer by the core network entity may be triggered by using an access request from the first card of the dual-card UE, or may be triggered by using an access request from the second card of the dual-card UE, which is not limited in the present invention.

Exemplarily, the dual-card UE may send the access request from the second card of the dual-card UE to a core network entity with which the second card of the dual-card UE is registered, so that the core network entity with which the second card of the dual-card UE is registered establishes a bearer of the second card of the dual-card UE for the second card of the dual-card UE, where the bearer of the second card of the dual-card UE may be from the core network entity, with which the second card of the dual-card UE is registered, to the second card of the dual-card UE.

It should be noted that, before the core network entity establishes the second bearer, if the core network entity with which the second card of the dual-card UE is registered has established the bearer of the second card of the dual-card UE for the second card of the dual-card UE, the core network entity needs to establish only a part of the second bearer, that is, a bearer from the core network entity to the core network entity with which the second card of the dual-card UE is registered; and if the core network entity with which the second card of the dual-card UE is registered has not established the bearer of the second card of the dual-card UE for the second card of the dual-card UE, the core network entity needs to establish a complete second bearer, that is, an entire bearer from the core network entity to the second card of the dual-card UE.

S1102. The dual-card UE splits first data to be transmitted into second data and third data.

The dual-card UE splits the first data to be transmitted into two groups of data packets: the second data and the third data.

S1103. The dual-card UE sends the second data to the core network entity by using the first bearer, and sends the third data to the core network entity by using the second bearer, so that the core network entity combines the second data and the third data into the first data.

The dual-card UE sends the second data to the core network entity by using the first bearer, and the dual-card UE sends the third data to the core network entity by using the second bearer, so that after combining the received second data and third data into the first data, the core network entity forwards the first data, so as to complete transmission of the first data.

In particular, in the foregoing method for splitting the first data by the dual-card UE and combining, by the core network entity, the second data and the third data that are obtained by splitting, after the first card of the dual-card UE is associated with the second card of the dual-card UE, similar to an ISR manner, once a card of the dual-card UE updates its bearer, the other card of the dual-card UE also acquires update information and executes a same bearer update procedure, so that bearers of the two cards of the dual-card UE are synchronized, that is, the first bearer and the second bearer are synchronized. The ISR manner is that bearers of two RATs of a UE are synchronized, and in the method for splitting the first data by the dual-card UE and combining, by the core network entity, the second data and the third data that are obtained by splitting provided in this embodiment of the present invention, the bearers of the two cards of the dual-card UE are synchronized. When the first bearer and the second bearer are synchronized, if the first card of the dual-card UE updates the first bearer, the second card of the dual-card UE needs to simultaneously update the second bearer.

Preferably, in the foregoing method for splitting the first data by the dual-card UE and combining, by the core network entity, the second data and the third data that are obtained by splitting, the first bearer and the second bearer may also not be synchronized, and may be synchronized when there is data to be delivered. When the first bearer and the second bearer are not synchronized, if the first card of the dual-card UE updates the first bearer, the second card of the dual-card UE may not need to simultaneously update the second bearer, and may update the second bearer when the second bearer needs to be used.

Figure 12:
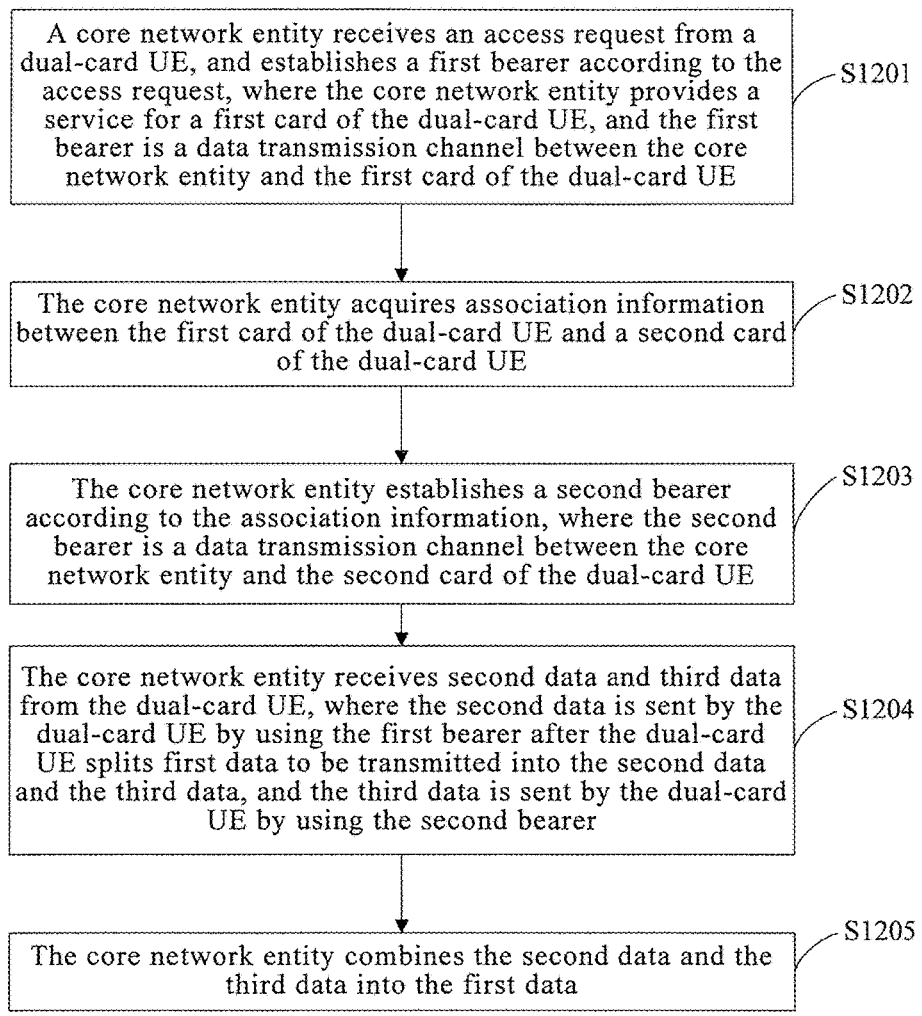
FIG. 12 is a sixth flowchart of another communication method for a dual-card UE according to an embodiment of the present invention.

An embodiment of the present invention further provides another communication method for a dual-card UE. As shown in FIG. 12, the method, relating to a first network side device, may be applied to a scenario in which a dual-card dual-standby dual-pass UE sends uplink data to a network side device. The method in this embodiment of the present invention may be performed by a core network entity (the core network entity may include an SGW or an SGSN). The method may include the following steps:

S1201. A core network entity receives an access request from a dual-card UE, and establishes a first bearer according to the access request, where the core network entity provides a service for a first card of the dual-card UE, and the first bearer is a data transmission channel between the core network entity and the first card of the dual-card UE.

When the dual-card UE needs to access a network, the dual-card UE first sends an access request to the core network entity, that is, the core network entity receives the access request from the dual-card UE, and then the core network entity establishes the first bearer for the dual-card UE according to the access request, where the first bearer is the data transmission channel between the core network entity and the first card of the dual-card UE, and the core network entity is a core network entity with which the first card of the dual-card UE is registered and provides a service for the first card of the dual-card UE.

S1202. The core network entity acquires association information between the first card of the dual-card UE and a second card of the dual-card UE.

The core network entity acquires the association information between the first card of the dual-card UE and the second card of the dual-card UE, and a specific method for acquiring the association information by the core network entity is described in detail in a subsequent embodiment.

S1203. The core network entity establishes a second bearer according to the association information, where the second bearer is a data transmission channel between the core network entity and the second card of the dual-card UE.

After the core network entity receives the access request from the dual-card UE, the core network entity establishes the second bearer for the dual-card UE according to the acquired association information, where the second bearer is the data transmission channel between the core network entity and the second card of the dual-card UE.

S1204. The core network entity receives second data and third data from the dual-card UE, where the second data is sent by the dual-card UE by using the first bearer after the dual-card UE splits first data to be transmitted into the second data and the third data, and the third data is sent by the dual-card UE by using the second bearer.

The core network entity receives the second data and the third data from the dual-card UE, where the second data is sent by the dual-card UE to the core network entity by using the first bearer after the dual-card UE splits the first data to be transmitted to the first network side device into two groups of data packets, namely, the second data and the third data, and the third data is sent by the dual-card UE to the core network entity by using the second bearer.

S1205. The core network entity combines the second data and the third data into the first data.

After the core network entity receives the second data and the third data, the core network entity combines the second data and the third data into the first data, and forwards the first data, so as to complete transmission of the first data.

It should be noted that if the first card of the dual-card UE and the second card of the dual-card UE belong to different PLMNs, the first bearer established by the core network entity may be from the core network entity to the first card of the dual-card UE; and correspondingly, the second bearer established by the core network entity may be from the core network entity, via a core network entity with which the second card of the dual-card UE is registered, to the second card of the dual-card UE.

Preferably, if the first card of the dual-card UE and the second card of the dual-card UE belong to a same PLMN, the core network entity with which the first card of the dual-card UE is registered and the core network entity with which the second card of the dual-card UE is registered may be a same core network entity or may be different core network entities.

In another communication method for a dual-card UE provided in this embodiment of the present invention, the dual-card UE sends an access request to a first network side device, so that the first network side device establishes a first bearer according to the access request; and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE; and after the dual-card UE splits first data to be transmitted into second data and third data, the dual-card UE sends the second data to the first network side device by using the first bearer, and sends the third data to the first network side device by using the second bearer, so that the first network side device combines the second data and the third data into the first data. According to this solution, in a condition in which the two cards of the dual-card UE are associated with each other, after splitting data to be transmitted, that is, data that needs to be sent to a network side device, the dual-card UE may send split data at the same time by separately using bearers of the two cards of the dual-card UE; therefore, a communication procedure of the dual-card UE can be optimized, thereby improving the service transmission efficiency, increasing the communication efficiency, and improving user experience.

Embodiment 3

Figure 13:
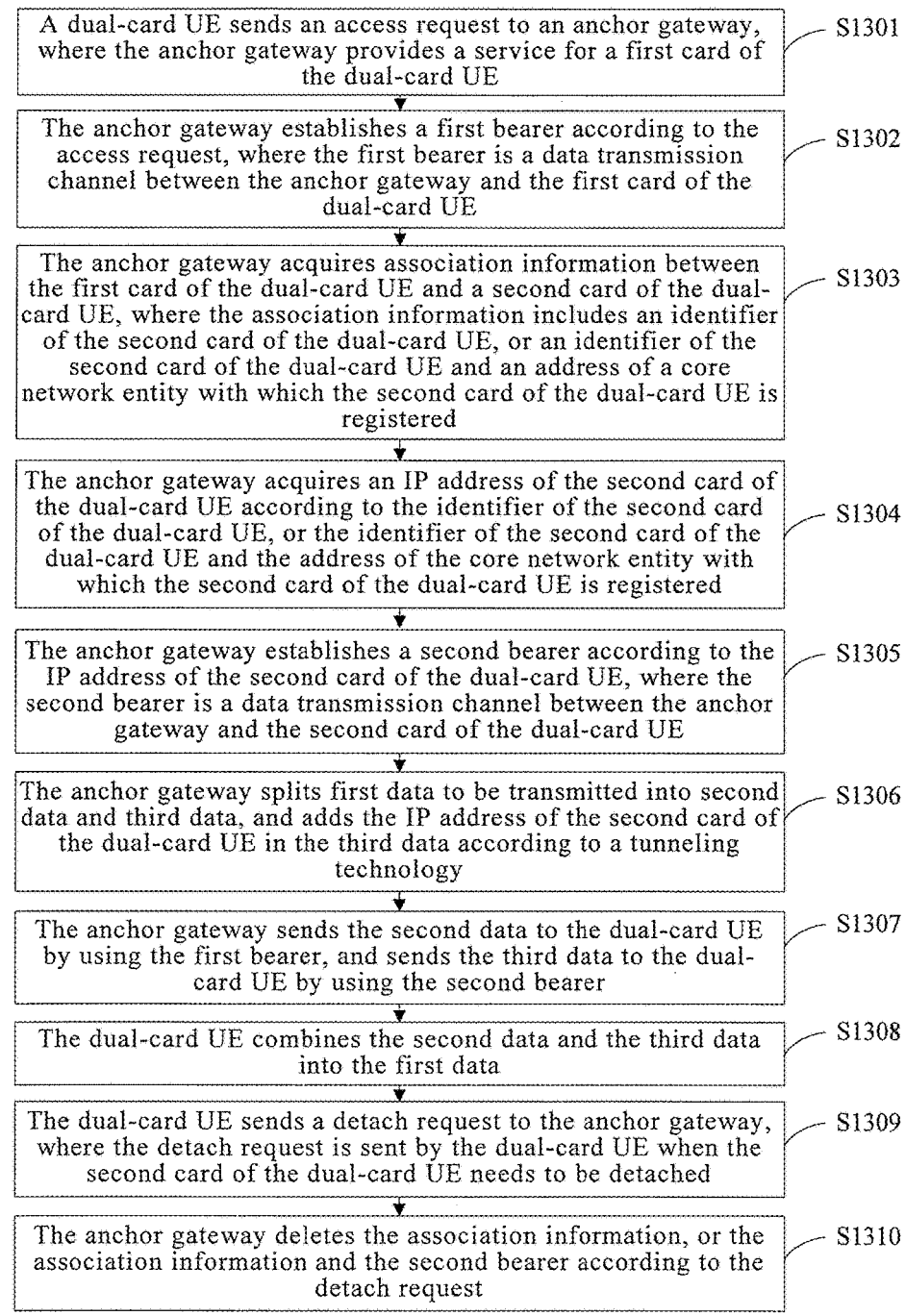
FIG. 13 is a seventh flowchart of a communication method for a dual-card UE according to an embodiment of the present invention.

An embodiment of the present invention provides a communication method for a dual-card UE, and the method, as shown in FIG. 13, may be applied to a scenario in which a network side device sends downlink data to a dual-card dual-standby dual-pass UE. A first network side device involved in the method may include an anchor gateway (the anchor gateway may include a PGW or a GGSN). The method may include the following steps:

S1301. A dual-card UE sends an access request to an anchor gateway, where the anchor gateway provides a service for a first card of the dual-card UE.

Exemplarily, the dual-card UE is a communication terminal in which two cards are inserted. When the dual-card UE needs to access a network, the dual-card UE first sends an access request to a core network entity with which the first card of the dual-card UE is registered, so that a core network entity of the dual-card UE sends the access request to the anchor gateway, where the anchor gateway is an anchor gateway to which the first card of the dual-card UE belongs and provides a service for the first card of the dual-card UE.

S1302. The anchor gateway establishes a first bearer according to the access request, where the first bearer is a data transmission channel between the anchor gateway and the first card of the dual-card UE.

After the anchor gateway receives the access request from the dual-card UE, the anchor gateway establishes the first bearer for the dual-card UE according to the access request, where the first bearer is the data transmission channel between the anchor gateway and the first card of the dual-card UE.

S1303. The anchor gateway acquires association information between the first card of the dual-card UE and a second card of the dual-card UE, where the association information includes an identifier of the second card of the dual-card UE, or an identifier of the second card of the dual-card UE and an address of a core network entity with which the second card of the dual-card UE is registered.

After the core network entity with which the first card of the dual-card UE is registered acquires the association information between the first card of the dual-card UE and the second card of the dual-card UE, the core network entity sends the association information to the anchor gateway. The anchor gateway establishes a second bearer for the dual-card UE according to the acquired association information, where the second bearer is a data transmission channel between the anchor gateway and the second card of the dual-card UE.

It may be understood that establishing of the second bearer by the anchor gateway may be triggered by using an access request from the first card of the dual-card UE, or may be triggered by using an access request from the second card of the dual-card UE, which is not limited in the present invention.

In this embodiment of the present invention, the association information may be information, recorded by the first card of the dual-card UE, about the second card of the dual-card UE, for example, for the first card of the dual-card UE, the association information acquired by the anchor gateway to which the first card of the dual-card UE belongs is the information about the second card of the dual-card UE, where the information about the second card of the dual-card UE may include an identifier of the second card of the dual-card UE, or an identifier of the second card of the dual-card UE and an address of the core network entity with which the second card of the dual-card UE is registered; and correspondingly, for the second card of the dual-card UE, association information acquired by a network side device to which the second card of the dual-card UE belongs is information about the first card of the dual-card UE, where the information about the first card of the dual-card UE may include an identifier of the first card of the dual-card UE, or an identifier of the first card of the dual-card UE and an address of a core network entity with which the first card of the dual-card UE is registered.

Preferably, the identifier of the first card of the dual-card UE may be an IMSI (International Mobile Subscriber Identity, international mobile subscriber identity) of the first card of the dual-card UE or a TMSI (Temporary Mobile Subscriber Identity, temporary mobile subscriber identity) of the first card of the dual-card UE, and/or the identifier of the second card of the dual-card UE may be an IMSI of the second card of the dual-card UE or a TMSI of the second card of the dual-card UE.

It should be noted that the communication method for a dual-card UE provided in this embodiment of the present invention is exemplarily described from a perspective of the first card of the dual-card UE, and for a communication method for the second card of the dual-card UE, which is similar to a communication method for the first card of the dual-card UE, details are not described herein again.

Specifically, a method for acquiring the association information by the core network entity with which the first card of the dual-card UE is registered may be either of the following:

(1) The core network entity with which the first card of the dual-card UE is registered receives, from an HSS (Home Subscriber Server, home subscriber server), subscription information of the first card of the dual-card UE, and acquires the association information in the subscription information of the first card of the dual-card UE.

(2) The core network entity with which the first card of the dual-card UE is registered receives an access request from the first card of the dual-card UE, and acquires the association information according to the access request, where the access request carries the association information.

S1304. The anchor gateway acquires an IP (Internet Protocol, Internet Protocol) address of the second card of the dual-card UE according to the identifier of the second card of the dual-card UE, or the identifier of the second card of the dual-card UE and the address of the core network entity with which the second card of the dual-card UE is registered.

If the association information includes the identifier of the second card of the dual-card UE, the core network entity with which the first card of the dual-card UE is registered finds, according to the identifier of the second card of the dual-card UE, the core network entity with which the second card of the dual-card UE is registered, acquires, from the core network entity with which the second card of the dual-card UE is registered, the IP address of the second card of the dual-card UE according to the identifier of the second card of the dual-card UE, and sends the IP address of the second card of the dual-card UE to the anchor gateway, that is, the anchor gateway acquires the IP address of the second card of the dual-card UE according to the identifier of the second card of the dual-card UE.

If the association information include the identifier of the second card of the dual-card UE and the address of the core network entity with which the second card of the dual-card UE is registered, the core network entity with which the first card of the dual-card UE is registered finds, according to the address of the core network entity with which the second card of the dual-card UE is registered, the core network entity with which the second card of the dual-card UE is registered, acquires, from the core network entity with which the second card of the dual-card UE is registered, the IP address of the second card of the dual-card UE according to the identifier of the second card of the dual-card UE, and sends the IP address of the second card of the dual-card UE to the anchor gateway, that is, the anchor gateway acquires the IP address of the second card of the dual-card UE according to the identifier of the second card of the dual-card UE and the address of the core network entity with which the second card of the dual-card UE is registered.

Specifically, in the foregoing process, the association information may be acquired by using the core network entity with which the first card of the dual-card UE is registered, and the core network entity sends, to the anchor gateway, necessary association information such as the IP address of the second card of the dual-card UE, where the core network entity may include an MME or an SGSN.

S1305. The anchor gateway establishes a second bearer according to the IP address of the second card of the dual-card UE, where the second bearer is a data transmission channel between the anchor gateway and the second card of the dual-card UE.

The anchor gateway establishes the second bearer for the dual-card UE according to the IP address of the second card of the dual-card UE, where the second bearer is the data transmission channel between the anchor gateway and the second card of the dual-card UE.

A person of ordinary skill in the art may understand that an IP address is required for performing routing between different anchor gateways, that is, if an anchor gateway to which the first card of the dual-card UE belongs needs to transmit data to an anchor gateway to which the second card of the dual-card UE belongs, the anchor gateway to which the first card of the dual-card UE belongs needs to use an IP address of the anchor gateway to which the second card of the dual-card UE belongs to transmit the data.

Exemplarily, the dual-card UE may send the access request from the second card of the dual-card UE to the core network entity with which the second card of the dual-card UE is registered, so that the core network entity with which the second card of the dual-card UE is registered sends the access request to the anchor gateway to which the second card of the dual-card UE belongs, so that the anchor gateway to which the second card of the dual-card UE belongs establishes a bearer of the second card of the dual-card UE for the second card of the dual-card UE, where the bearer of the second card of the dual-card UE may be from the anchor gateway to which the second card of the dual-card UE belongs, via the core network entity with which the second card of the dual-card UE is registered, to the second card of the dual-card UE.

It should be noted that, before the anchor gateway establishes the second bearer, if the anchor gateway to which the second card of the dual-card UE belongs has established the bearer of the second card of the dual-card UE for the second card of the dual-card UE, the anchor gateway needs to establish only a part of the second bearer, that is, a bearer from the anchor gateway to the anchor gateway to which the second card of the dual-card UE belongs; and if the anchor gateway to which the second card of the dual-card UE belongs has not established the bearer of the second card of the dual-card UE for the second card of the dual-card UE, the anchor gateway needs to establish a complete second bearer, that is, an entire bearer from the anchor gateway to the second card of the dual-card UE.

Preferably, the core network entity with which the second card of the dual-card UE is registered may include an MME or an SGSN.

S1306. The anchor gateway splits first data to be transmitted into second data and third data, and adds the IP address of the second card of the dual-card UE to the third data according to a tunneling technology.

A person of ordinary skill in the art may understand that, in the communications field, if a source end needs to send first data to a target end, the source end needs to packetize the first data into multiple data packets (a packet header of each data packet carries an IP address of the source end and an IP address of the target end), and sequentially transmit the multiple data packets to the target end. That is, the first data is a data stream that includes multiple data packets, and if the first network side device receives the first data, the first network side device splits the multiple data packets into two groups of data packets: the second data and the third data, where both the second data and the third data carry an IP address of the first card of the dual-card UE, and the IP address of the first card of the dual-card UE is assigned by the anchor gateway to the first card of the dual-card UE.

The anchor gateway splits the first data to be transmitted to the dual-card UE into two groups of data packets, namely, the second data and the third data, and adds the IP address of the second card of the dual-card UE to the third data according to the tunneling technology, so as to form, together with the IP address of the first card of the dual-card UE, an IP in IP encapsulated data packet. A basis for splitting the first data by the anchor gateway may be at least one of the following: load of the first bearer, data transmission efficiency of the first bearer, load of the second bearer, and data transmission efficiency of the second bearer, and the foregoing tunneling technology may include IP in IP encapsulation, GRE (Generic Routing Encapsulation, Generic Routing Encapsulation), IPSec (Internet Protocol Security, Internet Protocol Security), or the like.

For example, the first data is data that needs to be transmitted to the first card of the dual-card UE, and it is assumed that a source IP address of the first data is D1 (any address), and a destination IP address of the first data is the IP address of the first card of the dual-card UE; then, a source IP address of an IP data packet of the second data is D1, and a destination IP address is the IP address of the first card of the dual-card UE; and correspondingly, for an IP in IP encapsulated data packet formed after the anchor gateway packetizes the third data according to the tunneling technology, an outer source IP address of the IP in IP encapsulated data packet is D1 or an address of the anchor gateway, an outer destination IP address is the IP address of the second card of the dual-card UE, an inner source IP address of the IP in IP encapsulated data packet is D1, and an inner destination IP address is the IP address of the first card of the dual-card UE. In this way, the anchor gateway may send the third data to the second card of the dual-card UE by using the second bearer, so that when the second card of the dual-card UE learns that the third data is the IP in IP encapsulated data packet, the second card of the dual-card UE then transmits the third data to the first card of the dual-card UE, and further, after combining the second data and the third data into the first data, the dual-card UE performs corresponding processing on the first data.

It should be noted that a ratio at which the first data to be transmitted is split by the anchor gateway into the two groups of data packets, namely, the second data and the third data, may be 1:9, 5:5, 0:10, or any other ratio that meets the foregoing splitting basis, which is not limited in the present invention.

Preferably, when the ratio is 0:10 or 10:0, it indicates that the anchor gateway has not split the first data but only delivers the first data to the dual-card UE by using a preferable bearer (the first bearer or the second bearer). When the ratio is 0:10 or 10:0, the communication method for a dual-card UE provided in this embodiment of the present invention may also be applied to a dual-card single-pass UE.

Preferably, the foregoing basis for splitting the first data may further include a network congestion status, a tariff of the first card of the dual-card UE and/or a tariff of the second card of the dual-card UE, a randomly paging card that is independently selected by the dual-card UE for initiating access to or responding to the first network side device, a transmission rate of the first data, or load of the first data, which is not limited in the present invention.

Preferably, a basis for independently selecting a randomly paging card by the dual-card UE for initiating access to or responding to the first network side device may include that: it is set by using software in the dual-card UE that a specific card is preferentially used for accessing a network; or if traffic of the first card of the dual-card UE, traffic of the second card of the dual-card UE, or traffic of the first data to be transmitted is in a preset range, the dual-card UE uses a specific card for accessing the network according to an internal setting.

It should be noted that, in a communication method provided in this embodiment of the present invention, the dual-card UE is merely used as an example for description. The communication method provided in this embodiment of the present invention may further be applied to a triple-card UE, a quad-card UE, and a multi-card UE, which is not limited in the present invention.

It may be understood that if the communication method provided in this embodiment of the present invention is applied to a multi-card UE, correspondingly, the first network side device needs to split the first data to be transmitted into multiple groups of data packets, and simultaneously delivers the multiple groups of data packets to the multi-card UE by using multiple cards of the multi-card UE.

S1307. The anchor gateway sends the second data to the dual-card UE by using the first bearer, and sends the third data to the dual-card UE by using the second bearer.

The anchor gateway sends the second data from the anchor gateway to the dual-card UE by using the first bearer and sends, by using the second bearer, the third data from the anchor gateway to the anchor gateway to which the second card of the dual-card UE belongs, and then the anchor gateway to which the second card of the dual-card UE belongs sends the third data to the dual-card UE by using the second bearer.

S1308. The dual-card UE combines the second data and the third data into the first data.

After the dual-card UE receives the second data and the third data that are sent by the anchor gateway, the dual-card UE combines the second data and the third data into the first data, and performs corresponding processing on the first data, so as to complete transmission of the first data.

S1309. The dual-card UE sends a detach request to the anchor gateway, where the detach request is sent by the dual-card UE when the second card of the dual-card UE needs to be detached.

When the second card of the dual-card UE needs to be detached, the dual-card UE sends the detach request to the anchor gateway to which the second card of the dual-card UE belongs, so that the anchor gateway to which the second card of the dual-card UE belongs sends the detach request to the anchor gateway.

S1310. The anchor gateway deletes the association information, or the association information and the second bearer according to the detach request.

After the anchor gateway receives the detach request, according to the detach request, the anchor gateway deletes the association information or deletes the association information and the second bearer, so as to revoke an association relationship between the first card of the dual-card UE and the second card of the dual-card UE, so that a communication procedure of the first card of the dual-card UE is independent relative to a communication procedure of the second card of the dual-card UE.

It should be noted that when the second card of the dual-card UE needs to be detached, the anchor gateway needs to perform S1309 and S1310; and certainly, if the second card of the dual-card UE does not need to be detached, the anchor gateway does not need to perform S1309 and S1310.

A person of ordinary skill in the art may understand that both the first card of the dual-card UE and the second card of the dual-card UE may simultaneously establish multiple PDN (Public Data Network, public data network) connections, and acquire multiple IP addresses. In the communication method (a communication method for a dual-card UE corresponding to a case in which the network side device is an anchor gateway) for a dual-card UE provided in this embodiment of the present invention, it is required that QoS (Quality of Service, quality of service) of a service corresponding the IP address of the first card of the dual-card UE and QoS of a service corresponding to the IP address of the second card of the dual-card UE are consistent. If the first card of the dual-card UE corresponds to a service, and the other card of the dual-card UE has no PDN connection of QoS corresponding to the service, it may be triggered that the second card of the dual-card UE establishes a PDN connection with QoS being the same as the QoS of the service of the first card of the dual-card UE; and the second card of the dual-card UE notifies, of a corresponding IP address of the second card of the dual-card UE, the first card of the dual-card UE or the core network entity with which the first card of the dual-card UE is registered. For example, the first card of the dual-card UE initiates a new bearer/PDN connection, and the first card of the dual-card UE notifies the second card of the dual-card UE, and the second card of the dual-card UE finds that there is no bearer/PDN connection corresponding to QoS; then, the second card of the dual-card UE initiates a procedure of establishing a corresponding bearer/PDN connection. If there is a new IP address assigned by the network side device to the second card of the dual-card UE, the second card of the dual-card UE may also directly notifies the first card of the dual-card UE, so that the first card of the dual-card UE notifies, by using a PCO (Protocol Configuration Option, protocol configuration option), the core network entity with which the first card of the dual-card UE is registered.

It may be understood that if the first card of the dual-card UE and the second card of the dual-card UE belong to different PLMNs, the first bearer established by the anchor gateway may be from the anchor gateway, via the core network entity with which the first card of the dual-card UE is registered, to the first card of the dual-card UE; and correspondingly, the second bearer established by the anchor gateway may be from the anchor gateway, via the anchor gateway to which the second card of the dual-card UE belongs and the core network entity with which the second card of the dual-card UE is registered, to the second card of the dual-card UE.

Preferably, if the first card of the dual-card UE and the second card of the dual-card UE belong to a same PLMN, the anchor gateway to which the first card of the dual-card UE belongs and the anchor gateway to which the second card of the dual-card UE belongs may be a same anchor gateway, and the core network entity with which the first card of the dual-card UE is registered and the core network entity with which the second card of the dual-card UE is registered may be a same core network entity, or may be different core network entities.

Figure 14:
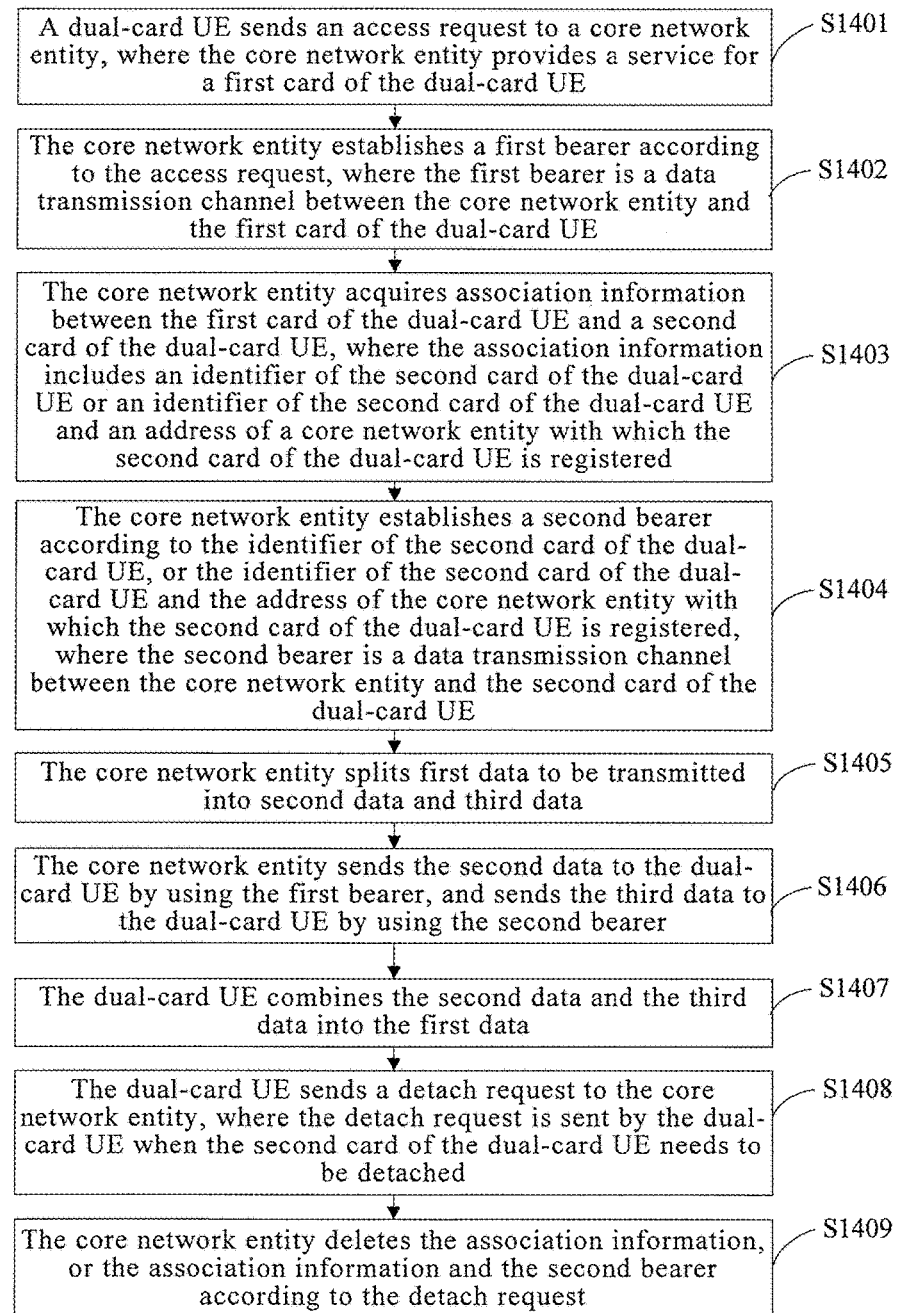
FIG. 14 is an eighth flowchart of a communication method for a dual-card UE according to an embodiment of the present invention.

An embodiment of the present invention further provides a communication method for a dual-card UE, and the method, as shown in FIG. 14, may be applied to a scenario in which a network side device sends downlink data to a dual-card dual-standby dual-pass UE. A first network side device involved in the method may include a core network entity (the core network entity may include an SGW or an SGSN). The method may include the following steps:

S1401. A dual-card UE sends an access request to a core network entity, where the core network entity provides a service for a first card of the dual-card UE.

Exemplarily, the dual-card UE is a communication terminal in which two cards are inserted. When the dual-card UE needs to access a network, the dual-card UE first sends an access request to the core network entity, where the core network entity is a core network entity with which the first card of the dual-card UE is registered, and provides a service for the first card of the dual-card UE.

S1402. The core network entity establishes a first bearer according to the access request, where the first bearer is a data transmission channel between the core network entity and the first card of the dual-card UE.

After the core network entity receives the access request from the dual-card UE, the core network entity establishes the first bearer for the dual-card UE according to the access request, where the first bearer is the data transmission channel between the core network entity and the first card of the dual-card UE.

S1403. The core network entity acquires association information between the first card of the dual-card UE and a second card of the dual-card UE, where the association information includes an identifier of the second card of the dual-card UE, or an identifier of the second card of the dual-card UE and an address of a core network entity with which the second card of the dual-card UE is registered.

After the core network entity acquires the association information between the first card of the dual-card UE and the second card of the dual-card UE, the core network entity establishes a second bearer for the dual-card UE according to the acquired association information, where the second bearer is a data transmission channel between the core network entity and the second card of the dual-card UE.

In this embodiment of the present invention, the association information may be information, recorded by the first card of the dual-card UE, about the second card of the dual-card UE, for example, for the first card of the dual-card UE, the association information acquired by the core network entity with which the first card of the dual-card UE is registered is the information about the second card of the dual-card UE, where the information about the second card of the dual-card UE may include the identifier of the second card of the dual-card UE, or the identifier of the second card of the dual-card UE and the address of the core network entity with which the second card of the dual-card UE is registered; and correspondingly, for the second card of the dual-card UE, association information acquired by a network side device to which the second card of the dual-card UE belongs is information about the first card of the dual-card UE, where the information about the first card of the dual-card UE may include an identifier of the first card of the dual-card UE, or an identifier of the first card of the dual-card UE and an address of the core network entity with which the first card of the dual-card UE is registered.

It should be noted that the communication method for a dual-card UE provided in this embodiment of the present invention is exemplarily described from a perspective of the first card of the dual-card UE, and for a communication method for the second card of the dual-card UE, which is similar to a communication method for the first card of the dual-card UE, details are not described herein again.

Specifically, a method for acquiring the association information by the core network entity may be either of the following:

(1) The core network entity receives, from an HSS, subscription information of the first card of the dual-card UE, and acquires the association information in the subscription information of the first card of the dual-card UE.

(2) The core network entity receives an access request from the first card of the dual-card UE, and acquires the association information according to the access request, where the access request carries the association information.

S1404. The core network entity establishes a second bearer according to the identifier of the second card of the dual-card UE, or the identifier of the second card of the dual-card UE and the address of the core network entity with which the second card of the dual-card UE is registered, where the second bearer is a data transmission channel between the core network entity and the second card of the dual-card UE.

If the association information includes the identifier of the second card of the dual-card UE, the core network entity finds, according to the identifier of the second card of the dual-card UE, the core network entity with which the second card of the dual-card UE is registered, and establishes the second bearer for the dual-card UE by using the core network entity with which the second card of the dual-card UE is registered, where the second bearer is the data transmission channel between the core network entity and the second card of the dual-card UE.

If the association information includes the identifier of the second card of the dual-card UE and the address of the core network entity with which the second card of the dual-card UE is registered, the core network entity finds, according to the address of the core network entity with which the second card of the dual-card UE is registered, the core network entity with which the second card of the dual-card UE is registered, and establishes, according to the identifier of the second card of the dual-card UE, the second bearer for the dual-card UE by using the core network entity with which the second card of the dual-card UE is registered, where the second bearer is the data transmission channel between the core network entity and the second card of the dual-card UE.

It may be understood that establishing of the second bearer by the core network entity may be triggered by using an access request from the first card of the dual-card UE, or may be triggered by using an access request from the second card of the dual-card UE, which is not limited in the present invention.

Exemplarily, the dual-card UE may send the access request from the second card of the dual-card UE to the core network entity with which the second card of the dual-card UE is registered, so that the core network entity with which the second card of the dual-card UE is registered establishes a bearer of the second card of the dual-card UE for the second card of the dual-card UE, where the bearer of the second card of the dual-card UE may be from the core network entity, with which the second card of the dual-card UE is registered, to the second card of the dual-card UE.

It should be noted that, before the core network entity establishes the second bearer, if the core network entity with which the second card of the dual-card UE is registered has established the bearer of the second card of the dual-card UE for the second card of the dual-card UE, the core network entity needs to establish only a part of the second bearer, that is, a bearer from the core network entity to the core network entity with which the second card of the dual-card UE is registered; and if the core network entity with which the second card of the dual-card UE is registered has not established the bearer of the second card of the dual-card UE for the second card of the dual-card UE, the core network entity needs to establish a complete second bearer, that is, an entire bearer from the core network entity to the second card of the dual-card UE.

S1405. The core network entity splits first data to be transmitted into second data and third data.

The core network entity splits, according to the foregoing splitting basis, the first data to be transmitted to the dual-card UE into two groups of data packets: the second data and the third data.

It should be noted that a ratio at which the first data to be transmitted is split by the core network entity into the two groups of data packets, namely, the second data and the third data, may be 1:9, 5:5, 0:10, or any other ratio that meets the foregoing splitting basis, which is not limited in the present invention.

Preferably, when the ratio is 0:10 or 10:0, it indicates that the core network entity has not split the first data but only delivers the first data to the dual-card UE by using a preferable bearer (the first bearer or the second bearer). When the ratio is 0:10 or 10:0, the communication method for a dual-card UE provided in this embodiment of the present invention may also be applied to a dual-card single-pass UE.

S1406. The core network entity sends the second data to the dual-card UE by using the first bearer, and sends the third data to the dual-card UE by using the second bearer.

The core network entity sends the second data from the core network entity to the dual-card UE by using the first bearer and sends, by using the second bearer, the third data from the core network entity to the core network entity with which the second card of the dual-card UE is registered, and then the core network entity with which the second card of the dual-card UE is registered sends the third data to the dual-card UE by using the second bearer.

It should be noted that, when the first network side device is a core network entity, a bearer between the core network entity and an anchor gateway is a bearer shared by the first card of the dual-card UE and the second card of the dual-card UE.

S1407. The dual-card UE combines the second data and the third data into the first data.

After the dual-card UE receives the second data and the third data that are sent by the core network entity, the dual-card UE combines the second data and the third data into the first data, and performs corresponding processing on the first data, so as to complete transmission of the first data.

S1408. The dual-card UE sends a detach request to the core network entity, where the detach request is sent by the dual-card UE when the second card of the dual-card UE needs to be detached.

When the second card of the dual-card UE needs to be detached, the dual-card UE sends the detach request to the core network entity with which the second card of the dual-card UE is registered, so that the core network entity with which the second card of the dual-card UE is registered sends the detach request to the core network entity.

S1409. The core network entity deletes the association information, or the association information and the second bearer according to the detach request.

After the core network entity receives the detach request, according to the detach request, the core network entity deletes the association information or deletes the association information and the second bearer, so as to revoke an association relationship between the first card of the dual-card UE and the second card of the dual-card UE, so that a communication procedure of the first card of the dual-card UE is independent relative to a communication procedure of the second card of the dual-card UE.

It should be noted that when the second card of the dual-card UE needs to be detached, the core network entity needs to execute S1408 and S1409; and certainly, if the second card of the dual-card UE does no need to be detached, the core network entity does not need to execute S1408 and S1409.

It may be understood that if the first card of the dual-card UE and the second card of the dual-card UE belong to different PLMNs, the first bearer established by the core network entity may be from the core network entity to the first card of the dual-card UE; and correspondingly, the second bearer established by the core network entity may be from the core network entity, via the core network entity with which the second card of the dual-card UE is registered, to the second card of the dual-card UE.

Preferably, if the first card of the dual-card UE and the second card of the dual-card UE belong to a same PLMN, the core network entity with which the first card of the dual-card UE is registered and the core network entity with which the second card of the dual-card UE is registered may be a same core network entity or may be different core network entities.

In particular, in the foregoing method for splitting the first data by the core network entity, after the first card of the dual-card UE is associated with the second card of the dual-card UE, similar to an ISR manner, once a card of the dual-card UE updates its bearer, the other card of the dual-card UE also acquires update information and executes a same bearer update procedure, so that bearers of the two cards of the dual-card UE are synchronized, that is, the first bearer and the second bearer are synchronized. The ISR manner is that bearers of two RATs of a UE are synchronized, and in the method for splitting the first data by the core network entity provided in this embodiment of the present invention, the bearers of the two cards of the dual-card UE are synchronized. When the first bearer and the second bearer are synchronized, if the first card of the dual-card UE updates the first bearer, the second card of the dual-card UE needs to simultaneously update the second bearer.

Preferably, in the foregoing method for splitting the first data by the core network entity, the first bearer and the second bearer may also not be synchronized, and may be synchronized when there is data to be delivered. When the first bearer and the second bearer are not synchronized, if the first card of the dual-card UE updates the first bearer, the second card of the dual-card UE may not need to simultaneously update the second bearer, and may update the second bearer when the second bearer needs to be used.

In a communication method for a dual-card UE provided in this embodiment of the present invention, a first network side device receives an access request from a dual-card UE, and establishes a first bearer according to the access request, where the first network side device provides a service for a first card of the dual-card UE, and the first bearer is a data transmission channel between the first network side device and the first card of the dual-card UE; after the first network side device acquires association information between the first card of the dual-card UE and a second card of the dual-card UE, the first network side device establishes a second bearer according to the association information, where the second bearer is a data transmission channel between the first network side device and the second card of the dual-card UE; and the first network side device splits first data to be transmitted into second data and third data, sends the second data to the dual-card UE by using the first bearer, and sends the third data to the dual-card UE by using the second bearer, so that the dual-card UE combines the second data and the third data into the first data. According to this solution, in a condition in which the two cards of the dual-card UE are associated with each other, a network side device may deliver, after splitting data to be transmitted, that is, data that needs to be sent to the dual-card UE, split data at the same time by separately using bearers of the two cards of the dual-card UE; therefore, a communication procedure of the dual-card UE can be optimized, thereby improving a transmission rate of a service, increasing the communication efficiency, and improving user experience.

Figure 15:
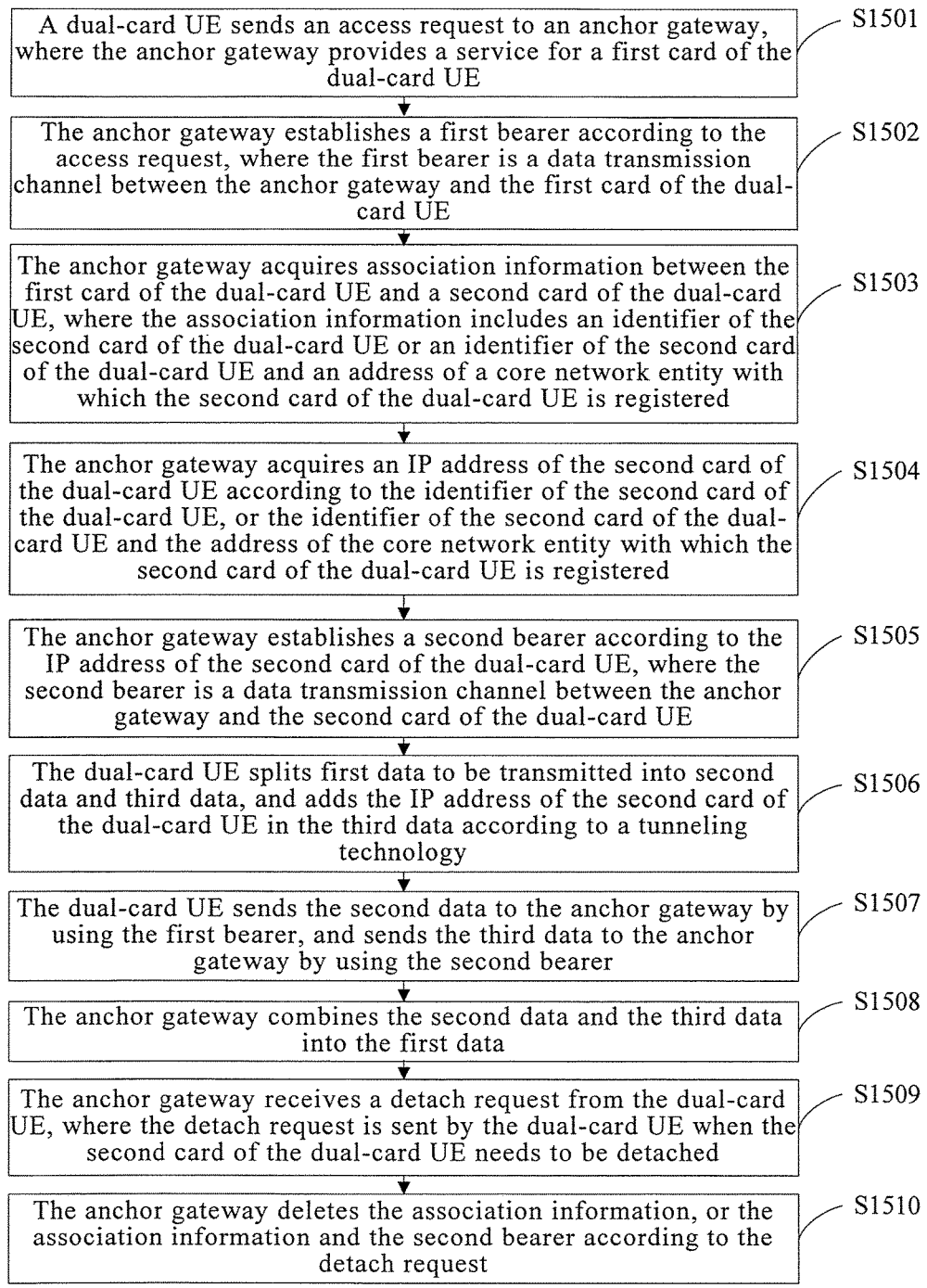
FIG. 15 is a seventh flowchart of another communication method for a dual-card UE according to an embodiment of the present invention.

An embodiment of the present invention provides another communication method for a dual-card UE, and the method, as shown in FIG. 15, may be applied to a scenario in which a dual-card dual-standby dual-pass UE sends uplink data to a network side device. A first network side device involved in the method may include an anchor gateway (the anchor gateway may include a PGW or a GGSN). The method may include the following steps:

S1501. A dual-card UE sends an access request to an anchor gateway, where the anchor gateway provides a service for a first card of the dual-card UE.

Exemplarily, the dual-card UE is a communication terminal in which two cards are inserted. When the dual-card UE needs to access a network, the dual-card UE first sends an access request to a core network entity with which the first card of the dual-card UE is registered, so that the core network entity with which the first card of the dual-card UE is registered sends the access request to the anchor gateway, where the anchor gateway is an anchor gateway to which the first card of the dual-card UE belongs and provides a service for the first card of the dual-card UE.

S1502. The anchor gateway establishes a first bearer according to the access request, where the first bearer is a data transmission channel between the anchor gateway and the first card of the dual-card UE.

After the anchor gateway receives the access request from the dual-card UE, the anchor gateway establishes the first bearer for the dual-card UE according to the access request, where the first bearer is the data transmission channel between the anchor gateway and the first card of the dual-card UE.

S1503. The anchor gateway acquires association information between the first card of the dual-card UE and a second card of the dual-card UE, where the association information includes an identifier of the second card of the dual-card UE, or an identifier of the second card of the dual-card UE and an address of a core network entity with which the second card of the dual-card UE is registered.

After acquiring the association information between the first card of the dual-card UE and the second card of the dual-card UE, the core network entity with which the first card of the dual-card UE is registered sends the association information to the anchor gateway, that is, after the anchor gateway acquires the association information, the anchor gateway establishes a second bearer for the dual-card UE according to the association information, where the second bearer is a data transmission channel between the anchor gateway and the second card of the dual-card UE.

In this embodiment of the present invention, the association information may be information, recorded by the first card of the dual-card UE, about the second card of the dual-card UE, for example, for the first card of the dual-card UE, the association information acquired by the anchor gateway to which the first card of the dual-card UE belongs is the information about the second card of the dual-card UE, where the information about the second card of the dual-card UE may include the identifier of the second card of the dual-card UE, or the identifier of the second card of the dual-card UE and the address of the core network entity with which the second card of the dual-card UE is registered; and correspondingly, for the second card of the dual-card UE, association information acquired by a network side device to which the second card of the dual-card UE belongs is information about the first card of the dual-card UE, where the information about the first card of the dual-card UE may include an identifier of the first card of the dual-card UE, or an identifier of the first card of the dual-card UE and the address of the core network entity with which the first card of the dual-card UE is registered.

It should be noted that the another communication method for a dual-card UE provided in this embodiment of the present invention is exemplarily described from a perspective of the first card of the dual-card UE, and for a communication method for the second card of the dual-card UE, which is similar to a communication method for the first card of the dual-card UE, details are not described herein again.

Specifically, a method for acquiring the association information by the core network entity with which the first card of the dual-card UE is registered may be either of the following:

(1) The core network entity with which the first card of the dual-card UE is registered receives, from an HSS, subscription information of the first card of the dual-card UE, and acquires the association information in the subscription information of the first card of the dual-card UE.

(2) The core network entity with which the first card of the dual-card UE is registered receives an access request from the first card of the dual-card UE, and acquires the association information according to the access request, where the access request carries the association information.

S1504. The anchor gateway acquires an IP address of the second card of the dual-card UE according to the identifier of the second card of the dual-card UE, or the identifier of the second card of the dual-card UE and the address of the core network entity with which the second card of the dual-card UE is registered.

If the association information includes the identifier of the second card of the dual-card UE, the core network entity with which the first card of the dual-card UE is registered finds, according to the identifier of the second card of the dual-card UE, the core network entity with which the second card of the dual-card UE is registered, acquires, from the core network entity with which the second card of the dual-card UE is registered, the IP address of the second card of the dual-card UE according to the identifier of the second card of the dual-card UE, and sends the IP address of the second card of the dual-card UE to the anchor gateway, that is, the anchor gateway acquires the IP address of the second card of the dual-card UE according to the identifier of the second card of the dual-card UE.

If the association information include the identifier of the second card of the dual-card UE and the address of the core network entity with which the second card of the dual-card UE is registered, the core network entity with which the first card of the dual-card UE is registered finds, according to the address of the core network entity with which the second card of the dual-card UE is registered, the core network entity with which the second card of the dual-card UE is registered, acquires, from the core network entity with which the second card of the dual-card UE is registered, the IP address of the second card of the dual-card UE according to the identifier of the second card of the dual-card UE, and sends the IP address of the second card of the dual-card UE to the anchor gateway, that is, the anchor gateway acquires the IP address of the second card of the dual-card UE according to the identifier of the second card of the dual-card UE and the address of the core network entity with which the second card of the dual-card UE is registered.

S1505. The anchor gateway establishes a second bearer according to the IP address of the second card of the dual-card UE, where the second bearer is a data transmission channel between the anchor gateway and the second card of the dual-card UE.

The anchor gateway establishes the second bearer for the second card of the dual-card UE according to the IP address of the second card of the dual-card UE, where the second bearer is the data transmission channel between the anchor gateway and the second card of the dual-card UE.

It may be understood that establishing of the second bearer by the anchor gateway may be triggered by using an access request from the first card of the dual-card UE, or may be triggered by using an access request from the second card of the dual-card UE, which is not limited in the present invention.

A person of ordinary skill in the art may understand that an IP address is required for performing routing between different anchor gateways, that is, if an anchor gateway to which the first card of the dual-card UE belongs needs to transmit data to an anchor gateway to which the second card of the dual-card UE belongs, the anchor gateway to which the first card of the dual-card UE belongs needs to use an IP address of the anchor gateway to which the second card of the dual-card UE belongs to transmit the data.

Exemplarily, the dual-card UE may send the access request from the second card of the dual-card UE to the core network entity with which the second card of the dual-card UE is registered, so that the core network entity with which the second card of the dual-card UE is registered sends the access request to the anchor gateway to which the second card of the dual-card UE belongs, so that the anchor gateway to which the second card of the dual-card UE belongs establishes a bearer of the second card of the dual-card UE for the second card of the dual-card UE, where the bearer of the second card of the dual-card UE may be from the anchor gateway to which the second card of the dual-card UE belongs, via the core network entity with which the second card of the dual-card UE is registered, to the second card of the dual-card UE.

It should be noted that, before the anchor gateway establishes the second bearer, if the anchor gateway to which the second card of the dual-card UE belongs has established the bearer of the second card of the dual-card UE for the second card of the dual-card UE, the anchor gateway needs to establish only a part of the second bearer, that is, a bearer from the anchor gateway to the anchor gateway to which the second card of the dual-card UE belongs; and if the anchor gateway to which the second card of the dual-card UE belongs has not established the bearer of the second card of the dual-card UE for the second card of the dual-card UE, the anchor gateway needs to establish a complete second bearer, that is, an entire bearer from the anchor gateway to the second card of the dual-card UE.

Preferably, the foregoing core network entity with which the first card of the dual-card UE is registered may include an MME or an SGSN, and/or the core network entity with which the second card of the dual-card UE is registered may include an MME or an SGSN.

S1506. The dual-card UE splits first data to be transmitted into second data and third data, and adds the IP address of the second card of the dual-card UE to the third data according to a tunneling technology.

A person of ordinary skill in the art may understand that, in the communications field, if a source end needs to send first data to a target end, the source end needs to packetize the first data into multiple data packets (a packet header of each data packet carries an IP address of the source end and an IP address of the target end), and sequentially transmit the multiple data packets to the target end. That is, the first data is a data stream that includes multiple data packets, and if the dual-card UE sends the first data to a target end, the dual-card UE may split the multiple data packets into two groups of data packets: the second data and the third data, where both the second data and the third data carry an IP address of the first card of the dual-card UE, and the IP address of the first card of the dual-card UE is assigned by the anchor gateway to the first card of the dual-card UE.

The dual-card UE splits the first data to be transmitted to the anchor gateway into two groups of data packets, namely, the second data and the third data, and adds the IP address of the second card of the dual-card UE to the third data according to the tunneling technology, so as to form, together with the IP address of the first card of the dual-card UE, an IP in IP encapsulated data packet, where the IP address of the second card of the dual-card UE is sent to the dual-card UE after being acquired by the anchor gateway according to the association information, or is acquired by the dual-card UE from the second card of the dual-card UE according to a preset policy, and the preset policy may be integrated by using an internal software program of the dual-card UE, so that the dual-card UE may acquire the IP address of the second card of the dual-card UE from the second card of the dual-card UE. A basis for splitting the first data by the dual-card UE may be at least one of the following: load of the first bearer, data transmission efficiency of the first bearer, load of the second bearer, and data transmission efficiency of the second bearer, and the foregoing tunneling technology may include IP in IP encapsulation, GRE, IPSec, or the like.

For example, the first data is data that needs to be transmitted to the anchor gateway, and it is assumed that a source IP address of the first data is the IP address of the first card of the dual-card UE, and a destination IP address of the first data is D1 (any address); then, a source IP address of an IP data packet of the second data is the IP address of the first card of the dual-card UE, and a destination IP address is D1; and correspondingly, an outer source IP address of an IP in IP encapsulated data packet that is formed after the dual-card UE packetizes the third data according to the tunneling technology is the IP address of the second card of the dual-card UE, an outer destination IP address is D1 or an address of the anchor gateway, an inner source IP address of the IP in IP encapsulated data packet is the IP address of the first card of the dual-card UE, and an inner destination IP address is D1. In this way, the dual-card UE may send, by using the second bearer, the third data to the anchor gateway to which the second card of the dual-card UE belongs, so that the anchor gateway to which the second card of the dual-card UE belongs sends the third data to the anchor gateway by using the second bearer, that is, the anchor gateway to which the first card of the dual-card UE belongs, so that the anchor gateway combines the second data and the third data into the first data.

Specifically, if the outer destination IP address of the IP in IP encapsulated data packet is D1, the third data may be sent to D1, and then a destination device acquires the inner source IP address and the inner destination IP address by parsing the IP in IP encapsulated data packet; however, in this method, the destination device is required to support the IP in IP encapsulation tunneling technology. If the outer destination IP address of the IP in IP encapsulated data packet is the address of the anchor gateway, the dual-card UE first sends, by using a system of the second card of the dual-card UE, the third data to the anchor gateway to which the second card of the dual-card UE belongs, and then the anchor gateway to which the second card of the dual-card UE belongs sends the third data to the anchor gateway according to the outer destination IP address of the IP in IP encapsulated data packet, so that the anchor gateway parses the IP in IP encapsulated data packet, and sends, after combining the second data and the third data into the first data, the first data to D1 according to the inner source IP address and the inner destination IP address of the IP in IP encapsulated data packet.

It should be noted that a ratio at which the first data to be transmitted is split by the dual-card UE into the two groups of data packets, namely, the second data and the third data, may be 1:9, 5:5, 0:10, or any other ratio that meets the foregoing splitting basis, which is not limited in the present invention.

Preferably, when the ratio is 0:10 or 10:0, it indicates that the dual-card UE has not split the first data but only sends the first data to the anchor gateway by using a preferable bearer (the first bearer or the second bearer). When the ratio is 0:10 or 10:0, the communication method for a dual-card UE provided in this embodiment of the present invention may also be applied to a dual-card single-pass UE.

Preferably, the foregoing basis for splitting the first data may further include a network congestion status, a tariff of the first card of the dual-card UE and/or a tariff of the second card of the dual-card UE, a randomly paging card that is independently selected by the dual-card UE for initiating access to or responding to the first network side device, a transmission rate of the first data, or load of the first data, which is not limited in the present invention.

Preferably, a basis for independently selecting a randomly paging card by the dual-card UE for initiating access to or responding to the first network side device may include that: it is set by using software in the dual-card UE that a specific card is preferentially used for accessing a network; or if traffic of the first card of the dual-card UE, traffic of the second card of the dual-card UE, or traffic of the first data to be transmitted is in a preset range, the dual-card UE uses a specific card for accessing the network according to an internal setting.

In the another communication method provided in this embodiment of the present invention, the dual-card UE is merely used as an example for description. The another communication method provided in this embodiment of the present invention may further be applied to a triple-card UE, a quad-card UE, and a multi-card UE, which is not limited in the present invention.

It may be understood that if the another communication method provided in this embodiment of the present invention is applied to a multi-card UE, correspondingly, the multi-card UE needs to split the first data to be transmitted into multiple groups of data packets, and simultaneously sends the multiple groups of data packets to the first network side device by using multiple cards of the multi-card UE.

S1507. The dual-card UE sends the second data to the anchor gateway by using the first bearer, and sends the third data to the anchor gateway by using the second bearer.

The dual-card UE sends the second data from the dual-card UE to the anchor gateway by using the first bearer and sends, by using the second bearer, the third data from the dual-card UE to the anchor gateway to which the second card of the dual-card UE belongs, and then the anchor gateway to which the second card of the dual-card UE belongs sends the third data to the anchor gateway by using the second bearer.

S1508. The anchor gateway combines the second data and the third data into the first data.

After the anchor gateway receives the second data and the third data that are sent by the dual-card UE, the anchor gateway combines the second data and the third data into the first data, and forwards the first data, so as to complete transmission of the first data.

S1509. The anchor gateway receives a detach request from the dual-card UE, where the detach request is sent by the dual-card UE when the second card of the dual-card UE needs to be detached.

When the second card of the dual-card UE needs to be detached, the dual-card UE sends the detach request to the anchor gateway to which the second card of the dual-card UE belongs, so that the anchor gateway to which the second card of the dual-card UE belongs sends the detach request to the anchor gateway.

S1510. The anchor gateway deletes the association information, or the association information and the second bearer according to the detach request.

After the anchor gateway receives the detach request, according to the detach request, the anchor gateway deletes the association information or deletes the association information and the second bearer, so as to revoke an association relationship between the first card of the dual-card UE and the second card of the dual-card UE, so that a communication procedure of the first card of the dual-card UE is independent relative to a communication procedure of the second card of the dual-card UE.

It should be noted that when the second card of the dual-card UE needs to be detached, the anchor gateway needs to perform S1509 and S1510; and certainly, if the second card of the dual-card UE is not detached, the anchor gateway does not need to perform S1509 and S1510.

It may be understood that if the first card of the dual-card UE and the second card of the dual-card UE belong to different PLMNs, the first bearer established by the anchor gateway may be from the anchor gateway, via the core network entity with which the first card of the dual-card UE is registered, to the first card of the dual-card UE; and correspondingly, the second bearer established by the anchor gateway may be from the anchor gateway, via the anchor gateway to which the second card of the dual-card UE belongs and the core network entity with which the second card of the dual-card UE is registered, to the second card of the dual-card UE.

Preferably, if the first card of the dual-card UE and the second card of the dual-card UE belong to a same PLMN, the anchor gateway to which the first card of the dual-card UE belongs and the anchor gateway to which the second card of the dual-card UE belongs may be a same anchor gateway, and the core network entity with which the first card of the dual-card UE is registered and the core network entity with which the second card of the dual-card UE is registered may be a same core network entity, or may be different core network entities.

Figure 16:
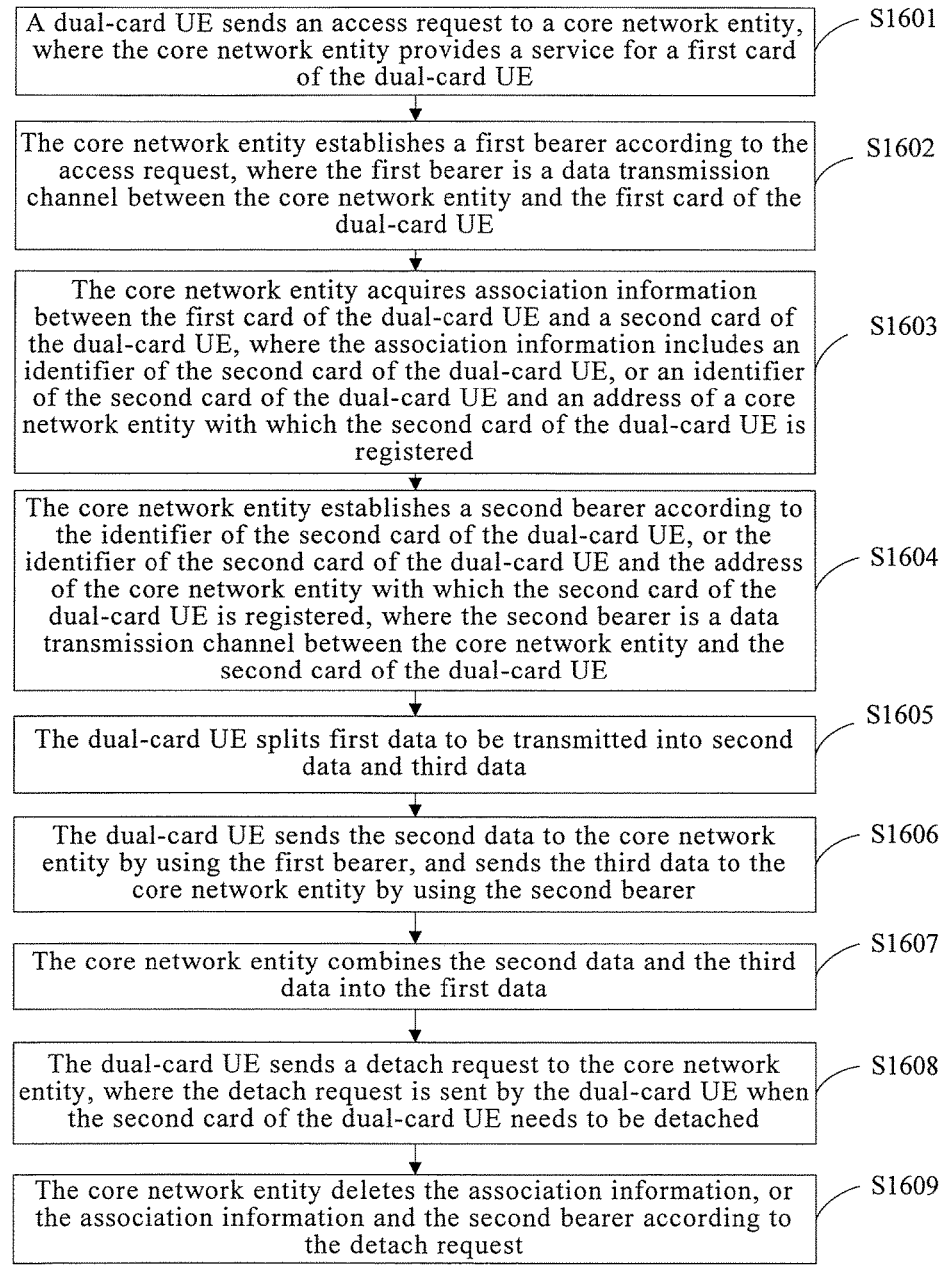
FIG. 16 is an eighth flowchart of another communication method for a dual-card UE according to an embodiment of the present invention.

An embodiment of the present invention further provides another communication method for a dual-card UE, and the method, as shown in FIG. 16, may be applied to a scenario in which a dual-card dual-standby dual-pass UE sends uplink data to a network side device. A first network side device involved in the method may include a core network entity (the core network entity may include an SGW or an SGSN). The method may include the following steps:

S1601. A dual-card UE sends an access request to a core network entity, where the core network entity provides a service for a first card of the dual-card UE.

Exemplarily, the dual-card UE is a communication terminal in which two cards are inserted. When the dual-card UE needs to access a network, the dual-card UE first sends an access request to the core network entity, where the core network entity is a core network entity with which the first card of the dual-card UE is registered, and provides a service for the first card of the dual-card UE.

S1602. The core network entity establishes a first bearer according to the access request, where the first bearer is a data transmission channel between the core network entity and the first card of the dual-card UE.

After the core network entity receives the access request from the dual-card UE, the core network entity establishes the first bearer for the dual-card UE according to the access request, where the first bearer is the data transmission channel between the core network entity and the first card of the dual-card UE.

S1603. The core network entity acquires association information between the first card of the dual-card UE and the second card of the dual-card UE, where the association information includes an identifier of the second card of the dual-card UE, or an identifier of the second card of the dual-card UE and an address of a core network entity with which the second card of the dual-card UE is registered.

After the core network entity receives the access request from the dual-card UE, the core network entity establishes a second bearer for the dual-card UE according to the acquired association information, where the second bearer is a data transmission channel between the core network entity and the second card of the dual-card UE.

It may be understood that establishing of the second bearer by the core network entity may be triggered by using an access request from the first card of the dual-card UE, or may be triggered by using an access request from the second card of the dual-card UE, which is not limited in the present invention.

In this embodiment of the present invention, the association information may be information, recorded by the first card of the dual-card UE, about the second card of the dual-card UE, for example, for the first card of the dual-card UE, the association information acquired by the core network entity with which the first card of the dual-card UE is registered is the information about the second card of the dual-card UE, where the information about the second card of the dual-card UE may include the identifier of the second card of the dual-card UE, or the identifier of the second card of the dual-card UE and the address of the core network entity with which the second card of the dual-card UE is registered; and correspondingly, for the second card of the dual-card UE, association information acquired by the core network entity with which the second card of the dual-card UE is registered is information about the first card of the dual-card UE, where the information about the first card of the dual-card UE may include an identifier of the first card of the dual-card UE, or an identifier of the first card of the dual-card UE and an address of the core network entity with which the first card of the dual-card UE is registered.

It should be noted that the another communication method for a dual-card UE provided in this embodiment of the present invention is exemplarily described from a perspective of the first card of the dual-card UE, and for a communication method for the second card of the dual-card UE, which is similar to a communication method for the first card of the dual-card UE, details are not described herein again.

Specifically, a method for acquiring the association information by the core network entity may be either of the following:

(1) The core network entity receives, from an HSS, subscription information of the first card of the dual-card UE, and acquires the association information in the subscription information of the first card of the dual-card UE.

(2) The core network entity receives the access request from the first card of the dual-card UE, and acquires the association information according to the access request, where the access request carries the association information.

S1604. The core network entity establishes a second bearer according to the identifier of the second card of the dual-card UE, or the identifier of the second card of the dual-card UE and the address of the core network entity with which the second card of the dual-card UE is registered, where the second bearer is a data transmission channel between the core network entity and the second card of the dual-card UE.

If the association information includes the identifier of the second card of the dual-card UE, the core network entity finds, according to the identifier of the second card of the dual-card UE, the core network entity with which the second card of the dual-card UE is registered, and establishes the second bearer for the dual-card UE by using the core network entity with which the second card of the dual-card UE is registered, where the second bearer is the data transmission channel between the core network entity and the second card of the dual-card UE.

If the association information includes the identifier of the second card of the dual-card UE and the address of the core network entity with which the second card of the dual-card UE is registered, the core network entity finds, according to the address of the core network entity with which the second card of the dual-card UE is registered, the core network entity with which the second card of the dual-card UE is registered, and establishes, according to the identifier of the second card of the dual-card UE, the second bearer for the second card of the dual-card UE by using the core network entity with which the second card of the dual-card UE is registered, where the second bearer is the data transmission channel between the core network entity and the second card of the dual-card UE.

Exemplarily, the dual-card UE may send the access request from the second card of the dual-card UE to the core network entity with which the second card of the dual-card UE is registered, so that the core network entity with which the second card of the dual-card UE is registered establishes a bearer of the second card of the dual-card UE for the second card of the dual-card UE, where the bearer of the second card of the dual-card UE may be from the core network entity, with which the second card of the dual-card UE is registered, to the second card of the dual-card UE.

It should be noted that, before the core network entity establishes the second bearer, if the core network entity with which the second card of the dual-card UE is registered has established a bearer of the second card of the dual-card UE for the second card of the dual-card UE, the core network entity needs to establish only a part of the second bearer, that is, a bearer from the core network entity to the core network entity with which the second card of the dual-card UE is registered; and if the core network entity with which the second card of the dual-card UE is registered has not established the bearer of the second card of the dual-card UE for the second card of the dual-card UE, the core network entity needs to establish a complete second bearer, that is, an entire bearer from the core network entity to the second card of the dual-card UE.

S1605. The dual-card UE splits first data to be transmitted into second data and third data.

The dual-card UE splits, according to the foregoing splitting basis, the first data to be transmitted to the core network entity into two groups of data packets: the second data and the third data.

S1606. The dual-card UE sends the second data to the core network entity by using the first bearer, and sends the third data to the core network entity by using the second bearer.

The dual-card UE sends the second data from the dual-card UE to the core network entity by using the first bearer and sends, by using the second bearer, the third data from the dual-card UE to the core network entity with which the second card of the dual-card UE is registered, and then the core network entity with which the second card of the dual-card UE is registered sends the third data to the core network entity by using the second bearer.

It should be noted that, when the first network side device is a core network entity, a bearer between the core network entity and an anchor gateway is a bearer shared by the first card of the dual-card UE and the second card of the dual-card UE.

S1607. The core network entity combines the second data and the third data into the first data.

After the core network entity receives the second data and the third data that are sent by the dual-card UE, the core network entity combines the second data and the third data into the first data, and forwards the first data, so as to complete transmission of the first data.

In particular, in the foregoing method for splitting the first data by the dual-card UE and combining, by the core network entity, the second data and the third data that are obtained by splitting, after the first card of the dual-card UE is associated with the second card of the dual-card UE, similar to an ISR manner, once a card of the dual-card UE updates its bearer, the other card of the dual-card UE also acquires update information and executes a same bearer update procedure, so that bearers of the two cards of the dual-card UE are synchronized, that is, the first bearer and the second bearer are synchronized. The ISR manner is that bearers of two RATs of a UE are synchronized, and in the method for splitting the first data by the dual-card UE and combining, by the core network entity, the second data and the third data that are obtained by splitting provided in this embodiment of the present invention, the bearers of the two cards of the dual-card UE are synchronized. When the first bearer and the second bearer are synchronized, if the first card of the dual-card UE updates the first bearer, the second card of the dual-card UE needs to simultaneously update the second bearer.

Preferably, in the foregoing method for splitting the first data by the dual-card UE and combining, by the core network entity, the second data and the third data that are obtained by splitting, the first bearer and the second bearer may also not be synchronized, and may be synchronized when there is data to be delivered. When the first bearer and the second bearer are not synchronized, if the first card of the dual-card UE updates the first bearer, the second card of the dual-card UE may not need to simultaneously update the second bearer, and may update the second bearer when the second bearer needs to be used.

S1608. The dual-card UE sends a detach request to the core network entity, where the detach request is sent by the dual-card UE when the second card of the dual-card UE needs to be detached.

When the second card of the dual-card UE needs to be detached, the dual-card UE sends the detach request to the core network entity with which the second card of the dual-card UE is registered, so that the core network entity with which the second card of the dual-card UE is registered sends the detach request to the core network entity.

S1609. The core network entity deletes the association information, or the association information and the second bearer according to the detach request.

After the core network entity receives the detach request, according to the detach request, the core network entity deletes the association information or deletes the association information and the second bearer, so as to revoke an association relationship between the first card of the dual-card UE and the second card of the dual-card UE, so that a communication procedure of the first card of the dual-card UE is independent relative to a communication procedure of the second card of the dual-card UE.

It should be noted that when the second card of the dual-card UE needs to be detached, the core network entity needs to perform S1608 and S1609; and certainly, if the second card of the dual-card UE is not detached, the core network entity does not need to perform S1608 and S1609.

It may be understood that if the first card of the dual-card UE and the second card of the dual-card UE belong to different PLMNs, the first bearer established by the core network entity may be from the core network entity to the first card of the dual-card UE; and correspondingly, the second bearer established by the core network entity may be from the core network entity, via the core network entity with which the second card of the dual-card UE is registered, to the second card of the dual-card UE.

Preferably, if the first card of the dual-card UE and the second card of the dual-card UE belong to a same PLMN, the core network entity with which the first card of the dual-card UE is registered and the core network entity with which the second card of the dual-card UE is registered may be a same core network entity or may be different core network entities.

In another communication method for a dual-card UE provided in this embodiment of the present invention, the dual-card UE sends an access request to a first network side device, so that the first network side device establishes a first bearer according to the access request; and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE; and after the dual-card UE splits first data to be transmitted into second data and third data, the dual-card UE sends the second data to the first network side device by using the first bearer, and sends the third data to the first network side device by using the second bearer, so that the first network side device combines the second data and the third data into the first data. According to this solution, in a condition in which the two cards of the dual-card UE are associated with each other, after splitting data to be transmitted, that is, data that needs to be sent to a network side device, the dual-card UE may simultaneously send split data by separately using bearers of the two cards of the dual-card UE; therefore, a communication procedure of the dual-card UE can be optimized, thereby improving the service transmission efficiency, increasing the communication efficiency, and improving user experience.

Embodiment 4

Figure 17:
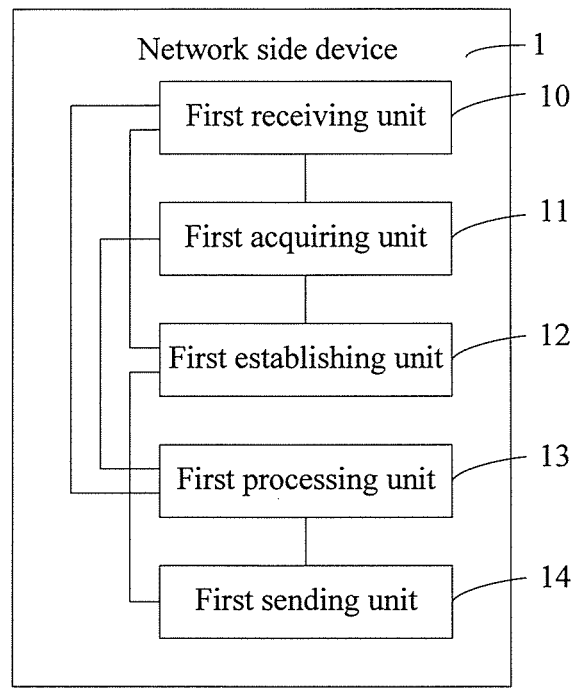
FIG. 17 is a first schematic structural diagram of a network side device according to an embodiment of the present invention.

As shown in FIG. 17, an embodiment of the present invention provides a network side device 1, which may be applied to a scenario in which the network side device sends downlink data to a dual-card dual-standby dual-pass UE, and corresponds to a communication method provided in an embodiment of the present invention. The network side device 1 includes:

a first receiving unit 10, configured to receive an access request from the dual-card UE;

a first acquiring unit 11, configured to acquire association information between a first card of the dual-card UE and a second card of the dual-card UE;

a first establishing unit 12, configured to establish a first bearer according to the access request, and establish a second bearer according to the association information, where the first bearer is a data transmission channel between the network side device and the first card of the dual-card UE, the second bearer is a data transmission channel between the network side device and the second card of the dual-card UE, and the network side device provides a service for the first card of the dual-card UE;

a first processing unit 13, configured to split first data to be transmitted into second data and third data; and a first sending unit 14, configured to send the second data to the dual-card UE by using the first bearer, and send the third data to the dual-card UE by using the second bearer, so that the dual-card UE combines the second data and the third data into the first data.

Optionally, the first receiving unit 10 is specifically configured to receive, from an HSS, subscription information of the first card of the dual-card UE, and the first acquiring unit 11 is specifically configured to acquire the association information in the subscription information of the first card of the dual-card UE.

Alternatively, the first receiving unit 10 is specifically configured to receive an access request from the first card of the dual-card UE, where the access request carries the association information; and the first acquiring unit 11 is specifically configured to acquire the association information according to the access request.

Optionally, the first acquiring unit 11 is specifically configured to acquire the association information that includes an identifier of the second card of the dual-card UE, or an identifier of the second card of the dual-card UE and an address of a core network entity with which the second card of the dual-card UE is registered.

Preferably, the first processing unit 13 is specifically configured to split the first data into the second data and the third data according to at least one of the following: load of the first bearer, data transmission efficiency of the first bearer, load of the second bearer, and data transmission efficiency of the second bearer.

Optionally, the network side device 1 includes an anchor gateway, and the anchor gateway includes a PGW or a GGSN.

The first acquiring unit 11 is specifically configured to acquire an IP address of the second card of the dual-card UE according to the identifier of the second card of the dual-card UE, or the identifier of the second card of the dual-card UE and the address of the core network entity with which the second card of the dual-card UE is registered; and the first establishing unit 12 is specifically configured to establish the second bearer according to the IP address of the second card of the dual-card UE.

Optionally, the second data and the third data that are obtained, by splitting, by the first processing unit 13 carry an IP address of the first card of the dual-card UE.

The first processing unit 13 is specifically configured to add the IP address of the second card of the dual-card UE to the third data; and the first sending unit 14 is specifically configured to, according to the IP address of the first card of the dual-card UE, send the second data to the dual-card UE by using the first bearer, and send the third data to the dual-card UE by using the second bearer.

Optionally, the first processing unit 13 is specifically configured to add the IP address of the second card of the dual-card UE to the third data according to a tunneling technology, where the tunneling technology includes IP in IP encapsulation, GRE, and IPSec.

Optionally, the network side device 1 includes a core network entity, and the core network entity includes an SGW or an SGSN.

The first establishing unit 12 is specifically configured to establish the second bearer according to the identifier of the second card of the dual-card UE, or the identifier of the second card of the dual-card UE and the address of the core network entity with which the second card of the dual-card UE is registered.

Optionally, the first receiving unit 10 is further configured to receive a detach request from the dual-card UE, where the detach request is sent by the dual-card UE when the second card of the dual-card UE needs to be detached; and the first processing unit 13 is further configured to delete the association information, or the association information and the second bearer according to the detach request.

This embodiment of the present invention provides a network side device, where the network side device receives an access request from a dual-card UE, and establishes a first bearer according to the access request, where the network side device provides a service for a first card of the dual-card UE, and the first bearer is a data transmission channel between the network side device and the first card of the dual-card UE; after the network side device acquires association information between the first card of the dual-card UE and a second card of the dual-card UE, the network side device establishes a second bearer according to the association information, where the second bearer is a data transmission channel between the network side device and the second card of the dual-card UE; and after the network side device splits first data to be transmitted into second data and third data, the network side device sends the second data to the dual-card UE by using the first bearer, and sends the third data to the dual-card UE by using the second bearer, so that the dual-card UE combines the second data and the third data into the first data. According to this solution, in a condition in which the two cards of the dual-card UE are associated with each other, after splitting data to be transmitted, that is, data that needs to be sent to the dual-card UE, the network side device may simultaneously deliver split data by separately using bearers of the two cards of the dual-card UE; therefore, a communication procedure of the dual-card UE can be optimized, thereby improving the service transmission efficiency, increasing the communication efficiency, and improving user experience.

Figure 18:
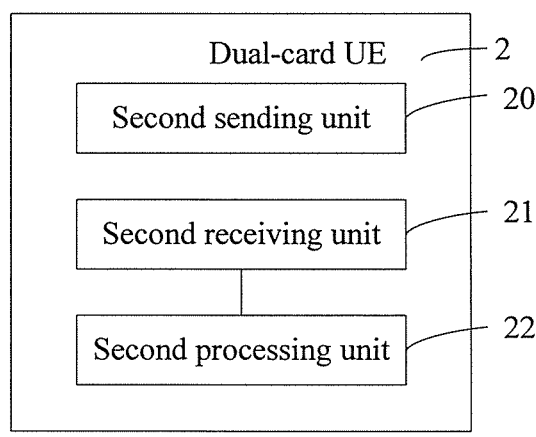
FIG. 18 is a first schematic structural diagram of a dual-card UE according to an embodiment of the present invention.

As shown in FIG. 18, an embodiment of the present invention provides a dual-card UE 2, which may be applied to a scenario in which a network side device sends downlink data to a dual-card dual-standby dual-pass UE, and corresponds to a communication method provided in an embodiment of the present invention. The dual-card UE 2 includes:

a second sending unit 20, configured to send an access request to a first network side device, so that the first network side device establishes a first bearer according to the access request, and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE;

a second receiving unit 21, configured to receive second data and third data from the first network side device, where the second data is sent by the first network side device by using the first bearer after the first network side device splits first data to be transmitted into the second data and the third data, and the third data is sent by the first network side device by using the second bearer, and a second processing unit 22, configured to combine the second data and the third data into the first data.

Optionally, the second sending unit 20 is further configured to send a detach request to the first network side device, so that the first network side device deletes the association information, or the association information and the second bearer according to the detach request, where the detach request is sent by the dual-card UE when the second card of the dual-card UE needs to be detached.

This embodiment of the present invention provides a dual-card UE, where the dual-card UE sends an access request to a first network side device, so that the first network side device establishes a first bearer according to the access request; and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE; the dual-card UE receives second data and third data from the first network side device, where the second data is sent by the first network side device by using the first bearer after the first network side device splits first data to be transmitted into the second data and the third data, and the third data is sent by the first network side device by using the second bearer; and the dual-card UE combines the second data and the third data into the first data. According to this solution, in a condition in which the two cards of the dual-card UE are associated with each other, after splitting data to be transmitted, that is, data that needs to be sent to the dual-card UE, the network side device may simultaneously deliver split data by separately using bearers of the two cards of the dual-card UE; therefore, a communication procedure of the dual-card UE can be optimized, thereby improving the service transmission efficiency, increasing the communication efficiency, and improving user experience.

Figure 19:
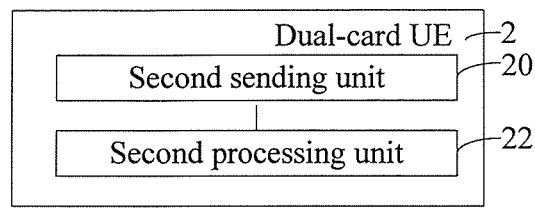
FIG. 19 is a second schematic structural diagram of a dual-card UE according to an embodiment of the present invention.

As shown in FIG. 19, an embodiment of the present invention provides a dual-card UE 2, which may be applied to a scenario in which a dual-card dual-standby dual-pass UE sends downlink data to a network side device, and corresponds to another communication method provided in an embodiment of the present invention. The dual-card UE 2 includes:

a second sending unit 20, configured to send an access request to a first network side device, so that the first network side device establishes a first bearer according to the access request, and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE; and a second processing unit 22, configured to split first data to be transmitted into second data and third data.

The second sending unit 20 is further configured to send the second data to the first network side device by using the first bearer, and send the third data to the first network side device by using the second bearer, so that the first network side device combines the second data and the third data into the first data.

Optionally, the second processing unit 22 is specifically configured to split the first data into the second data and the third data according to at least one of the following: load of the first bearer, data transmission efficiency of the first bearer, load of the second bearer, and data transmission efficiency of the second bearer.

Optionally, the first network side device includes an anchor gateway, where the anchor gateway includes a PGW or a GGSN; and the second data and the third data that are obtained, by splitting, by the second processing unit 22 carry an IP address of the anchor gateway, where the IP address of the anchor gateway is acquired by the dual-card UE from the anchor gateway.

The second processing unit 22 is specifically configured to add an IP address of the second card of the dual-card UE to the third data, where the IP address of the second card of the dual-card UE is sent to the dual-card UE after being acquired by the anchor gateway according to the association information; or is acquired by the dual-card UE from the second card of the dual-card UE according to a preset policy; and the second sending unit 20 is specifically configured to, according to the IP address of the anchor gateway, send the second data to the anchor gateway by using the first bearer, and send the third data to the anchor gateway by using the second bearer.

Optionally, the second processing unit 22 is specifically configured to add the IP address of the second card of the dual-card UE to the third data according to a tunneling technology, where the tunneling technology includes IP in IP encapsulation, GRE, and IPSec.

Optionally, the second sending unit 20 is further configured to send a detach request to the first network side device, so that the first network side device deletes the association information, or the association information and the second bearer according to the detach request, where the detach request is sent by the dual-card UE when the second card of the dual-card UE needs to be detached.

This embodiment of the present invention provides a dual-card UE, where the dual-card UE sends an access request to a first network side device, so that the first network side device establishes a first bearer according to the access request; and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE; and after the dual-card UE splits first data to be transmitted into second data and third data, the dual-card UE sends the second data to the first network side device by using the first bearer, and sends the third data to the first network side device by using the second bearer, so that the first network side device combines the second data and the third data into the first data. According to this solution, in a condition in which the two cards of the dual-card UE are associated with each other, after splitting data to be transmitted, that is, data that needs to be sent to a network side device, the dual-card UE may simultaneously send split data by separately using bearers of the two cards of the dual-card UE; therefore, a communication procedure of the dual-card UE can be optimized, thereby improving the service transmission efficiency, increasing the communication efficiency, and improving user experience.

Figure 20:
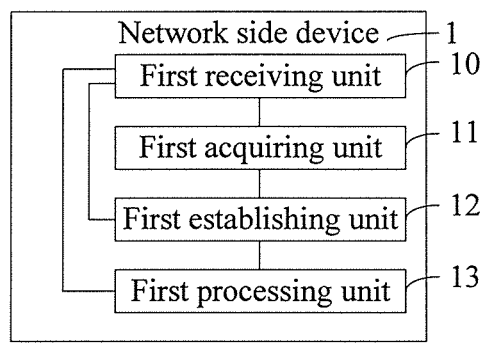
FIG. 20 is a second schematic structural diagram of a network side device according to an embodiment of the present invention.

As shown in FIG. 20, an embodiment of the present invention provides a network side device 1, which is applied to a scenario in which a dual-card dual-standby dual-pass UE sends uplink data to the network side device, and corresponds to another communication method provided in an embodiment of the present invention. The network side device 1 includes:

a first receiving unit 10, configured to receive an access request from the dual-card UE;

a first acquiring unit 11, configured to acquire association information between a first card of the dual-card UE and a second card of the dual-card UE;

a first establishing unit 12, configured to establish a first bearer according to the access request, and establish a second bearer according to the association information, where the first bearer is a data transmission channel between the network side device and the first card of the dual-card UE, the second bearer is a data transmission channel between the network side device and the second card of the dual-card UE, and the network side device provides a service for the first card of the dual-card UE; where the first receiving unit 10 is further configured to receive second data and third data from the dual-card UE, where the second data is sent by the dual-card UE by using the first bearer after the dual-card UE splits first data to be transmitted into the second data and the third data, and the third data is sent by the dual-card UE by using the second bearer, and a first processing unit 13, configured to combine the second data and the third data into the first data.

Optionally, the first receiving unit 10 is specifically configured to receive, from an HSS, subscription information of the first card of the dual-card UE, and the first acquiring unit 11 is specifically configured to acquire the association information in the subscription information of the first card of the dual-card UE.

Alternatively, the first receiving unit 10 is specifically configured to receive an access request from the first card of the dual-card UE, where the access request carries the association information; and the first acquiring unit 11 is specifically configured to acquire the association information according to the access request.

Optionally, the first acquiring unit 11 is specifically configured to acquire the association information that includes an identifier of the second card of the dual-card UE, or an identifier of the second card of the dual-card UE and an address of a core network entity with which the second card of the dual-card UE is registered.

Optionally, the network side device includes an anchor gateway, and the anchor gateway includes a PGW or a GGSN.

The first acquiring unit 11 is specifically configured to acquire an IP address of the second card of the dual-card UE according to the identifier of the second card of the dual-card UE, or the identifier of the second card of the dual-card UE and the address of the core network entity with which the second card of the dual-card UE is registered; and the first establishing unit 12 is specifically configured to establish the second bearer according to the IP address of the second card of the dual-card UE.

Optionally, the network side device includes a core network entity, and the core network entity includes an SGW or an SGSN.

The first establishing unit 12 is specifically configured to establish the second bearer according to the identifier of the second card of the dual-card UE, or the identifier of the second card of the dual-card UE and the address of the core network entity with which the second card of the dual-card UE is registered.

Optionally, the first receiving unit 10 is further configured to receive a detach request from the dual-card UE, where the detach request is sent by the dual-card UE when the second card of the dual-card UE needs to be detached; and the first processing unit 13 is further configured to delete the association information, or the association information and the second bearer according to the detach request.

This embodiment of the present invention provides a network side device, where the network side device receives an access request from a dual-card UE, and establishes a first bearer according to the access request; after acquiring association information between a first card of the dual-card UE and a second card of the dual-card UE, the network side device establishes a second bearer according to the association information, where the network side device provides a service for the first card of the dual-card UE, the first bearer is a data transmission channel between the network side device and the first card of the dual-card UE, and the second bearer is a data transmission channel between the network side device and the second card of the dual-card UE; the network side device receives second data and third data from the dual-card UE, where the second data is sent by the dual-card UE by using the first bearer after the dual-card UE splits first data to be transmitted into the second data and the third data, the third data is sent by the dual-card UE by using the second bearer, and the network side device combines the second data and the third data into the first data. According to this solution, in a condition in which the two cards of the dual-card UE are associated with each other, the dual-card UE may send, after splitting data to be transmitted, that is, data that needs to be sent to the network side device, split data at the same time by separately using bearers of the two cards of the dual-card UE; therefore, a communication procedure of the dual-card UE can be optimized, thereby improving the service transmission efficiency, increasing the communication efficiency, and improving user experience.

Embodiment 5

Figure 21:
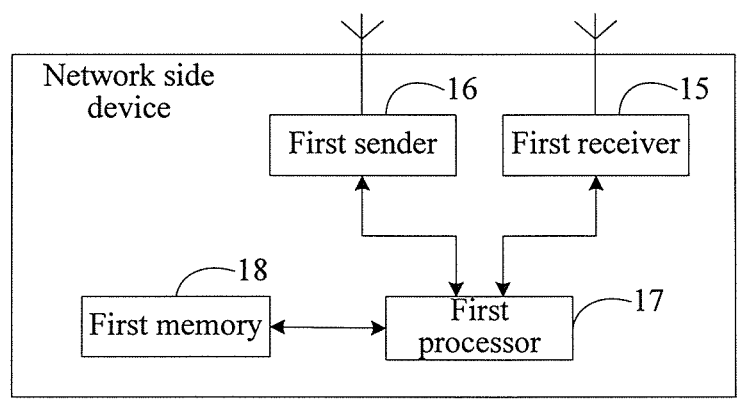
FIG. 21 is a third schematic structural diagram of a network side device according to an embodiment of the present invention.

As shown in FIG. 21, an embodiment of the present invention provides a network side device, which may be applied to a scenario in which the network side device sends downlink data to a dual-card dual-standby dual-pass UE, and corresponds to a communication method for a dual-card UE provided in an embodiment of the present invention. The network side device includes a first receiver 15, a first sender 16, a first processor 17, and a first memory 18.

The first receiver 15 may be configured to receive an uplink signal from the user equipment, and in particular, when the user equipment communicates with the network side device, the first receiver 15 may receive communication data from the user equipment.

The first sender 16 may be configured to send a downlink signal to the user equipment, and in particular, when the user equipment communicates with the network side device, the first sender 16 may send communication data to the user equipment.

The first processor 17 is a control and processing center of the network side device, and runs a software program stored in the first memory 18 and invokes and processes data stored in the first memory 18 so as to control the network side device to transmit and receive signals, and implement another function of the network side device.

The first memory 18 may be configured to store the software program and the data, so that the first processor 17 may run the software program stored in the first memory 18 so as to implement signal transmitting and receiving of the network side device and another function.

Specifically, the first receiver 15 may be configured to receive an access request from the dual-card UE; the first processor 17 may be configured to acquire association information between a first card of the dual-card UE and a second card of the dual-card UE, establish a first bearer according to the access request, establish a second bearer according to the association information, and split first data to be transmitted into second data and third data, where the first bearer is a data transmission channel between the network side device and the first card of the dual-card UE, the second bearer is a data transmission channel between the network side device and the second card of the dual-card UE, and the network side device provides a service for the first card of the dual-card UE; the first memory 18 may be configured to store the first data, or the second data and the third data; and the first sender 16 may be configured to send the second data to the dual-card UE by using the first bearer, and send the third data to the dual-card UE by using the second bearer, so that the dual-card UE combines the second data and the third data into the first data.

Preferably, the first receiver 15 is specifically configured to receive, from an HSS, subscription information of the first card of the dual-card UE, and the first processor 17 is specifically configured to acquire the association information in the subscription information of the first card of the dual-card UE.

Alternatively, the first receiver 15 is specifically configured to receive an access request from the first card of the dual-card UE, where the access request carries the association information; and the first processor 17 is specifically configured to acquire the association information according to the access request.

Optionally, the first processor 17 is specifically configured to acquire the association information that includes an identifier of the second card of the dual-card UE, or an identifier of the second card of the dual-card UE and an address of a core network entity with which the second card of the dual-card UE is registered, and store the association information in the first memory 18.

Optionally, the first processor 17 is specifically configured to split the first data into the second data and the third data according to at least one of the following: load of the first bearer, data transmission efficiency of the first bearer, load of the second bearer, and data transmission efficiency of the second bearer.

Optionally, the network side device includes an anchor gateway, and the anchor gateway includes a PGW or a GGSN.

The first processor 17 is specifically configured to acquire an IP address of the second card of the dual-card UE according to the identifier of the second card of the dual-card UE, or the identifier of the second card of the dual-card UE and the address of the core network entity with which the second card of the dual-card UE is registered, and establish the second bearer according to the IP address of the second card of the dual-card UE.

Optionally, the second data and the third data that are obtained, by splitting, by the first processor 17 carry an IP address of the first card of the dual-card UE.

The first processor 17 is specifically configured to add the IP address of the second card of the dual-card UE to the third data; and the first sender 16 is specifically configured to, according to the IP address of the first card of the dual-card UE, send the second data to the dual-card UE by using the first bearer, and send the third data to the dual-card UE by using the second bearer.

Optionally, the first processor 17 is specifically configured to add the IP address of the second card of the dual-card UE to the third data according to a tunneling technology, where the tunneling technology includes IP in IP encapsulation, GRE, and IPSec.

Optionally, the network side device includes a core network entity, and the core network entity includes an SGW or an SGSN.

The first processor 17 is specifically configured to establish the second bearer according to the identifier of the second card of the dual-card UE, or the identifier of the second card of the dual-card UE and the address of the core network entity with which the second card of the dual-card UE is registered.

Optionally, the first receiver 15 is further configured to receive a detach request from the dual-card UE, where the detach request is sent by the dual-card UE when the second card of the dual-card UE needs to be detached; and the first processor 17 is further configured to delete the association information, or the association information and the second bearer according to the detach request.

This embodiment of the present invention provides a network side device, where the network side device receives an access request from a dual-card UE, and establishes a first bearer according to the access request, where the network side device provides a service for a first card of the dual-card UE, and the first bearer is a data transmission channel between the network side device and a first card of the dual-card UE; after the network side device acquires association information between the first card of the dual-card UE and a second card of the dual-card UE, the network side device establishes a second bearer according to the association information, where the second bearer is a data transmission channel between the network side device and the second card of the dual-card UE; and after the network side device splits first data to be transmitted into second data and third data, the network side device sends the second data to the dual-card UE by using the first bearer, and sends the third data to the dual-card UE by using the second bearer, so that the dual-card UE combines the second data and the third data into the first data. According to this solution, in a condition in which the two cards of the dual-card UE are associated with each other, after splitting data to be transmitted, that is, data that needs to be sent to the dual-card UE, the network side device may simultaneously deliver split data by separately using bearers of the two cards of the dual-card UE; therefore, a communication procedure of the dual-card UE can be optimized, thereby improving the service transmission efficiency, increasing the communication efficiency, and improving user experience.

Figure 22:
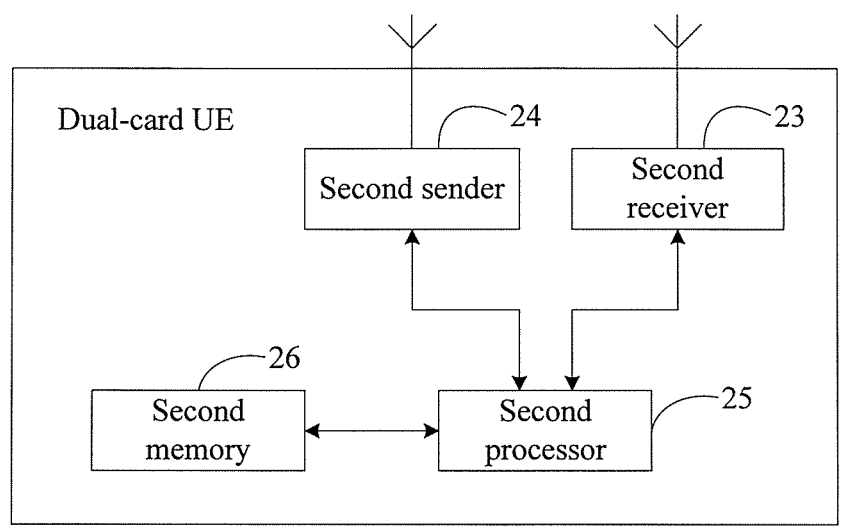
FIG. 22 is a third schematic structural diagram of a dual-card UE according to an embodiment of the present invention.

As shown in FIG. 22, an embodiment of the present invention provides a dual-card UE, which may be applied to a scenario in which a network side device sends downlink data to a dual-card dual-standby dual-pass UE, and corresponds to a communication method for a dual-card UE provided in an embodiment of the present invention. The dual-card UE includes a second receiver 23, a second sender 24, a second processor 25, and a second memory 26.

The second receiver 23 may be configured to receive a downlink signal from the network side device, and in particular, when the user equipment communicates with the network side device, the second receiver 23 may receive communication data from the network side device.

The second sender 24 may be configured to send an uplink signal to the network side device, and in particular, when the user equipment communicates with the network side device, the second sender 24 may send communication data to the network side device.

The second processor 25 is a control and processing center of the user equipment, and runs a software program stored in the second memory 26 and invokes and processes data stored in the second memory 26 so as to control the user equipment to transmit and receive signals, and implement another function of the user equipment.

The second memory 26 may be configured to store the software program and the data, so that the second processor 25 may run the software program stored in the second memory 26 so as to implement signal transmitting and receiving of the user equipment and another function.

Specifically, the second sender 24 is configured to send an access request to a first network side device, so that the first network side device establishes a first bearer according to the access request; and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE; the second receiver 23 is configured to receive second data and third data from the first network side device, where the second data is sent by the first network side device by using the first bearer after the first network side device splits first data to be transmitted into the second data and the third data, and the third data is sent by the first network side device by using the second bearer, the second processor 25 is configured to combine the second data and the third data into the first data; and the second memory 26 is configured to store the first data, or the second data and the third data.

Optionally, the second sender 24 is further configured to send a detach request to the first network side device, so that the first network side device deletes the association information, or the association information and the second bearer according to the detach request, where the detach request is sent by the dual-card UE when the second card of the dual-card UE needs to be detached.

This embodiment of the present invention provides a dual-card UE, where the dual-card UE sends an access request to a first network side device, so that the first network side device establishes a first bearer according to the access request; and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE; the dual-card UE receives second data and third data from the first network side device, where the second data is sent by the first network side device by using the first bearer after the first network side device splits first data to be transmitted into the second data and the third data, and the third data is sent by the first network side device by using the second bearer; and the dual-card UE combines the second data and the third data into the first data. According to this solution, in a condition in which the two cards of the dual-card UE are associated with each other, after splitting data to be transmitted, that is, data that needs to be sent to the dual-card UE, the network side device may simultaneously deliver split data by separately using bearers of the two cards of the dual-card UE; therefore, a communication procedure of the dual-card UE can be optimized, thereby improving the service transmission efficiency, increasing the communication efficiency, and improving user experience.

As shown in FIG. 22, an embodiment of the present invention provides a dual-card UE, which may be applied to a scenario in which a dual-card dual-standby dual-pass UE sends uplink data to a network side device, and corresponds to another communication method for a dual-card UE provided in an embodiment of the present invention. The dual-card UE includes a second receiver 23, a second sender 24, a second processor 25, and a second memory 26.

The second receiver 23 may be configured to receive a downlink signal from the network side device, and in particular, when the user equipment communicates with the network side device, the second receiver 23 may receive communication data from the network side device.

The second sender 24 may be configured to send an uplink signal to the network side device, and in particular, when the user equipment communicates with the network side device, the second sender 24 may send communication data to the network side device.

The second processor 25 is a control and processing center of the user equipment, and runs a software program stored in the second memory 26 and invokes and processes data stored in the second memory 26 so as to control the user equipment to transmit and receive signals, and implement another function of the user equipment.

The second memory 26 may be configured to store the software program and the data, so that the second processor 25 may run the software program stored in the second memory 26 so as to implement signal transmitting and receiving of the user equipment and another function.

Specifically, the second sender 24 is configured to send an access request to a first network side device, so that the first network side device establishes a first bearer according to the access request; and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE; the second processor 25 is configured to split first data to be transmitted into second data and third data; the second memory 26 is configured to store the first data, or the second data and the third data; and the second sender 24 is further configured to send the second data to the first network side device by using the first bearer, and send the third data to the first network side device by using the second bearer, so that the first network side device combines the second data and the third data into the first data.

Optionally, the second processor 25 is specifically configured to split the first data into the second data and the third data according to at least one of the following: load of the first bearer, data transmission efficiency of the first bearer, load of the second bearer, and data transmission efficiency of the second bearer.

Optionally, the first network side device includes an anchor gateway, where the anchor gateway includes a PGW or a GGSN; and the second data and the third data that are obtained, by splitting, by the second processor 25 carry an IP address of the anchor gateway, where the IP address of the anchor gateway is acquired by the dual-card UE from the anchor gateway.

The second processor 25 is specifically configured to add, to the third data, an IP address that is of the second card of the dual-card UE and received by the second receiver 23, where the IP address of the second card of the dual-card UE is sent to the dual-card UE after being acquired by the anchor gateway according to the association information; or is acquired by the dual-card UE from the second card of the dual-card UE according to a preset policy; and the second sender 24 is specifically configured to, according to the IP address of the anchor gateway, send the second data to the anchor gateway by using the first bearer, and send the third data to the anchor gateway by using the second bearer.

Optionally, the second processor 25 is specifically configured to add the IP address of the second card of the dual-card UE to the third data according to a tunneling technology, where the tunneling technology includes IP in IP encapsulation, GRE, and IPSec.

Optionally, the second sender 24 is further configured to send a detach request to the first network side device, so that the first network side device deletes the association information, or the association information and the second bearer according to the detach request, where the detach request is sent by the dual-card UE when the second card of the dual-card UE needs to be detached.

This embodiment of the present invention provides a dual-card UE, where the dual-card UE sends an access request to a first network side device, so that the first network side device establishes a first bearer according to the access request; and after the first network side device acquires association information between a first card of the dual-card UE and a second card of the dual-card UE, the first network side device establishes a second bearer according to the association information, where the first network side device provides a service for the first card of the dual-card UE, the first bearer is a data transmission channel between the first network side device and the first card of the dual-card UE, and the second bearer is a data transmission channel between the first network side device and the second card of the dual-card UE; and after the dual-card UE splits first data to be transmitted into second data and third data, the dual-card UE sends the second data to the first network side device by using the first bearer, and sends the third data to the first network side device by using the second bearer, so that the first network side device combines the second data and the third data into the first data. According to this solution, in a condition in which the two cards of the dual-card UE are associated with each other, after splitting data to be transmitted, that is, data that needs to be sent to a network side device, the dual-card UE may send split data at the same time by separately using bearers of the two cards of the dual-card UE; therefore, a communication procedure of the dual-card UE can be optimized, thereby improving the service transmission efficiency, increasing the communication efficiency, and improving user experience.

As shown in FIG. 21, an embodiment of the present invention provides a network side device, which may be applied to a scenario in which a dual-card dual-standby dual-pass UE sends uplink data to the network side device, and corresponds to another communication method for a dual-card UE provided in an embodiment of the present invention. The network side device includes a first receiver 15, a first sender 16, a first processor 17, and a first memory 18.

The first receiver 15 may be configured to receive an uplink signal from the user equipment, and in particular, when the user equipment communicates with the network side device, the first receiver 15 may receive communication data from the user equipment.

The first sender 16 may be configured to send a downlink signal to the user equipment, and in particular, when the user equipment communicates with the network side device, the first sender 16 may send communication data to the user equipment.

The first processor 17 is a control and processing center of the network side device, and runs a software program stored in the first memory 18 and invokes and processes data stored in the first memory 18 so as to control the network side device to transmit and receive signals, and implement another function of the network side device.

The first memory 18 may be configured to store the software program and the data, so that the first processor 17 may run the software program stored in the first memory 18 so as to implement signal transmitting and receiving of the network side device and another function.

Specifically, the first receiver 15 may be configured to receive an access request from the dual-card UE; the first processor 17 may be configured to acquire association information between a first card of the dual-card UE and a second card of the dual-card UE, establish a first bearer according to the access request, and establish a second bearer according to the association information, where the first bearer is a data transmission channel between the network side device and the first card of the dual-card UE, the second bearer is a data transmission channel between the network side device and the second card of the dual-card UE, and the network side device provides a service for the first card of the dual-card UE; the first receiver 15 may be further configured to receive second data and third data from the dual-card UE, where the second data is sent by the dual-card UE by using the first bearer after the dual-card UE splits first data to be transmitted into the second data and the third data, and the third data is sent by the dual-card UE by using the second bearer, the first memory 18 may be configured to store the first data, or the second data and the third data; and the first processor 17 is further configured to combine the second data and the third data into the first data.

Optionally, the first receiver 15 is specifically configured to receive, from an HSS, subscription information of the first card of the dual-card UE, and the first processor 17 is specifically configured to acquire the association information in the subscription information of the first card of the dual-card UE.

Alternatively,
the first receiver 15 is specifically configured to receive an access request from the first card of the dual-card UE, where the access request carries the association information; and the first processor 17 is specifically configured to acquire the association information according to the access request.

Optionally, the first processor 17 is specifically configured to acquire the association information that includes an identifier of the second card of the dual-card UE, or an identifier of the second card of the dual-card UE and an address of a core network entity with which the second card of the dual-card UE is registered, and store the association information in the first memory 18.

Optionally, the network side device includes an anchor gateway, and the anchor gateway includes a PGW or a GGSN.

The first processor 17 is specifically configured to acquire an IP address of the second card of the dual-card UE according to the identifier of the second card of the dual-card UE, or the identifier of the second card of the dual-card UE and the address of the core network entity with which the second card of the dual-card UE is registered, instruct the first sender 16 to send the IP address of the second card of the dual-card UE to the dual-card UE, and establish the second bearer according to the IP address of the second card of the dual-card UE.

Optionally, the network side device includes a core network entity, and the core network entity includes an SGW or an SGSN.

The first processor 17 is specifically configured to establish the second bearer according to the identifier of the second card of the dual-card UE, or the identifier of the second card of the dual-card UE and the address of the core network entity with which the second card of the dual-card UE is registered.

Optionally, the first receiver 15 is further configured to receive a detach request from the dual-card UE, where the detach request is sent by the dual-card UE when the second card of the dual-card UE needs to be detached; and the first processor 17 is further configured to delete the association information, or the association information and the second bearer according to the detach request.

This embodiment of the present invention provides a network side device, where the network side device receives an access request from a dual-card UE, and establishes a first bearer according to the access request; after acquiring association information between a first card of the dual-card UE and a second card of the dual-card UE, the network side device establishes a second bearer according to the association information, where the network side device provides a service for the first card of the dual-card UE, the first bearer is a data transmission channel between the network side device and the first card of the dual-card UE, and the second bearer is a data transmission channel between the network side device and the second card of the dual-card UE; the network side device receives second data and third data from the dual-card UE, where the second data is sent by the dual-card UE by using the first bearer after the dual-card UE splits first data to be transmitted into the second data and the third data, the third data is sent by the dual-card UE by using the second bearer, and the network side device combines the second data and the third data into the first data. According to this solution, in a condition in which the two cards of the dual-card UE are associated with each other, the dual-card UE may send, after splitting data to be transmitted, that is, data that needs to be sent to the network side device, split data at the same time by separately using bearers of the two cards of the dual-card UE; therefore, a communication procedure of the dual-card UE can be optimized, thereby improving the service transmission efficiency, increasing the communication efficiency, and improving user experience.

It may be clearly understood by a person skilled in the art that, for the purpose of convenient and brief description, division of the foregoing function modules is used as an example for description. In an actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method comprising:
   receiving, by a first network side device, an access request from a dual-card user equipment (UE);
   establishing, by the first network side device, a first bearer according to the access request, wherein the first network side device provides a service for a first card of the dual-card UE, and the first bearer is a data transmission channel between the first network side device and the first card of the dual-card UE;
   acquiring, by the first network side device, association information between the first card of the dual-card UE and a second card of the dual-card UE, wherein the association information is recorded by the first card of the dual-card UE and comprises an identifier of the second card of the dual-card UE;
   establishing, by the first network side device, a second bearer according to the association information, wherein the second bearer is a data transmission channel between the first network side device and the second card of the dual-card UE;
   splitting, by the first network side device, first data to be transmitted into second data and third data; and
   sending, by the first network side device, the second data to the dual-card UE using the first bearer, and sending the third data to the dual-card UE using the second bearer, wherein the second data and the third data are configured to be combined by the dual card UE into the first data.

2. The communication method according to claim 1, wherein acquiring, by the first network side device, association information between the first card of the dual-card UE and a second card of the dual-card UE comprises:
   receiving, by the first network side device, from a home subscriber server (HSS), subscription information of the first card of the dual-card UE; and
   acquiring, by the first network side device, the association information in the subscription information of the first card of the dual-card UE;
   or,
   receiving, by the first network side device, an access request from the first card of the dual-card UE, wherein the access request carries the association information; and
   acquiring, by the first network side device, the association information according to the access request.

3. The communication method according to claim 1, wherein:
   the first network side device comprises an anchor gateway comprising a packet data network gateway (PGW) or a gateway general packet radio service support node (GGSN); and
   establishing, by the first network side device, a second bearer according to the association information comprises:
      acquiring, by the anchor gateway, an Internet Protocol (IP) address of the second card of the dual-card UE according to the identifier of the second card of the dual-card UE, and
      establishing, by the anchor gateway, the second bearer according to the IP address of the second card of the dual-card UE.

4. The communication method according to claim 1, wherein:
   the first network side device comprises a core network entity comprising a serving gateway (SGW) or a serving general packet radio service support node (SGSN); and
   establishing, by the first network side device, a second bearer according to the association information comprises:
      establishing, by the core network entity, the second bearer according to the identifier of the second card of the dual-card UE.

5. The communication method according to claim 1, wherein after receiving, by a first network side device, an access request from the dual-card UE, the method further comprises:
   receiving, by the first network side device, a detach request from the dual-card UE, wherein the detach request is sent by the dual-card UE when the second card of the dual-card UE is to be detached; and
   deleting, by the first network side device, the association information, or the association information and the second bearer according to the detach request.

6. A network side device, comprising:
   a first receiver, configured to receive an access request from a dual-card user equipment (UE);
   a first processor, configured to:
      acquire association information between a first card of the dual-card UE and a second card of the dual-card UE,
      establish a first bearer according to the access request,
      establish a second bearer according to the association information, and
      split first data to be transmitted into second data and third data, wherein the association information is recorded by the first card of the dual-card UE and comprises an identifier of the second card of the dual-card UE, the first bearer is a data transmission channel between the network side device and the first card of the dual-card UE, the second bearer is a data transmission channel between the network side device and the second card of the dual-card UE, and the network side device provides a service for the first card of the dual-card UE; and
   a first sender, configured to send the second data to the dual-card UE using the first bearer, and send the third data to the dual-card UE using the second bearer, wherein the second data and the third data are configured to be combined by the dual card UE into the first data.

7. The network side device according to claim 6, wherein:
   the first receiver is further configured to receive, from a home subscriber server (HSS), subscription information of the first card of the dual-card UE, and the first processor is configured to acquire the association information in the subscription information of the first card of the dual-card UE; or
   the first receiver is further configured to receive an access request from the first card of the dual-card UE, wherein the access request carries the association information, and the first processor is configured to acquire the association information according to the access request.

8. The network side device according to claim 6, wherein:
   the network side device comprises an anchor gateway comprising a packet data network gateway (PGW) or a gateway general packet radio service support node (GGSN); and
   the first processor is configured to acquire an Internet Protocol (IP) address of the second card of the dual-card UE according to the identifier of the second card of the dual-card UE, and establish the second bearer according to the IP address of the second card of the dual-card UE.

9. The network side device according to claim 6, wherein:
the network side device comprises a core network entity comprising a serving gateway (SGW) or a serving general packet radio service support node (SGSN); and
the first processor is configured to establish the second bearer according to the identifier of the second card of the dual-card UE.

10. The network side device according to claim 6, wherein:
the first receiver is further configured to receive a detach request from the dual-card UE, wherein the detach request is sent by the dual-card UE when the second card of the dual-card UE is to be detached; and
the first processor is further configured to delete the association information, or the association information and the second bearer according to the detach request.

11. A communication method comprising:
receiving, by a first network side device, an access request from a dual-card user equipment (UE);
establishing, by the first network side device, a first bearer according to the access request, wherein the first network side device provides a service for a first card of the dual-card UE, and the first bearer is a data transmission channel between the first network side device and the first card of the dual-card UE;
acquiring, by the first network side device, association information between the first card of the dual-card UE and a second card of the dual-card UE, wherein the association information is recorded by the first card of the dual-card UE and comprises an identifier of the second card of the dual-card UE;
establishing, by the first network side device, a second bearer according to the association information, wherein the second bearer is a data transmission channel between the first network side device and the second card of the dual-card UE;
receiving, by the first network side device, second data and third data from the dual-card UE, wherein the second data is sent by the dual-card UE using the first bearer after the dual-card UE splits first data to be transmitted into the second data and the third data, and the third data is sent by the dual-card UE using the second bearer; and
combining, by the first network side device, the second data and the third data into the first data.

12. The communication method according to claim 11, wherein acquiring, by the first network side device, association information between the first card of the dual-card UE and a second card of the dual-card UE comprises:
receiving, by the first network side device, from a home subscriber server (HSS), subscription information of the first card of the dual-card UE; and
acquiring, by the first network side device, the association information in the subscription information of the first card of the dual-card UE;
or,
receiving, by the first network side device, an access request from the first card of the dual-card UE, wherein the access request carries the association information; and
acquiring, by the first network side device, the association information according to the access request.

13. The communication method according to claim 11, wherein:
the first network side device comprises an anchor gateway, and the anchor gateway comprises a packet data network gateway (PGW) or a gateway general packet radio service support node (GGSN); and
establishing, by the first network side device, a second bearer according to the association information comprises:
acquiring, by the anchor gateway, an Internet Protocol (IP) address of the second card of the dual-card UE according to the identifier of the second card of the dual-card UE, and
establishing, by the anchor gateway, the second bearer according to the IP address of the second card of the dual-card UE.

14. The communication method according to claim 11, wherein:
the first network side device comprises a core network entity comprising a serving gateway (SGW) or a serving general packet radio service support node (SGSN); and
establishing, by the first network side device, a second bearer according to the association information comprises:
establishing, by the core network entity, the second bearer according to the identifier of the second card of the dual-card UE.

15. The communication method according to claim 11, wherein after receiving, by a first network side device, an access request from the dual-card UE, the method further comprises:
receiving, by the first network side device, a detach request from the dual-card UE, wherein the detach request is sent by the dual-card UE when the second card of the dual-card UE is to be detached; and
deleting, by the first network side device, the association information, or the association information and the second bearer according to the detach request.

16. A network side device, comprising:
a first receiver, configured to receive an access request from a dual-card user equipment (UE); and
a first processor, configured to:
acquire association information between a first card of the dual-card UE and a second card of the dual-card UE,
establish a first bearer according to the access request, and
establish a second bearer according to the association information, wherein the association information is recorded by the first card of the dual-card UE and comprises an identifier of the second card of the dual-card UE, the first bearer is a data transmission channel between the network side device and the first card of the dual-card UE, the second bearer is a data transmission channel between the network side device and the second card of the dual-card UE, and the network side device provides a service for the first card of the dual-card UE;
wherein the first receiver is further configured to receive second data and third data from the dual-card UE, wherein the second data is sent by the dual-card UE using the first bearer after the dual-card UE splits first data to be transmitted into the second data and the third data, and the third data is sent by the dual-card UE using the second bearer; and wherein the first processor is further configured to combine the second data and the third data into the first data.

17. The network side device according to claim 16, wherein:
the first receiver is further configured to receive, from a home subscriber server (HSS), subscription information of the first card of the dual-card UE, and the first processor is configured to acquire the association information in the subscription information of the first card of the dual-card UE; or
the first receiver is further configured to receive an access request from the first card of the dual-card UE, wherein the access request carries the association information, and the first processor is configured to acquire the association information according to the access request.

18. The network side device according to claim 16, wherein:
the network side device comprises an anchor gateway comprising a packet data network gateway (PGW) or a gateway general packet radio service support node (GGSN); and
the first processor is further configured to acquire an Internet Protocol (IP) address of the second card of the dual-card UE according to the identifier of the second card of the dual-card UE, and establish the second bearer according to the IP address of the second card of the dual-card UE.

19. The network side device according to claim 16, wherein:
the network side device comprises a core network entity comprising a serving gateway (SGW) or a serving general packet radio service support node (SGSN); and
the first processor is configured to establish the second bearer according to the identifier of the second card of the dual-card UE.

20. The network side device according to claim 16, wherein:
the first receiver is further configured to receive a detach request from the dual-card UE, wherein the detach request is sent by the dual-card UE when the second card of the dual-card UE is to be detached; and
the first processor is further configured to delete the association information, or the association information and the second bearer according to the detach request.

21. A communication method comprising:
sending, by a dual-card user equipment (UE), an access request to a first network side device, the access request for requesting the first network side device to provide data service for a first card of the dual-card UE; and
transferring, by the dual-card UE, first data with the first network side device, wherein the first data includes second data and third data, the second data is transferred on a first bearer and the third data is transferred on a second bearer, the first bearer is a data transmission channel between the first network side device and the first card of the dual-card UE, the second bearer is a data transmission channel between the first network side device and a second card of the dual-card UE, the second bearer is established based on association information between the first card of the dual-card UE and the second card of the dual-card UE, and the association information is recorded by the first card of the dual-card UE and comprises an identifier of the second card of the dual-card UE.

22. The method according to claim 21, wherein transferring, by the dual-card UE, the first data with the first network side device comprises:
receiving the first data from the first network side device; or
sending the first data to the first network side device.

23. A dual-card user equipment (UE), comprising:
a sender, configured to send an access request to a first network side device, the access request indicating requesting the first network side device to provide data service for a first card of the dual-card UE;
a processor, configured to transfer first data with the first network side device, wherein the first data includes second data and third data, the second data is transferred on a first bearer and the third data is transferred on a second bearer, the first bearer is a data transmission channel between the first network side device and the first card of the dual-card UE, the second bearer is a data transmission channel between the first network side device and a second card of the dual-card UE, the second bearer is established based on association information between the first card of the dual-card UE and the second card of the dual-card UE, and the association information is recorded by the first card of the dual-card UE and comprises an identifier of the second card of the dual-card UE.

* * * * *